US012445226B2

(12) United States Patent
Hajimiri et al.

(10) Patent No.: US 12,445,226 B2
(45) Date of Patent: Oct. 14, 2025

(54) SCALABLE DECENTRALIZED REDISTRIBUTOR AND METHOD OF REDISTRIBUTING SIGNALS

(71) Applicant: California Institute of Technology, Pasadena, CA (US)

(72) Inventors: Seyed Ali Hajimiri, La Canada, CA (US); Austin C. Fikes, Pasadena, CA (US); Parham Porsandeh Khial, Pasadena, CA (US); Samir Nooshabadi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1273 days.

(21) Appl. No.: 17/122,783

(22) Filed: Dec. 15, 2020

(65) Prior Publication Data
US 2021/0105092 A1    Apr. 8, 2021

Related U.S. Application Data

(63) Continuation-in-part of application No. 16/723,943, filed on Dec. 20, 2019, now Pat. No. 11,601,183.
(Continued)

(51) Int. Cl.
*H04L 1/08*    (2006.01)
*H04B 7/06*    (2006.01)

(52) U.S. Cl.
CPC ............ *H04L 1/08* (2013.01); *H04B 7/0617* (2013.01); *H04B 7/0667* (2013.01); *H04B 7/0697* (2013.01)

(58) Field of Classification Search
CPC ....... H04L 1/08; H04B 7/0617; H04B 7/0667; H04B 7/0697; H04B 7/086
See application file for complete search history.

(56) References Cited

U.S. PATENT DOCUMENTS 4,779,005 A * 10/1988 Arnold ................ H04N 25/768
348/E5.091
6,778,843 B2    8/2004 Oura
(Continued)

FOREIGN PATENT DOCUMENTS

CN    108988948 A    12/2018
CN    116075978 A    5/2023
(Continued)

OTHER PUBLICATIONS

International Search Report and Written Opinion for International Application No. PCT/US2019/068115, Search completed Feb. 13, 2020, Mailed Mar. 18, 2020, 18 pgs.
(Continued)

Primary Examiner — Shawn D Miller
(74) Attorney, Agent, or Firm — KPPB LLP

(57) ABSTRACT

Scalable decentralized redistributors and methods of redistributing signals in accordance with various embodiments of the invention are illustrated. One embodiment includes an array of channels configured to receive and retransmit a signal, where each of a plurality of independently operating channels in the array includes: at least one antenna element; an RF chain configured to apply a time delay to the received signal prior to retransmission; control circuitry configured to control the time delay applied to the received signal by the RF chain; and a reference oscillator. In addition, the array of channels is configured to steer a signal of a first frequency in a first direction and steer a signal of a second frequency in a second direction different from the first direction to create a dual beam redistributor.

20 Claims, 51 Drawing Sheets

Related U.S. Application Data

(60) Provisional application No. 62/931,634, filed on Nov. 6, 2019, provisional application No. 62/897,764, filed on Sep. 9, 2019, provisional application No. 62/783,011, filed on Dec. 20, 2018.

(56) References Cited

U.S. PATENT DOCUMENTS

| | | | |
|---|---|---|---|
| 6,831,600 | B1 | 12/2004 | Cherrette et al. |
| 7,848,719 | B2 | 12/2010 | Krishnaswamy et al. |
| 9,014,568 | B2 | 4/2015 | Qian et al. |
| 9,214,739 | B2 | 12/2015 | Sover et al. |
| 9,356,704 | B1 | 5/2016 | Zanoni et al. |
| 10,061,125 | B2 | 8/2018 | Hajimiri et al. |
| 10,944,477 | B2 | 3/2021 | Fatemi et al. |
| 11,112,491 | B2 | 9/2021 | Abediasl et al. |
| 11,249,370 | B2 | 2/2022 | Hajimiri |
| 11,601,183 | B2 | 3/2023 | Hajimiri et al. |
| 12,021,312 | B2 | 6/2024 | Gal et al. |
| 12,289,147 | B2 | 4/2025 | Hajimiri et al. |
| 2001/0046844 | A1* | 11/2001 | Oura ............ H04B 1/40 455/272 |
| 2003/0054790 | A1 | 3/2003 | Sanada et al. |
| 2004/0087294 | A1 | 5/2004 | Wang |
| 2005/0255387 | A1 | 11/2005 | Butt et al. |
| 2006/0246911 | A1 | 11/2006 | Petermann |
| 2007/0046547 | A1 | 3/2007 | Crouch |
| 2007/0159407 | A1 | 7/2007 | Bolle et al. |
| 2008/0252546 | A1 | 10/2008 | Mohamadi |
| 2009/0267835 | A1 | 10/2009 | Tietjen |
| 2009/0274466 | A1 | 11/2009 | Cox et al. |
| 2010/0067602 | A1* | 3/2010 | Noel ............ H04B 1/707 375/267 |
| 2010/0178065 | A1* | 7/2010 | Nishihara ........ H04B 10/613 341/137 |
| 2011/0217970 | A1 | 9/2011 | Ben et al. |
| 2012/0002967 | A1 | 1/2012 | Mayer et al. |
| 2012/0039366 | A1 | 2/2012 | Wood et al. |
| 2012/0139810 | A1 | 6/2012 | Faraone et al. |
| 2013/0093624 | A1* | 4/2013 | Raczkowski ........ H01Q 3/30 342/368 |
| 2015/0244387 | A1* | 8/2015 | Fleishman ........ H03M 1/201 341/131 |
| 2016/0048708 | A1 | 2/2016 | Sandler et al. |
| 2016/0054431 | A1 | 2/2016 | Zou et al. |
| 2017/0026096 | A1* | 1/2017 | Roh ............. H04L 1/0009 |
| 2017/0029107 | A1* | 2/2017 | Emami ........... G08G 5/0069 |
| 2017/0059684 | A1* | 3/2017 | Robinson ........... G01S 3/32 |
| 2017/0184699 | A1* | 6/2017 | Honma ........... G01S 13/003 |
| 2018/0020416 | A1 | 1/2018 | Smith et al. |
| 2018/0039154 | A1 | 2/2018 | Hashemi et al. |
| 2018/0041270 | A1* | 2/2018 | Buer ............. H04W 56/001 |
| 2018/0123699 | A1 | 5/2018 | Fatemi et al. |
| 2018/0241122 | A1 | 8/2018 | Jalali Mazlouman et al. |
| 2019/0020407 | A1* | 1/2019 | Gharavi .......... H04B 7/0413 |
| 2019/0028378 | A1* | 1/2019 | Houjyo ........... H04W 40/24 |
| 2019/0056499 | A1 | 2/2019 | Fatemi et al. |
| 2019/0165448 | A1 | 5/2019 | Polehn et al. |
| 2019/0361102 | A1* | 11/2019 | Price ............ G01S 15/8915 |
| 2020/0106499 | A1 | 4/2020 | Branlund |
| 2020/0169306 | A1* | 5/2020 | Kim ............. H04B 7/0617 |
| 2020/0192179 | A1 | 6/2020 | Hajimiri |
| 2020/0204244 | A1 | 6/2020 | Hajimiri et al. |
| 2020/0266879 | A1* | 8/2020 | Chia ............. H04B 7/0828 |
| 2020/0373662 | A1 | 11/2020 | Gleason et al. |
| 2022/0021114 | A1 | 1/2022 | Gal et al. |
| 2022/0189864 | A1 | 6/2022 | Yazdani |
| 2023/0155649 | A1 | 5/2023 | Hajimiri et al. |

FOREIGN PATENT DOCUMENTS

| | | |
|---|---|---|
| EP | 4182998 A1 | 5/2023 |
| WO | 0241443 A2 | 5/2002 |
| WO | 2015135003 A2 | 9/2015 |
| WO | 2018218003 A1 | 11/2018 |
| WO | 2020132126 A1 | 6/2020 |
| WO | 2020132611 A1 | 6/2020 |
| WO | 2022016110 A1 | 1/2022 |

OTHER PUBLICATIONS

"Altera: Time Delay Digital Beamforming", Altera Corporation, Reference Design Datasheet, Retrieved from: https://www.intel.cn/content/dam/www/programmable/us/en/pdfs/literature/ds/time_delay_digita_beamforming_11.pdf, Apr. 2014, 1 pg.

Abbas, "Beamforming Techniques for Millimeter Wave Relay Networks", PhD Thesis, University of Manchester, 2017, 168 pgs.

Ahmed et al., "A Survey on Hybrid Beamforming Techniques in 5G: Architecture and System Model Perspectives", IEEE Communications Surveys & Tutorials, vol. 20, No. 4, Fourth Quarter 2018, Jun. 4, 2018, pp. 3060-3097.

Chu et al., "A True Time-Delay-Based Bandpass Multi-Beam Array at mm-Waves Supporting Instantaneously Wide Bandwidths", 2010 IEEE International Solid-State Circuits Conference (ISSCC), Feb. 7-11, 2010, pp. 38-40.

Hajimiri et al., "Integrated Phased Array Systems in Silicon", IEEE Communications Magazine, Sep. 2005, vol. 93, Issue 9, pp. 1637-1655, DOI: 10.1109/JPROC.2005.852231.

Jang et al., "A True Time Delay 16-Element 4-Beam Digital Beamformer", 2018 IEEE Radio Frequency Integrated Circuits Symposium (RFIC), Jun. 10-12, 2018, pp. 12-15.

Kutty et al., "Beamforming for Millimeter Wave Communications: An Inclusive Survey", IEEE Communications Surveys & Tutorials, vol. 18, No. 2, Second Quarter 2016, Electronic Publication: Dec. 1, 2015, pp. 949-973, DOI: 10.1109/COMST.2015.2504600.

Sohrabi et al., "Hybrid Digital and Analog Beamforming Design for Large-Scale Antenna Arrays", arXiv.org, Retrieved from: https://arxiv.org/abs/1601.06814v1, Jan. 25, 2016, 13 pgs.

Tsinos et al., "On the Energy-Efficiency of Hybrid Analog-Digital Transceivers for Single- and Mutli-carrier Large Antenna Array Systems", IEEE Journal on Selected Areas in Communications, vol. 35, No. 9, Sep. 2017, Electronic Publication: Jun. 28, 2017, 16 pgs.

Xu et al., "Spectral and Energy Efficiency of Multi-pair Massive MIMO Relay Network with Hybrid Processing", arXiv.org, Retrieved from: https://arxiv.org/abs/1706.06743v2, Jun. 25, 2017, 16 pgs.

Zhang et al., "Hybridly-Connected Structure for Hybrid Beamforming in mmWave MIMO Systems", IEEE Transactions on Communications, vol. 66, No. 2, Feb. 2018, 13 pgs, DOI: 10.1109/TCOMM.2017.2756882.

International Preliminary Report on Patentability for International Application PCT/US2019/067262, Report issued Jun. 16, 2021, Mailed Jul. 1, 2021, 8 Pgs.

International Preliminary Report on Patentability for International Application PCT/US2019/068115, Report issued Jun. 16, 2021, Mailed Jul. 1, 2021, 12 Pgs.

International Search Report and Written Opinion for International Application No. PCT/US2021/042069, Search completed Nov. 5, 2021, Mailed on Nov. 5, 2021, 10 Pgs.

International Search Report and Written Opinion for International Application No. PCT/US2019/067262, Search completed Feb. 21, 2020, Mailed Mar. 19, 2020, 13 Pgs.

Abiri et al., "A 1-D Heterodyne Lens-Free Optical Phased Array Camera With Reference Phase Shifting", IEEE Photonics Journal, vol. 10, No. 5, Sep. 2018, DOI:10.1109/JPHOT.2018.2871823.

Aflatouni et al., "Nanophotonic projection system", Optical Society of America, Aug. 4, 2015, 11 pgs., DOI:10.1364/OE.23.021012.

Agrawal, "Fiber-Optic Communication Systems", Wiley Interscience, 2002, 563 pgs. (presented in six parts).

Akiba et al., "Photonic Architecture for Beam Forming of RF Phased Array Antenna", Optical Fiber Communication Conference, OSA Technical Digest, Mar. 2014, 3 pgs., https://doi.org/10.1364/OFC.2014.W2A.51.

Akima et al., "A 10 GHz frequency-drift temperature compensated LC VCO with fast-settling low-noise voltage regulator in 0.13 μm CMOS", Proceedings of the Custom Integrated Circuits Conference, Oct. 2010, pp. 1-4, DOI:10.1109/CICC.2010.5617448.

(56) References Cited

OTHER PUBLICATIONS

Beas et al., "Millimeter-Wave Frequency Radio over Fiber Systems: A Survey", IEEE Communications Surveys & Tutorials, Mar. 2013, vol. 15, No. 4, pp. 1593-1619, DOI 10.1109/SURV.2013.013013.00135.
Chang et al., "A temperature compensated VCO using feed-forward gain multiplication for cellular applications", IEEE Radio Frequency Integrated Circuits Symposium (RFIC), May 2015, pp. 187-190, DOI: 10.1109/RFIC.2015.7337736.
Cho et al., "A True Time Delay-Based SiGe Bi-directional T/R Chipset for Large-Scale Wideband Timed Array Antennas", IEEE Radio Frequency Integrated Circuits Symposium (RFIC), Jun. 2018, pp. 272-275, DOI:10.1109/RFIC.2018.8428977.
Chu et al., "True-Time-Delay-Based Multi-Beam Arrays", IEEE Transactions on Microwave Theory and Techniques, Aug. 2013, vol. 61, Issue 8, pp. 3072-3082, DOI: 10.1109/TMTT.2013.2271119.
Chung et al., "A 1024-Element Scalable Optical Phased Array in 0.18 SOI CMOS", 2017 International Solid-State Circuits Conference, 2017, 12 pgs., DOI: 10.1109/ISSCC.2017.7870361.
Cripps, "RF power amplifiers for wireless communications", Boston: Artech House, 2006, 473 pgs.
Debaes et al., "High-impedance high-frequency silicon detector response for precise receiverless optical clock injection", Proceedings of the SPIE, Mar. 27, 2002, vol. 4654, pp. 78-88, https://doi.org/10.1117/12.463842.
Dimas et al., "Cooperative Beamforming with Predictive Relay Selection for Urban mmWave Communications", IEEE Access, 2016, vol. 4, pp. 157057-157071, DOI: 10.1109/ACCESS.2017.DOI.
Dunworth et al., "A 28GHz Bulk-CMOS dual-polarization phased-array transceiver with 24 channels for 5G user and basestation equipment", 2018 IEEE International Solid-State Circuits Conference—(ISSCC), Feb. 2018, pp. 70-72, DOI: 10.1109/ISSCC.2018.8310188.
Fatemi et al., "High sensitivity active flat optics optical phased array receiver with a two-dimensional aperture", Optics Express, vol. 26, No. 23, Nov. 12, 2018, 17 pgs., https://doi.org/10.1364/OE.26.029983.
Gal-Katziri et al., "A 28 GHz Optically Synchronized CMOS Phased Array with an Integrated Photodetector", IEEE Radio Frequency Integrated Circuits Symposium (RFIC), Jun. 2021, 4 pgs., DOI:10.1109/RFIC51843.2021.9490452.
Gal-Katziri et al., "A Sub-Picosecond Hybrid DLL for Large-Scale Phased Array Synchronization", IEEE Asian Solid-State Circuits Conference (A-SSCC), 2018, pp. 231-234, DOI: 10.1109/ASSCC.2018.8579340.
Gao, "High-resolution phased array radar imaging by photonics-based broadband digital beamforming", Optics Express, Apr. 29, 2019, vol. 27, No. 9, pp. 13194-13203, doi: 10.1364/OE.27.013194.
Garakoui et al., "Compact Cascadable gm-C All-Pass True Time Delay Cell with Reduced Delay Variation over Frequency", IEEE Journal of Solid-State Circuits, Mar. 1, 2015, first published Feb. 15, 2014, vol. 50, No. 3, pp. 693-703, DOI: 10.1109/JSSC.2015.2390214.
Gardner, "Charge-pump phase-lock loops", IEEE Transactions on Communications, Nov. 1980, vol. COM-28, pp. 1849-1858, DOI: 10.1109/TCOM.1980.1094619.
Gaudino et al., "Perspective in Next-Generation Home Networks: Toward Optical Solutions?", IEEE Communications Magazine, Mar. 2010, vol. 48, No. 2, pp. 39-47, DOI:10.1109/MCOM.2010.5402662.
Ghaderi et al., "An Integrated Discrete-Time Delay Compensating Technique for Large-Array Beamformers", IEEE Transactions on Circuits and Systems—I: Regular Papers, Sep. 2019, vol. 66, No. 9, pp. 3296-3306, DOI: 10.1109/TCSI.2019.2626309.
Goodman et al., "Optical interconnections for VLSI systems", Proceedings of the IEEE, Jul. 1984, vol. 72, Issue 7, pp. 850-866, DOI: 10.1109/PROC.1984.12943.

Hajimiri et al., "Dynamic Focusing of Large Arrays for Wireless Power Transfer and Beyond", IEEE Journal of Solid-State Circuits, Nov. 2020, 25 pgs., DOI:10.1109/JSSC.2020.3036895.
Hajimiri et al., "Phased Array Systems in Silicon", Topics in Circuits for Communications, IEEE Communications Magazine, Aug. 2004, vol. 42, No. 8, pp. 122-130.
Hashemi et al., "A flexible phased array system with low areal mass density", Nature Electronics, May 17, 2019, vol. 2, pp. 195-205, DOI: https://doi.org/10.1038/s41928-019-0247-9.
Havary-Nassab et al., "Distributed Beamforming for Relay Networks Based on Second-Order Statistics of the Channel State Information", IEEE Transactions on Signal Processing, Sep. 2008, vol. 56, Issue 9, pp. 4306-4316, DOI: 10.1109/TSP.2008.925945.
He et al., "Long-distance telecom-fiber transfer of a radio-frequency reference for radio astronomy", Optica, Feb. 2018, vol. 5, Issue 2, pp. 138-146, https://doi.org/10.1364/OPTICA.5.000138.
Hong et al., "A General Theory of Injection Locking and Pulling in Electrical Oscillators—Part I: Time-Synchronous Modeling and Injection Waveform Design", IEEE Journal of Solid-State Circuits, Aug. 2019, vol. 54, Issue 8, pp. 2109-2121, DOI: 10.1109/JSSC.2019.2908753.
Hong et al., "Multibeam Antenna Technologies for 5G Wireless Communications", IEEE Transactions on Antennas and Propagation, Dec. 2017, vol. 65, Issue 12, pp. 6231-6249, DOI: 10.1109/TAP.2017.2712819.
Horvat, "True Time Domain Bandpass Beamforming", Thesis, Master of Applied Science, Engineering Science, Simon Fraser University, 1998, 104 pgs.
Hu et al., "17.6 A 21.7-to-26.5GHz Charge-Sharing Locking Quadrature PLL with Implicit Digital Frequency-Tracking Loop Achieving 75fs Jitter and -250dB FoM", IEEE International Solid-State Circuits Conference—(ISSCC), Feb. 2020, pp. 276-278, DOI: 10.1109/ISSCC19947.2020.9063024.
Huang et al., "A Mm-Wave Wideband MIMO RX With Instinctual Array-Based Blocker/Signal Management for Ultralow-Latency Communication", IEEE Journal of Solid-State Circuits, Dec. 2019, first published Oct. 24, 2019, vol. 54, Issue 12, pp. 3553-3564, DOI: 10.1109/JSSC.2019.2945267.
Jang et al., "A 1-GHz 16-Element Four-Beam True-Time-Delay Digital Beamformer", IEEE Journal of Solid-State Circuits, 2019, vol. 54, No. 5, pp. 1304-1314, DOI:10.1109/JSSC.2019.2894357.
Jeon et al., "A Scalable 6-to-18 GHz Concurrent Dual-Band Quad-Beam Phased-Array Receiver in CMOS", IEEE Journal of Solid-State Circuits, Jan. 2009, vol. 43, No. 12, pp. 2660-2673, DOI:10.1109/JSSC.2008.2004863.
Jing et al., "Network Beamforming Using Relays with Perfect Channel Information", IEEE Transactions on Information Theory, 2009, vol. 55, No. 6, pp. 4306-4316, arXiv:0804.1117 [cs.IT], Apr. 7, 2008.
Kalia et al., "A Simple, Unified Phase Noise Model for Injection-Locked Oscillators", IEEE Radio Frequency Integrated Circuits Symposium, Jun. 2011, pp. 1-4, DOI: 10.1109/RFIC.2011.5940707.
Kang et al., "Low-cost multistandard radio-over-fiber downlinks based on CMOS-compatible Si avalanche photodetectors", IEEE Photonics Technology Letters, May 2009, vol. 21, No. 7, pp. 462-464, DOI:10.1109/LPT.2009.2013356.
Kaukovuori et al., "Analysis and Design of Passive Polyphase Filters", IEEE Transactions on Circuits and Systems I: Regular Papers, Feb. 7, 2008, vol. 55, No. 10, pp. 3023-3037, DOI: 10.1109/TCSI.2008.917990.
Kern, "PLL-Based Active Optical Clock Distribution", Thesis, Sep. 2004, 105 pgs.
Komljenovic et al., "On-chip calibration and control of optical phased arrays", Optics Express, vol. 26, No. 3, Feb. 5, 2018, 12 pgs., https://doi.org/10.1364/OE.26.003199.
Laneman et al., "An efficient protocol for realizing cooperative diversity in wireless networks", Proceedings, 2001 IEEE International Symposium on Information Theory (IEEE Cat. No. 01CH37252), Jun. 24-29, 2001, p. 294, DOI:10.1109/ISIT.2001.936157.
Lau et al., "Ultra-Stable RF-Over-Fiber Transport in NASA Antennas, Phased Arrays and Radars", Journal of Lightwave Technology, Oct. 15, 2014, vol. 32, Issue 20, pp. 3440-3451, DOI: 10.1109/JLT.2014.2312930.

(56) References Cited

OTHER PUBLICATIONS

Lee et al., "A silicon avalanche photodetector fabricated with standard CMOS technology with over 1 THz gain-bandwidth product", Optics Express, Nov. 2010, vol. 18, No. 23, pp. 24189-24194, DOI:10.1364/OE.18.024189.

Lee et al., "Optical-Power Dependence of Gain, Noise, and Bandwidth Characteristics for 850-nm CMOS Silicon Avalanche Photodetectors", IEEE Journal of Selected Topics in Quantum Electronics, Nov.-Dec. 2014, vol. 20, Issue 6, pp. 211-217, DOI:10.1109/JSTQE.2014.2327796.

Lee et al., "Performance Optimization and Improvement of Silicon Avalanche Photodetectors in Standard CMOS Technology", IEEE Journal of Selected Topics in Quantum Electronics, Mar.-Apr. 2018, vol. 24, Issue 2. pp. 1-13, DOI: 10.1109/JSTQE.2017.2754359.

Leu et al., "Injection-locked clock receiver for monolithic optical link in 45nm SOI", IEEE Asian Solid-State Circuits Conference, Nov. 2011, pp. 149-152, DOI: 10.1109/ASSCC.2011.6123624.

Liu et al., "A Temperature Compensated Triple-Path PLL With KVCO Non-Linearity Desensitization Capable of Operating at 77 K", IEEE Transactions on Circuits and Systems I: Regular Papers, May 2017, vol. 64, No. 11, pp. 1-9, DOI:10.1109/TCSI.2017.2704023.

Matsko, "Advances in the Development of Spectrally Pure Microwave Photonic Synthesizers", IEEE Photonics Technology Letters, Dec. 1, 2019, vol. 31, Issue 23, pp. 1882-1885, DOI: 10.1109/LPT.2019.2947901.

McIntrye, "The distribution of gains in uniformly multiplying avalanche photodiodes: Theory", IEEE Transactions on Electron Devices, Jun. 1972, vol. 19, Issue 6, pp. 703-713, DOI: 10.1109/T-ED.1972.17485.

McIntyre, "A new look at impact ionization—Part I: A theory of gain, noise, breakdown probability, and frequency response", IEEE Transactions on Electron Devices, Aug. 1999, vol. 46, Issue 8, pp. 1623-1631, DOI: 10.1109/16.777150.

McIntyre, "Multiplication noise in uniform avalanche diodes", IEEE Transactions on Electron Devices, Jan. 1966, vol. ED-13, issue 1, pp. 164-168, DOI: 10.1109/T-ED.1966.15651.

Mondal et al., "A 2-GHz Bandwidth, 0.25-1.7 ns True-Time-Delay Element Using a Variable-Order All-Pass Filter Architecture in 0.13 μm CMOS", IEEE Journal of Solid-State Circuits, Aug. 2017, vol. 52, Issue 8, pp. 2180-2193, DOI: 10.1109/JSSC.2017.2693229.

Nayak et al, "A 10-GB/s-18.8 dBm Sensitivity 5.7 mW Fully-Integrated Optoelectronic Receiver with Avalanche Photodetector in 0.13-μm CMOS", IEEE Transactions on Circuits and Systems—I: Regular Papers, Aug. 2019, vol. 66, No. 8, pp. 3162-36173, DOI: 10.1109/TCSI.2019.2909284.

Niknejad, "Electromagnetics for High-Speed Analog and Digital Communication Circuits", Cambridge University Press, Feb. 2007, 10 pgs.

Nishio et al., "A high-speed adaptive antenna array with simultaneous multiple-beamforming capability", IEEE Transactions on Microwave Theory and Techniques, Jul. 2003, vol. 3, pp. 1673-1676, DOI:10.1109/MWSYM.2003.1210460.

Ortega et al., "Optical Beamformer for 2-D Phased Array Antenna with Subarray Partitioning Capability", IEEE Photonics Journal, vol. 8, No. 3, Jun. 2016, 9 pgs., DOI: 10.1109/JPHOT.2016.2550323.

Paciorek, "Injection locking of oscillators", Proceedings of the IEEE, Nov. 1965, vol. 53, Issue: 11, pp. 1723-1727, DOI: 10.1109/PROC.1965.4345.

Pan et al., "An 18-GB/s Fully Integrated Optical Receiver with Adaptive Cascaded Equalizer", IEEE Journal of Selected Topics in Quantum Electronics, Nov./Dec. 2016, vol. 22, No. 6, pp. 361-369, DOI: 10.1109/JSTQE.2016.2574567.

Pancheri et al., "Low-Noise Avalanche Photodiode in Standard 0.35-μm CMOS Technology", IEEE Transactions on Electron Devices, vol. 55, Issue 1, pp. 457-461, first published Dec. 26, 2007, DOI: 10.1109/TED.2007.910570.

Pang et al., "21.1 A 28GHZ CMOS Phased-Array Beamformer Utilizing Neutralized Bi-Directional Technique Supporting Dual-Polarized MIMO for 5G NR", IEEE International Solid-State Circuits Conference—(ISSCC), Feb. 2019, pp. 344-346, DOI: 10.1109/ISSCC.2019.8662324.

Pang et al., "A 28-GHz CMOS Phased-Array Beamformer Utilizing Neutralized Bi-Directional Technique Supporting Dual-Polarized MIMO for 5G NR", IEEE Journal of Solid-State Circuits, Sep. 2020, vol. 55, No. 9, pp. 2371-2386, DOI: 10.1109/JSSC.2020.2995039.

Pauchard et al., "Dead space effect on the wavelength dependence of gain and noise in avalanche photodiodes", IEEE Transactions on Electron Devices, Sep. 2000, vol. 47, Issue 9, pp. 1685-1693, DOI: 10.1109/16.861578.

Payne et al., "Photonic Techniques for Local Oscillator Generation and Distribution in Millimeter-Wave Radio Astronomy", International Topical Meeting on Microwave Photonics, Nov. 2002, pp. 9-12, DOI:10.1109/MWP.2002.1158847.

Perley et al., "The Expanded Very Large Array: A New Telescope for New Science", The Astrophysical Journal Letters, Sep. 20, 2011, vol. 739, No. L1, 5 pgs., doi: 10.1088/2041-8205/739/1/L1.

Poulton et al., "High-Performance Integrated Optical Phased Arrays for Chip-Scale Beam Steering and LiDAR", CLEO, Jan. 2018, 3 pgs., DOI: 1364/CLEO_AT.2018.ATu3R.2.

Rajbhandari et al., "High-Speed Integrated Visible Light Communication System: Device Constraints and Design Considerations", IEEE Journal on Selected Areas in Communications, 2015, vol. 33, No. 9, pp. 1750-1757, http://dx.doi.org/10.1109/JSAC.2015.2432551.

Razavi, "A Study of Injection Locking and Pulling in Oscillators", IEEE Journal of Solid-State Circuits, Sep. 2004, vol. 39, No. 9, pp. 1415-1424, DOI: 10.1109/JSSC.2004.831608.

Sadiku et al., "Comparison of approximate formulas for the capacitance of microstrip line", Proceedings 2007 IEEE SoutheastCon, Apr. 2007, pp. 427-432, DOI:10.1109/SECON.2007.342939.

Santiccioli et al., "17.2 A 66fsrmsJitter 12.8-to-15.2GHz Fractional-N Bang-Bang PLL with Digital Frequency-Error Recovery for Fast Locking", 2020 IEEE International Solid-State Circuits Conference—(ISSCC), Feb. 16-20, 2020, pp. 268-270, DOI: 10.1109/ISSCC19947.2020.9063094.

Scaglione et al., "Opportunistic Large Arrays: Cooperative Transmission in Wireless Multihop Ad Hoc Networks to Reach Far Distances", IEEE Transactions on Signal Processing, Aug. 2003, vol. 51, No. 8, pp. 2082-2092, DOI: 10.1109/TSP.2003.814519.

Sendonaris et al., "Increasing uplink capacity via user cooperation diversity", Proceedings, 1998 IEEE International Symposium on Information Theory (Cat. No. 98CH36252), Aug. 16-21, 1998, pp. 156, DOI: 10.1109/ISIT.1998.708750.

Sendonaris et al., "User Cooperation Diversity—Part 1: System Description", IEEE Transactions on Communications, Nov. 2003, vol. 51, No. 11, pp. 1927-1938, DOI: 10.1109/TCOMM.2003.818096.

Sendonaris et al., "User Cooperation Diversity—Part II: Implementation Aspects and Performance Analysis", IEEE Transactions on Communications, Nov. 2003, vol. 51, No. 11, pp. 1939-1948, DOI:10.1109/TCOMM.2003.819238.

Shahramian et al., "A Fully Integrated 384-Element, 16-Tile, W-Band Phased Array with Self-Alignment and Self-Test", IEEE Journal of Solid-State Circuits, Sep. 2019, first published Aug. 6, 2019, vol. 54, Issue 9, pp. 2419-2434, DOI: 10.1109/JSSC.2019.2928694.

Shillue et al., "The ALMA photonic local oscillator system", in 2011 URSI General Assembly and Scientific Symposium, IEEE, Aug. 2011, 4 pgs., https://doi.org/10.1109/ursigass.2011.6051254.

Skolnik, "Radar Handbook", Second Edition, McGraw-Hill, 1990, 36 pgs.

Strobel et al., "Communication in automotive systems: Principles, limits and new trends for vehicles, airplanes and vessels", 2010 12th International Conference on Transparent Optical Networks, Aug. 16, 2010, pp. 1-6, DOI: 10.1109/ICTON.2010.5549163.

Tao et al., "An overview of cooperative communications", IEEE Communications Magazine, Jun. 6, 2012, vol. 50, Issue 6, pp. 65-71, DOI: 10.1109/MCOM.2012.6211487.

(56) References Cited

OTHER PUBLICATIONS

Van Overstraeten et al., "Measurement of the ionization rates in diffused silicon p-n junctions", Solid-State Electronics, May 1970, vol. 13, Issue 5, pp. 583-608, https://doi.org/10.1016/0038-1101(70)90139-5.
Vorontsov et al., "Adaptive phase-distortion correction based on parallel gradient-descent optimization", Optics Letters, vol. 22, No. 12, Jun. 15, 1997, pp. 907-909.
You et al., "A 12GHz 67% tuning range 0.37pS RJrms PLL with LC-VCO temperature compensation scheme in 0.13 μm CMOS", IEEE Radio Frequency Integrated Circuits Symposium, Jun. 2014, pp. 101-104, DOI: 10.1109/RFIC.2014.6851669.
Yuan et al., "A new look at impact ionization—Part II: Gain and noise in short avalanche photodiodes", IEEE Transactions on Electron Devices, Sep. 1999, vol. 46, No. 8, pp. 1632-1639, DOI:10.1109/16.777151.
Yuan et al., "A Simple Formula for the Estimation of the Capacitance of Two-Dimensional Interconnects in VLSI Circuits", IEEE Electron Device Letters, Dec. 1982, vol. EDL-3, No. 12, pp. 391-393, DOI: 10.1109/EDL.1982.25610.
International Preliminary Report on Patentability for International Application PCT/US2021/042069, Report issued Jan. 17, 2023, Mailed on Jan. 26, 2023, 7 Pgs.
Allard et al., "Radiation pattern synthesis for arrays of conformal antennas mounted on arbitrarily-shaped three-dimensional platforms using genetic algorithms", IEEE Transactions on Antennas and Propagation, vol. 51, No. 5, pp. 1054-1062, May 2003.
Bailin et al., "The radiation field produced by a slot in a large circular cylinder", IRE Transactions on Antennas and Propagation, vol. 3, No. 3, pp. 128-137, 1955.
Bekers et al., "Mutual-coupling based phased-array calibration: A robust and versatile approach", 2013 IEEE International Symposium on Phased Array Systems and Technology, 2013, pp. 630-637.
Braaten et al., "A self-adapting flexible (selflex) antenna array for changing conformal surface applications", IEEE Transactions on Antennas and Propagation, vol. 61, No. 2, pp. 655-665, 2013.
Brautigam et al., "Terrasar-x instrument calibration results and extension for tandem-x", IEEE Transactions on Geoscience and Remote Sensing, vol. 48, No. 2, pp. 702-715, 2010.
Dokmanic et al., "Euclidean distance matrices: Essential theory, algorithms, and applications", IEEE Signal Processing Magazine, vol. 32, No. 6, p. 12-30, Nov. 2015.
Eberle et al., "The flared slot: A moderately directive flush-mounted broad-band antenna", IRE Transactions on Antennas and Propagation, vol. 8, No. 5, pp. 461-468, 1960.
Fatemi et al., "A nonuniform sparse 2-d large-fov optical phased array with a low-power pwm drive", IEEE Journal of Solid-State Circuits, vol. 54, No. 5, pp. 1200-1215, May 2019.
Fikes et al., "A framework for array shape reconstruction through mutual coupling", IEEE Transactions on Microwave Theory and Techniques, 15 pgs.
Fikes et al., "Flexible, conformal phased arrays with dynamic array shape self-calibration", 2019 IEEE IMS, 2019, pp. 1458-1461.
Gal-Katziri et al., "Scalable, deployable, flexible phased array sheets", 2020 IEEE/MTT-S International Microwave Symposium (IMS), 2020, pp. 1085-1088.
Haupt, "Genetic algorithm applications for phased arrays", Applied Computational Electromagnetics Society Journal, vol. 21, No. 3, Nov. 2006, pp. 325-336.
Haykin et al., "Modern Wireless Communication", 1st ed. New Jersey: Prentice Hall, 2004, 289 pgs.
Huang et al., "Microfluidic serpentine antennas with designed mechanical tunability", Lab on a Chip, Issue No. 21, 2014, pp. 4205-4212.
Jones et al., "A wide-band transverse-slot flush-mounted array", IRE Transactions on Antennas and Propagation, vol. 8, No. 4, pp. 401-407, 1960.
Josefsson et al., "Conformal Array Antenna Theory and Design", IEEE Press Series on Electromagnetic Wave Theory, 2006, 488 pgs.
Kobayashi et al., "Simple calculation method for conformal beam-scanning array pattern", 2019 13th European Conference on Antennas and Propagation (EuCAP), 2019, pp. 1-5.
McIntosh et al., "Fopair: a focused array imaging radar for ocean remote sensing", IEEE Transactions on Geoscience and Remote Sensing, vol. 33, No. 1, pp. 115-124, 1995.
Mercandelli et al., "17.5 A 12.5GHZ Fractional-N Type-I Sampling PLL Achieving 58fs Integrated Jitter", 2020 IEEE International Solid-State Circuits Conference—(ISSCC), Feb. 16-20, 2020, pp. 274-276, DOI:10.1109/ISSCC19947.2020.9063135.
Mizrahi et al., "Flexible phased array shape reconstruction", 2021 IEEE/MTT-S International Microwave Symposium (IMS), 2021, 3 pgs.
Natarajan et al., "A 77-ghz phased-array transceiver with on-chip antennas in silicon: Transmitter and local lo-path phase shifting", IEEE Journal of Solid-State Circuits, No. 12, pp. 2807-2819, Dec. 2006.
Rigobello et al., "Pattern recovering of conformal antenna array for strongly deformed surfaces", 2017 11th European Conference on Antennas and Propagation (EUCAP), 2017, pp. 869-871.
Schoebel et al., "Design considerations and technology assessment of phased-array antenna systems with rf mems for automotive radar applications", IEEE Transactions on Microwave Theory and Techniques, vol. 53, No. 6, pp. 1968-1975, 2005.
Sengupta et al., "A 0.28 thz power-generation and beamsteering array in cmos based on distributed active radiators", IEEE Journal of Solid-State Circuits, vol. 47, No. 12, pp. 3013-3031, 2012.
Seong et al., "Conformal array pattern synthesis on a curved surface with quadratic function using adaptive genetic algorithm", 2013 Asia-Pacific Microwave Conference (APMC), 2013, pp. 167-169.
Shipley et al., "Mutual coupling-based calibration of phased array antennas", Proceedings 2000 IEEE International Conference on Phased Array Systems and Technology (Cat. No. 00TH8510), 2000, pp. 529-532.
Vaskelaninen et al., "Iterative least-squares synthesis methods for conformal array antennas with optimized polarization and frequency properties", IEEE Transactions on Antennas and Propagation, vol. 45, No. 7, pp. 1179-1185, 1997.
Williams et al., "Origami-inspired shape-changing phased array", 2020 50th European Microwave Conference (EuMC), Utrecht, The Netherlands, Jan. 2021, pp. 344-347.
Yang et al., "Digital beamforming-based massive mimo transceiver for 5g millimeter-wave communications", IEEE Transactions on Microwave Theory and Techniques, vol. 66, No. 7, pp. 3403-3418, 2018.

\* cited by examiner

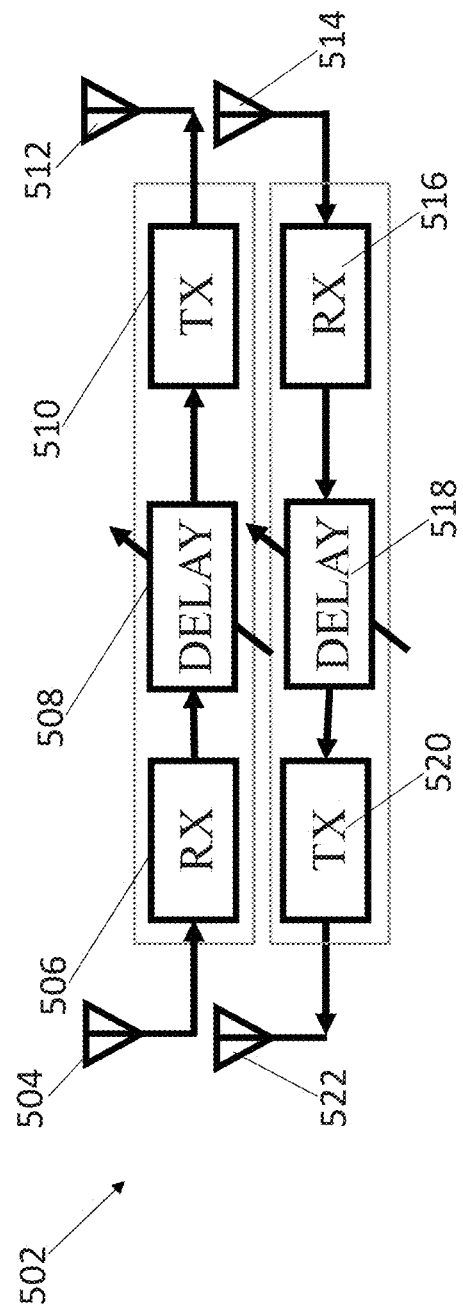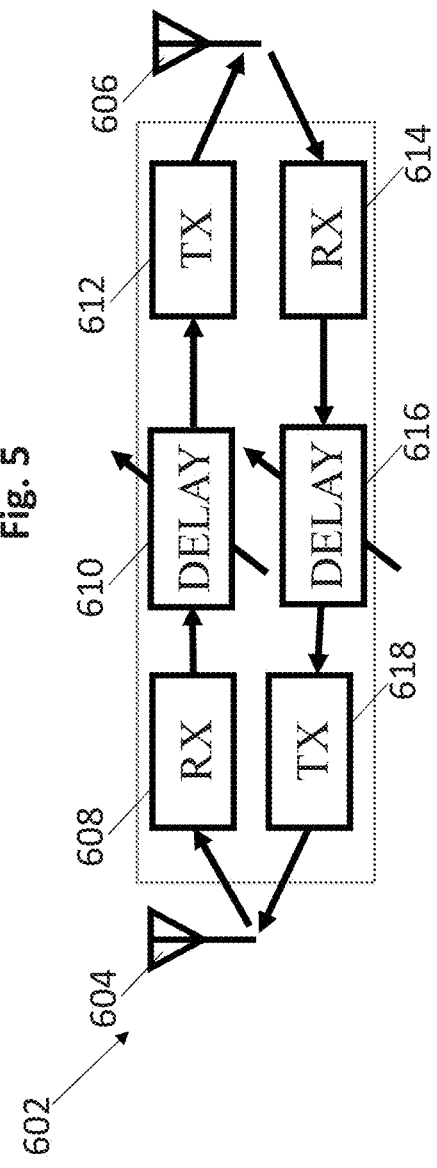

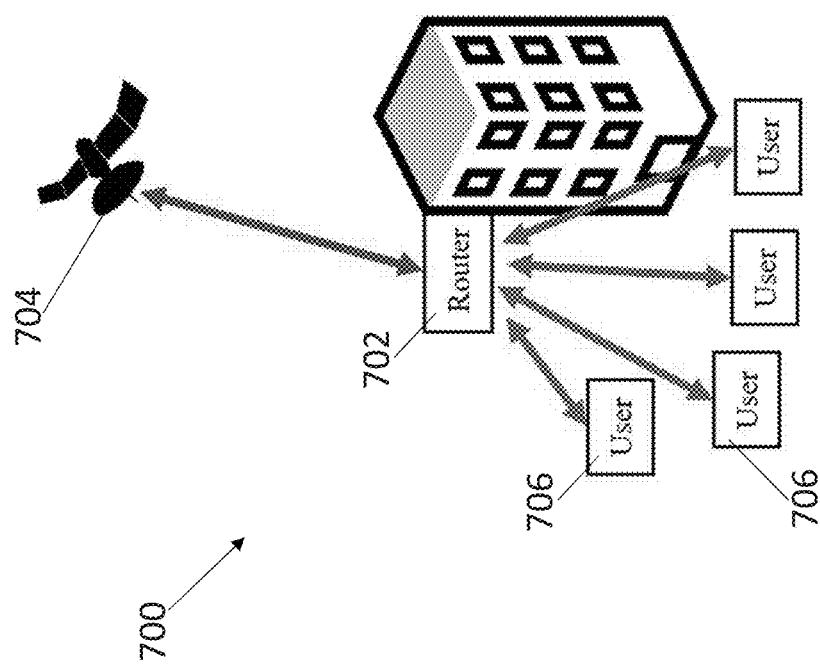

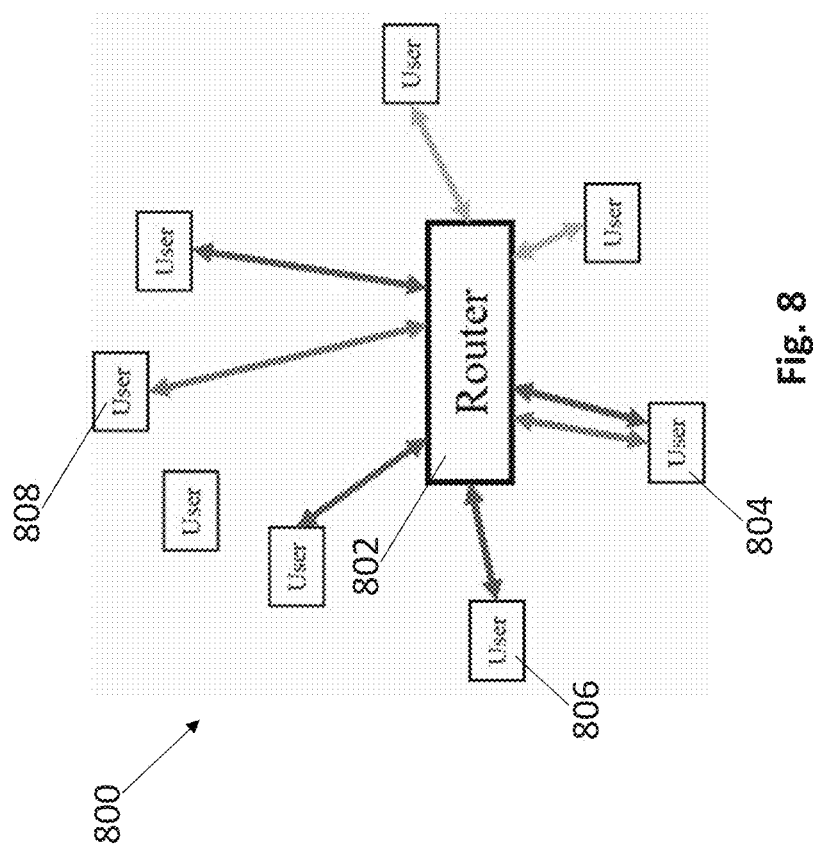

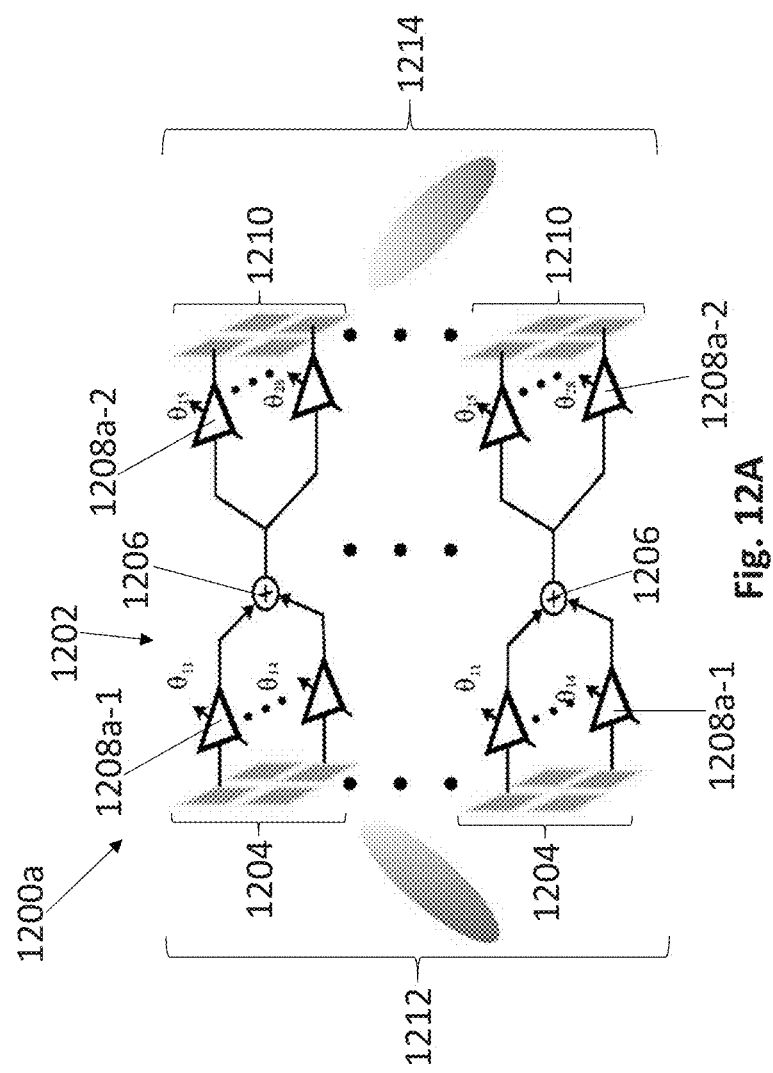

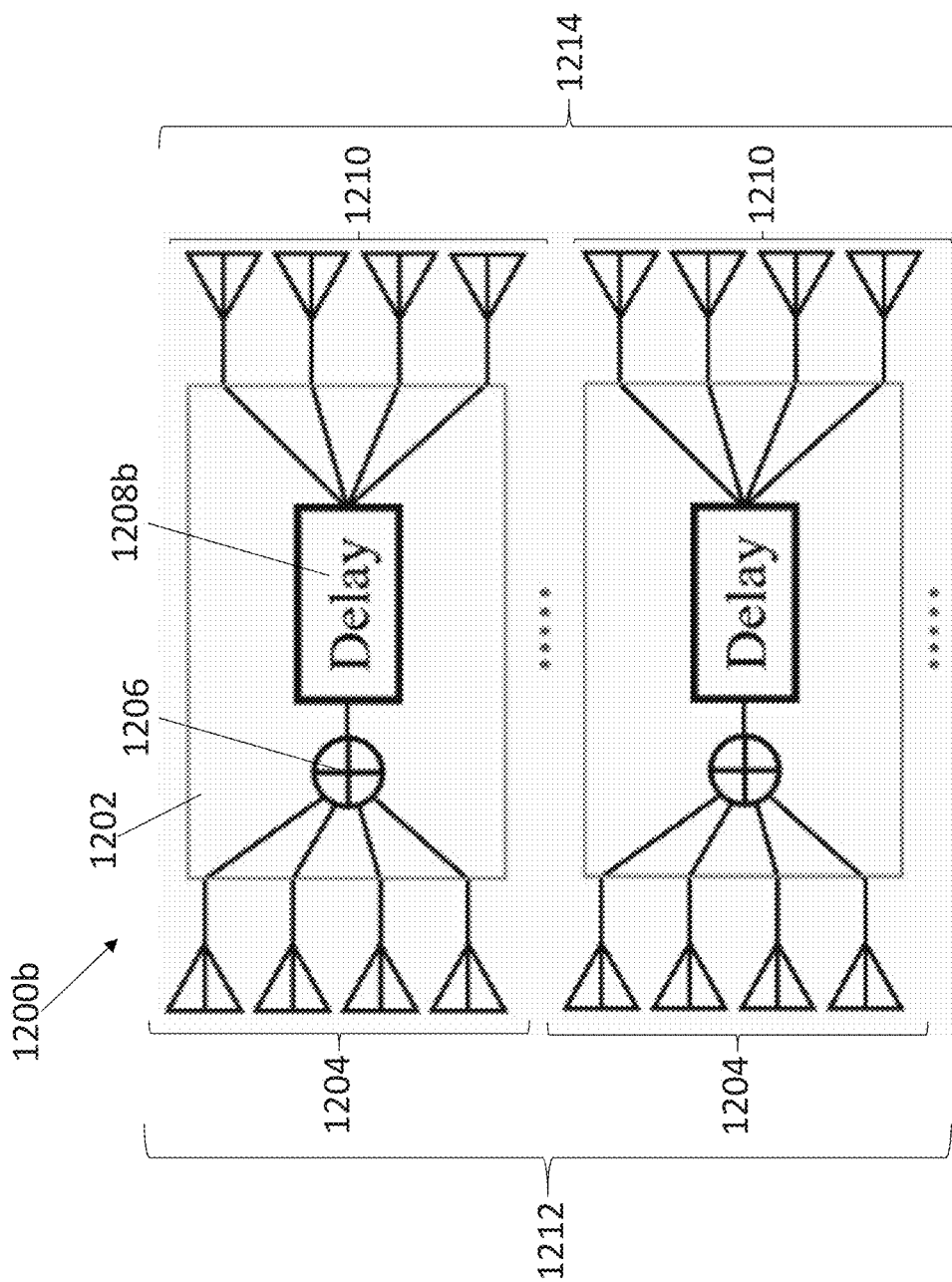

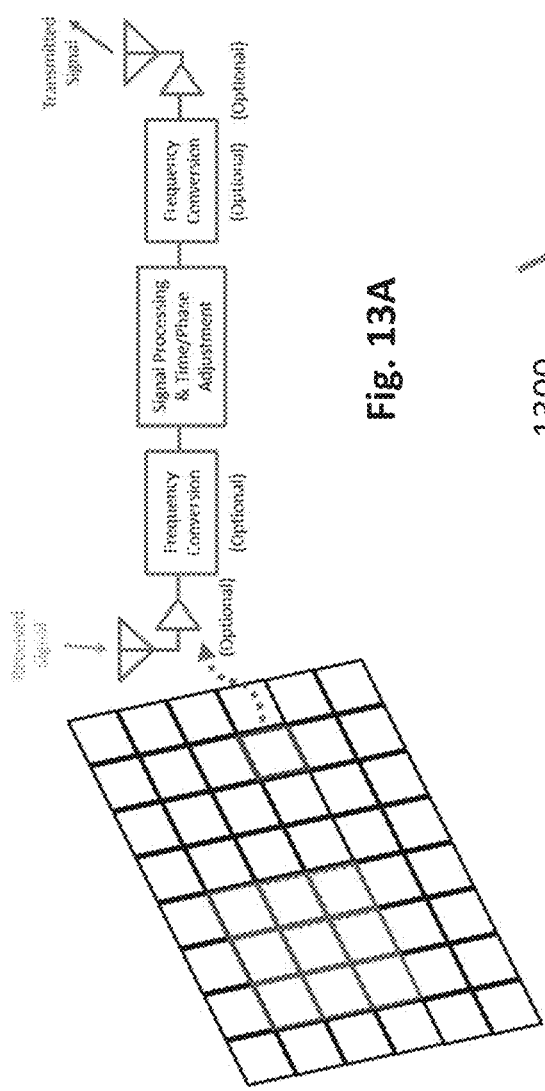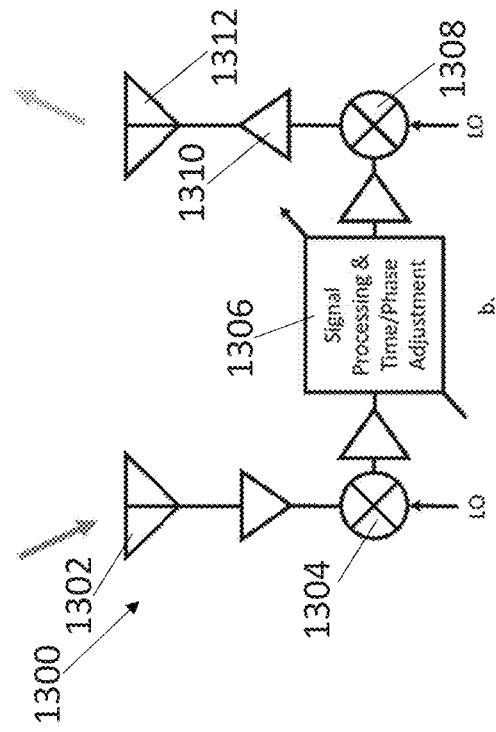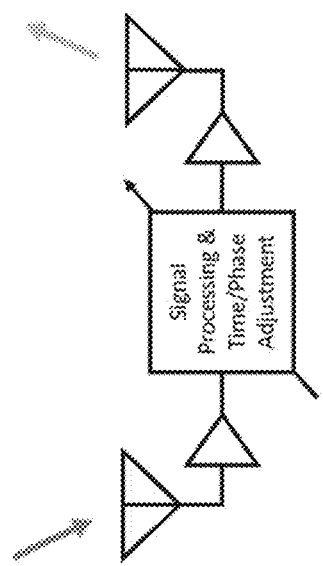
Fig. 13A
Fig. 13B
Fig. 13C

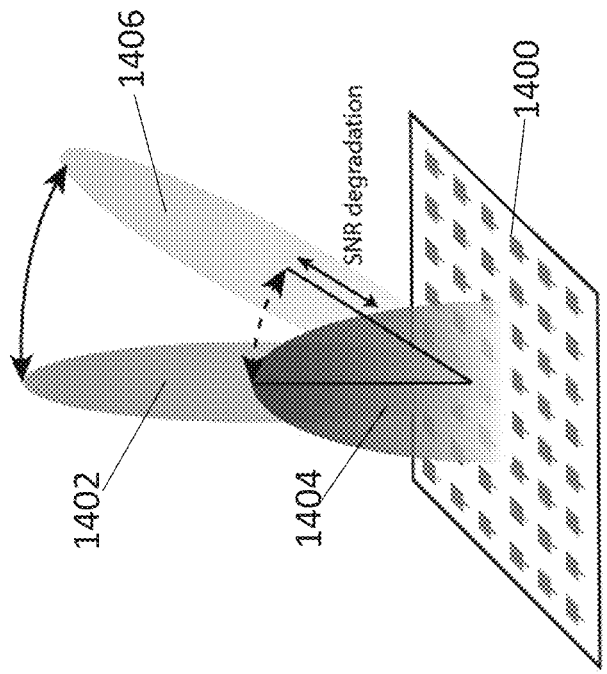
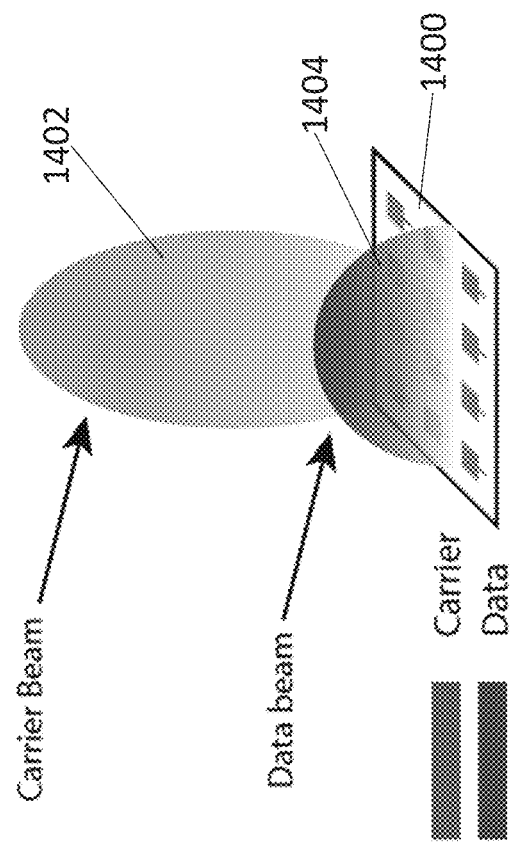
Fig. 14B
(Prior art)
Fig. 14A
(Prior art)

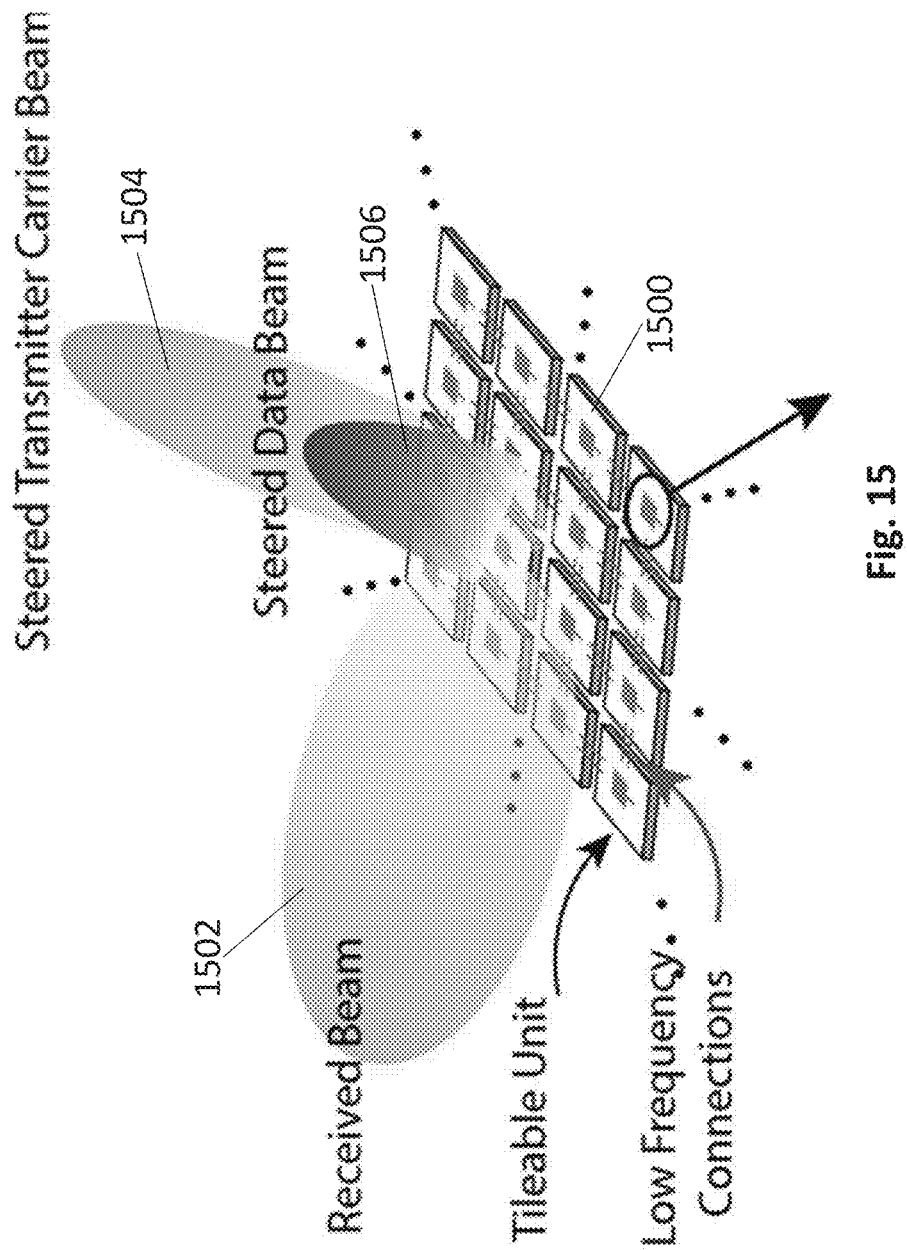

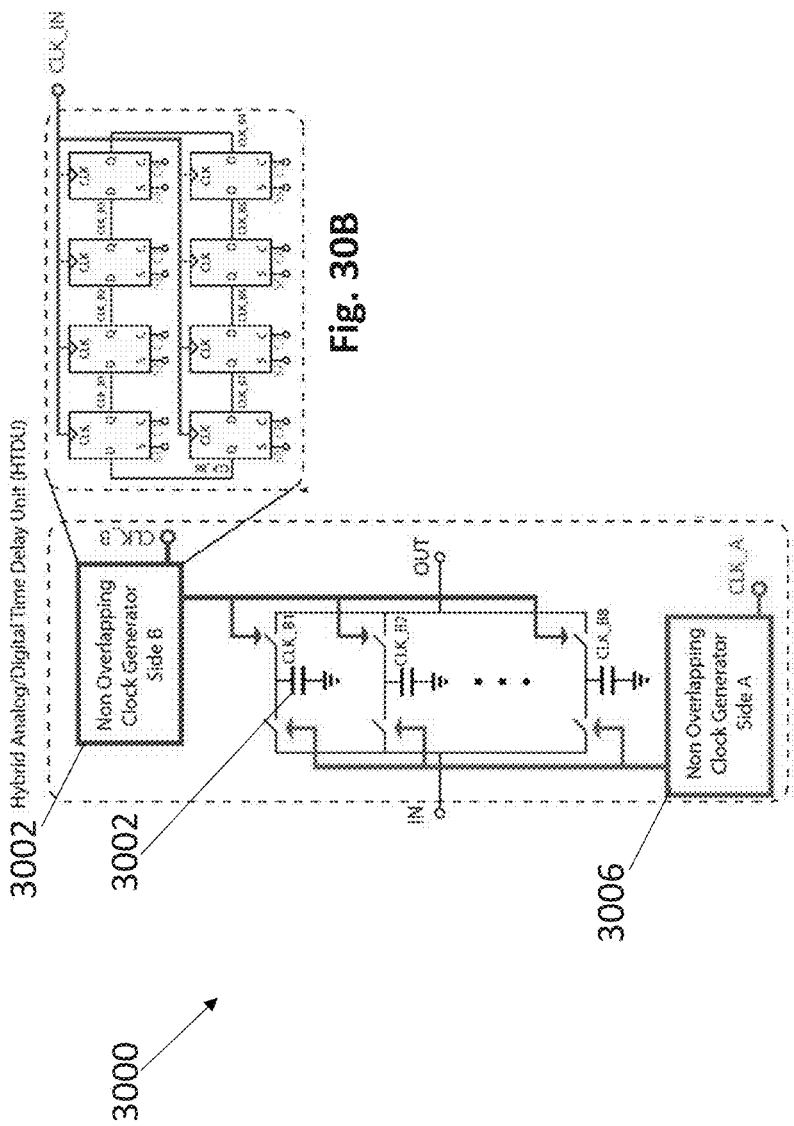

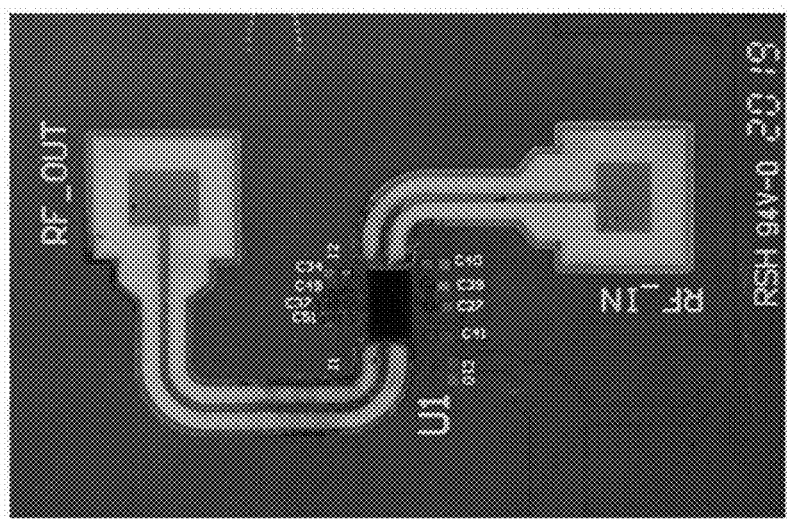
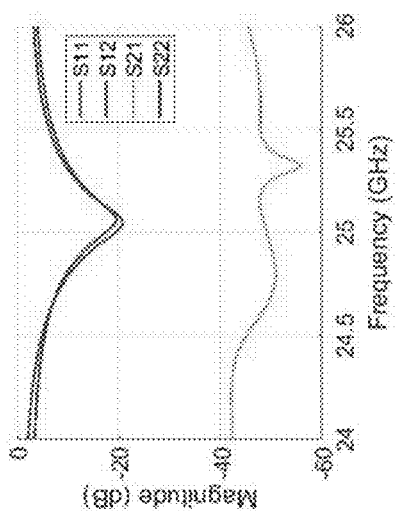
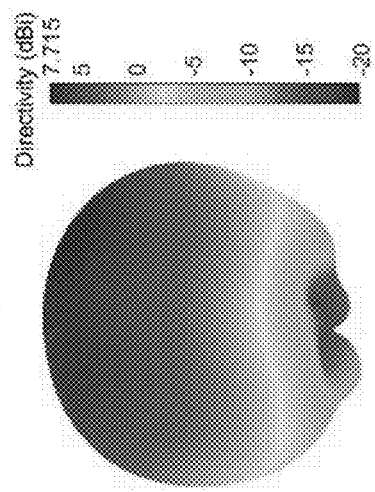
Fig. 33A
Fig. 33B
Fig. 33C

SCALABLE DECENTRALIZED REDISTRIBUTOR AND METHOD OF REDISTRIBUTING SIGNALS

CROSS-REFERENCE TO RELATED APPLICATIONS

This application is a continuation-in-part application of U.S. patent application Ser. No. 16/723,943, entitled "Spatial Redistributors and Methods of Redistributing Min-Wave Signals" and filed Dec. 20, 2019 which claims priority of U.S. Provisional Patent Application No. 62/783,011, entitled "Scalable, Agile, Electronically-Steering Conduit Array" and filed Dec. 20, 2018, U.S. Provisional Patent Application No. 62/897,764, entitled "Dynamic Scalable Decentralized Timed-Array Router" and filed Sep. 9, 2019, and U.S. Provisional Patent Application No. 62/931,634, entitled "Scalable Router Enhancements and Applications" filed Nov. 6, 2019, all of which are herein incorporated by reference in their entirety.

FIELD OF THE INVENTION

The present disclosure generally relates to wireless communications and more specifically to the use of scalable decentralized redistributors and redistributor arrays to spatially redistribute signals.

BACKGROUND

Over the last two decades, the development of mm-wave silicon ICs for communications and sensing has accelerated to answer demands for higher data rates and greater spatial selectivity. It is well known, however, that the higher the carrier frequency, the higher the propagation path losses. The short wavelength of mm-waves can also mean that objects like trees and light posts become obstacles that can block a signal. Therefore, mm-wave communication systems are typically line-of-sight and are designed to accommodate the high absorption of walls and other obstructions at these frequencies.

In many mm-wave communication systems, it can be advantageous to utilize antennas with highly directive characteristics (significant gains) to achieve long distance communication. The short wavelength of mm-waves enables the use of a very large number of antennas in a small region. Large antenna arrays can provide highly directional beamforming gains, which can help overcome some of the propagation path loss and increase link reliability. Moreover, larger antenna arrays can transmit multiple streams via spatial multiplexing.

Transmit beamforming is typically performed by controlling the amplitude and/or phase of signals provided to multiple antenna elements. Receive beamforming is also typically performed by modifying the gain and phase of signals received at multiple antenna elements and then summing the modified signals. An important prerequisite in many beamforming architectures is a phase coherent signal, which means that there is a defined and stable phase relationship between the RF carriers of the signals utilize by the RF chain of each of the antenna elements. The term RF chain is typically utilized to refer to components that process RF signals. For example, an RF chain may convert a digital baseband signal into an RF analog signal in a transmitter or may convert an RF analog signal to a digital baseband signal in a receiver (e.g. a Digital to Analog Converter (DAC) and an antenna amplifier or a Low Noise Amplifier (LNA) and an Analog to Digital Converter (ADC)). A variety of phased array beamforming architectures have been proposed for use in mm-wave communication systems including: digital beamforming arrays; analog beamforming arrays; and hybrid beamforming arrays.

The term digital beamforming array typically refers to a beamforming array, where beamforming is achieved through the adjustment of the amplitude and/or phase of the baseband signals provided to each antenna element in the digital domain by a digital signal processor. In this configuration, each antenna is connected to its own RF chain. The provision of a dedicated RF chain for each antenna element is considered by many to be prohibitive from both a cost and a power consumption perspective at mm-wave frequencies.

The term analog beamformer is typically used to describe a beamforming system that utilizes a single RF chain to generate an RF analog signal that is provided to a network of phase shifters that control the phase of the RF signals that are fed to each of the antenna elements. A disadvantage of analog beamforming is that a single RF chain typically can only support a single-stream transmission.

The term hybrid beamforming architecture is typically utilized to describe a beamformer constructed by concatenation of one or more low-dimensional digital beamformers with one or more analog beamformers (typically implemented using phase shifters). Hybrid beamforming architectures can be fully connected, partially connected, or hybrid connected. In a fully connected configuration, each RF chain is connected to each of the antenna elements in the array. In a partially connected architecture, each sub-array of antennas is only connected to a single RF chain. In a hybrid connected architecture, each sub-array of antennas is connected to a subset of the RF chains. Fully, partially, and hybrid connected mm-wave hybrid beamforming architectures are described in D. Zhang, Y. Wang, X. Li, and W. Xiang. "Hybridly connected structure for hybrid beamforming in mmWave massive MIMO systems." IEEE Transactions on Communications 66, no. 2 (2017): 662-674, the disclosure of which including the disclosure related to various hybrid beamforming architectures is hereby incorporated by reference in its entirety. It has been reported that a hybrid beamforming architecture need only utilize twice the number of RF chains as the total number of transmitted data streams for it to achieve similar performance as a fully digital beamforming scheme regardless of the number of antenna elements in the system.

Beamforming architectures typically are based on a centralized aggregation (e.g. summation), or distribution of a signal across the array. Therefore, many beamforming designs may benefit from signal connectivity between elements of an array, which in turn leads need for physical connectivity in a centralized fashion.

SUMMARY OF THE INVENTION

Demand for bandwidth is regulated by Shannon's theorem that states the maximum channel capacity is proportional to the available bandwidth and the logarithm of the signal-to-noise ratio (SNR). Improved link budgets can achieve higher data rates and system capacities, which would be beneficial for system and circuit designers. On the circuit side, there has been a push to higher frequencies (where more bandwidth is available) by improving critical circuit building block performance, e.g., power amplifier efficiency and linearity or receiver sensitivity. On the system level, there has been a move from single channel static transmitters and receivers to sophisticated programmable massive multiple-input multiple-output (MIMO) systems that can form larger apertures in transmitters and/or receivers to perform a slew of complex functions. These arrays enhance the effective isotropic radiated power (EIRP) in transmitters and sensitivity of receivers to increase the available data rates through the second key parameter in Shannon's theorem, SNR. Also, the spatial directionality and beam confinement provided by arrays enables more effective spatial partitioning of the bandwidth, leading to higher frequency reuse ratios and smaller cell sizes.

Despite these clear advantages, phased arrays face aperture scaling limitations in their centralized design. The challenge of aggregating every elemntâs signals within the array grows perniciously at higher element numbers and aperture sizes. Furthermore, for high-speed data communication, the difference in data arrival (and departure) times between elements can generate dispersion manifested as intersymbol interference (ISI) that should be dealt with through array level delays or complex equalization schemes in a centralized fashion. Even clever designs rapidly reach practical limitations of signal routing density, interface bandwidth, and data synchronization. Additionally, a centralized approach can preclude spatially and/or electrically separated apertures working together.

Various embodiments are directed to a spatial redistributor, including: an array of channels configured to receive and retransmit a signal, where each of a plurality of independently operating channels in the array comprises: at least one antenna element; an RF chain configured to apply a time delay to the received signal prior to retransmission; control circuitry configured to control the time delay applied to the received signal by the RF chain; and a reference oscillator; where the array of channels is configured to steer a signal of a first frequency in a first direction and steer a signal of a second frequency in a second direction different from the first direction.

In other embodiments, at least a plurality of the channels in the array of channels do not share a common reference oscillator signal.

In still other embodiments, controlling at least one of a time delay and a phase shift applied to the received signal achieves at least one of receive beamforming and transmit beamforming.

In still other embodiments, controlling at least one of a time delay and a phase shift applied to the received signal achieves receive and transmit beamforming.

In still other embodiments, each channel in the array of channels is further configured to apply a phase shift to the received signal prior to retransmission.

In still other embodiments, the time delay is applied to the received signal and the phase shift is applied to the time delayed signal.

In still other embodiments, the time delay and the phase shift are applied using a single adjustment of the received signal.

In still other embodiments, the antenna elements of the channels in the array of channels form an antenna array selected from the group consisting of: a one-dimensional (D) array; a two-dimensional (2D) array; and a three-dimensional (3D) array.

In still other embodiments, channels in the array of channels form at least one array selected from the group consisting of a regular array and an ad hoc array.

In still other embodiments, the antenna array comprises alternating transmit and receive antenna elements.

In still other embodiments, the antenna array comprises transmit and receive antenna elements mounted to different sides of a supporting structure.

In still other embodiments, the antenna array comprises antenna elements that are utilized as both a receive and a transmit antenna array.

In still other embodiments, the at least one antenna element of at least one of the channels in the array of channels includes at least one receive antenna element and at least one transmit antenna element.

In still other embodiments, the at least one antenna element of at least one of the channels in the array comprises a multiport antenna element that is utilized for receiving and transmitting signals.

In still other embodiments, the at least one antenna element of at least one of the channels in the array comprises a single port; and the at least one channel in the array that comprises a single port antenna element further comprises a circulator.

In still other embodiments, at least a plurality of the channels in the array of channels apply at least one of a time delays and a phase shift directly to a received RF signal.

In still other embodiments, at least a plurality of the channels in the array of channels perform frequency conversion and apply a time delay and apply a phase shift to an intermediate frequency (IF) signal.

In still other embodiments, at least a plurality of the channels in the array of channels perform frequency conversion and apply time delays and apply phase shifts to a base band (BB) signal.

In still other embodiments, the frequency conversion comprises down conversion and up conversion.

In still other embodiments, the received signal has a carrier frequency with a first frequency and the up conversion is to a carrier frequency at a second frequency that is different to the first frequency.

In still other embodiments, at least a plurality of the channels in the array of channels apply at least one of a time delay and a phase shift to a received analog signal.

In still other embodiments, the at least a plurality of the channels in the array of channels that apply at least one of a time delay and a phase shift to the received analog signal are configured to: perform frequency conversion to convert the received signal to an IF signal; obtain analog samples of the received signal; and apply delays to the analog samples of the received signal.

In still other embodiments, obtaining analog samples of the received signal comprises sampling the received signal onto a set of parallel switched capacitors; and applying delays to the analog samples of the received signals comprises controlling the delay between the sampling of the received signal onto the capacitors in the set of parallel switch capacitors and the readout of the capacitors in the set of parallel switched capacitors.

In still other embodiments, each of the at least a plurality of the channels in the array of channels that apply delays to analog signals further comprises two non-overlapping clock generators (NOCs) that control the sampling of the received signal onto the capacitors in the set of parallel switch capacitors and the readout of the capacitors in the set of parallel switched capacitors.

In still other embodiments, at least a plurality of the channels in the array of channels have reference oscillators that produce different time bases.

In still other embodiments, at least a plurality of the channels in the array of channels are configured to: digitize the received signal; apply time delays and phase shifts to the digitized signal; generate an analog signal using a digital to analog converter; and retransmit a signal based upon the generated analog signal.

In still other embodiments, the array of channels forms a spatial router configured to utilize routing information to dynamically adjust the manner in which received signals are redirected.

In still other embodiments, the spatial router comprises at least one channel configured to decode data modulated onto the received signal and extract routing information from the decoded data.

In still other embodiments, the routing information comprises at least one geometric angles, location coordinates, and an identifier.

In still other embodiments, the reference oscillator of at least a plurality of channels in the array is a free running oscillator.

In still other embodiments, at least a plurality of channels in the array are bidirectional channel.

In still other embodiments, at least a plurality of channels in the array are mobile.

Further, various embodiments are directed to a communication system, comprising: one or more base stations, wherein each base station comprises a transmitter; a first layer of one or more spatial redistributors; a second layer of one or more spatial redistributors; wherein each of the spatial redistributors of the first layer and second layer of one or more spatial redistributors comprises: an array of channels configured to receive and retransmit a signal, where each of a plurality of independently operating channels in the array comprises: at least one antenna element; an RF chain configured to perform frequency conversion of the received signal and apply at least a time delay and a phase shift to an intermediate frequency (IF) signal prior to upconversion and retransmission; control circuitry configured to control the time delay and the phase shift applied to the received signal by the RF chain; and a reference oscillator; a plurality of communication devices, wherein each communication device comprises a transmitter and a receiver; wherein at least one of the communication devices communicates with the base station through the first layer and the second layer of one or more spatial redistributors.

In other embodiments, at least one of the spatial redistributors of the first layer redirects a signal from at least one of the base stations through at least one of the spatial redistributors of the second layer.

Further, various embodiments are directed to a spatial redistributor, comprising: an array of channels configured to receive and retransmit a signal, where each of a plurality of independently operating channels in the array comprises: an in phase RF chain configured to apply a first time delay to the received signal prior to retransmission; a quadrature RF chain configured to apply a second time delay to the received signal prior to retransmission; a first down converting mixer which receives a signal from a local oscillator and down converts the received signal in the in phase RF chain prior to the first time delay; a second down converting mixer which receives a signal from the local oscillator and down converts the received signal in the quadrature RF chain prior to the second time delay.

In other embodiments, each of the plurality of independently operating channels in the array further comprises: a first up converting mixer which receives a signal from the local oscillator and up converts the received signal in the in phase RF chain after the first time delay; and a second up converting mixer which receives a signal from the local oscillator and up converts the received signal in the quadrature RF chain after the second time delay, wherein the up converted signal from the in phase RF chain and the up converted signal from the quadrature RF chain are merged to create an output signal.

BRIEF DESCRIPTION OF THE DRAWINGS

FIG. 5 conceptually illustrates the bidirectional capability of a decentralized signal redistributor according to an embodiment of the invention.

FIG. 6 conceptually illustrates a bidirectional channel pair of a decentralized signal redistributor according to an embodiment of the invention.

FIG. 7 illustrates a communication system employing a spatial redistributor according to an embodiment of the invention.

FIG. 8 illustrates a communication system employing a spatial redistributor according to an embodiment of the invention.

FIGS. 12A and 12B illustrate various embodiments of spatial redistributors incorporating hybrid time delay beam forming arrays in accordance with embodiments of the invention.

FIGS. 13A to 13D conceptually illustrate various embodiments of spatial redistributors in accordance with embodiments of the invention.

FIG. 14A conceptually illustrates dispersion experienced by broadband signals transmitted using a phased array antenna.

FIG. 14B conceptually illustrates attenuation that can occur due to squinting errors when a phased array attempts to perform beam steering of a wide bandwidth signal relative to an RF carrier.

FIG. 15 illustrates use of time delay beamforming by a spatial redistributor in accordance with an embodiment of the invention to reduce squinting errors in wideband signals.

FIG. 30A illustrates multiple switched capacitors placed in parallel in an n-path configuration to implement a hybrid analog/digital time delay in accordance with an embodiment of the invention.

FIG. 30B shows the input and output switches of the parallel switched capacitors controlled by two separate non-overlapping clock generators (NOCs) in accordance with an embodiment of the invention.

FIGS. 33A-33C are an image of a scalable redistributor fabricated on an integrated circuit and various plots describing various attributes of antennas on the integrated circuit.

DETAILED DESCRIPTION

Turning now to the drawings, redistributors and methods of routing signals in accordance with various embodiments of the invention are illustrated. In some embodiments, the redistributors are hardwired to redirect incident signals. In several embodiments, the redistributors are routers configured to receive routing information which is used to route an incident signal. In many embodiments of the invention, the redistributors utilize a decentralized redistributor array design that can selectively receive multiple signals from several desired incident angles and re-transmit them in other arbitrary directions with minimal data distortion. Such redistributors can unite smaller spatially and electrically separated apertures to produce an effective large aperture at high data rates in a decentralized and dynamic fashion.

In some embodiments, multiple layers of redistributors may communicate with one or more base stations. The multiple layers of redistributors pass a signal from the base station to one another and then pass the signal to a communication device. High frequency signals can degrade quickly based on path loss and thus it is advantageous to have the signal passed among multiple redistribiutors on its way to the communication device.

In some embodiments, the signal may be down converted then a delay is added to the signal. The down converted signal can be up converted into the final signal. Phase noise may be canceled by down converting and then up converting the signal which may increase signal to noise ratio. In some embodiments, a dual beam redistributor array may be used to independently steer beams at multiple different frequencies which may increase the amount of data which may be sent through the network.

Decentralized Signal Redirecting Systems

The ability to operate multiple elements to form a decentralized, non-uniform, and/or dynamically changing array can open a plethora of new opportunities. For instance, locally-powered arrays of elements with no timing reference synchronization can be deployed, gradually built-up, and changed over time across unused walls, ceilings, and buildings surfaces at multiple locations. Furthermore, future infrastructure can allow such systems to be incorporated into various platforms, such as mobile devices, vehicles, building infrastructures, airborne systems, and satellites. Such arrays may include decentralized operation with dynamically moving elements.

Figure 1:
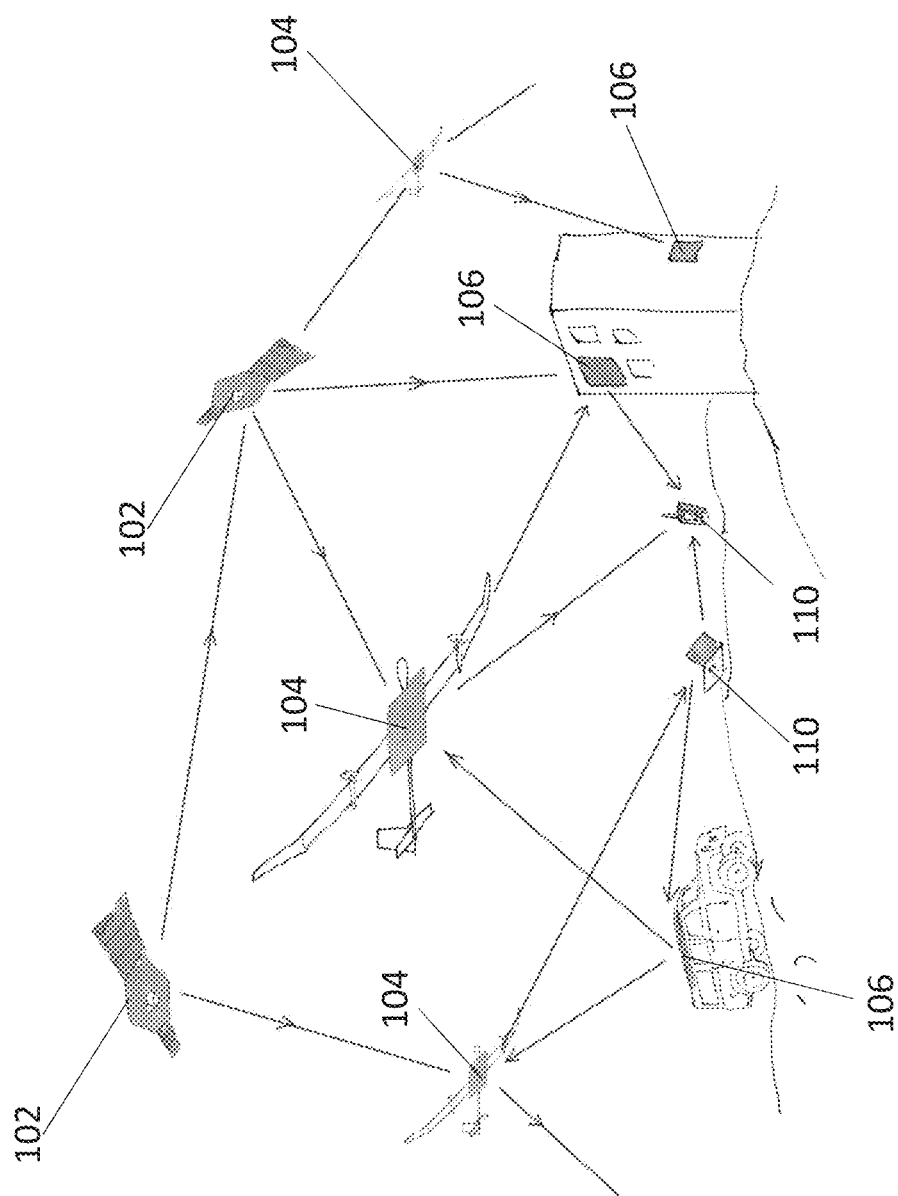
FIG. 1 illustrates a decentralized signal redirecting system in accordance with an embodiment of the invention.

A decentralized signal redirecting system in accordance with an embodiment of the invention is illustrated in FIG. 1. The decentralized signal redirecting system may transmit signals through one or more layers of redistributors. For example, one layer of redistributors may be placed on aircraft and another layer of redistributors may be placed on buildings. A base station may broadcast a signal to one layer of redistributors which passes the signal to another layer of redistributors and then to a communication device. Further, the redistributors may be placed on static objects, such as a mounting post or a building, or mobile objects, such as satellites, airplanes, or automobiles. The redistributors may be useful in a variety of applications such as terrestrial communications and satellite communications. In the illustrated embodiment, one or more base stations are mounted on one or more satellites 102 which orbit the earth. The satellites 102 may broadcast signals to redistributors mounted on one or more moving or non-moving objects 104 such as aircraft. The redistributors mounted on the objects 104 may further direct signals to one or more redistributors 106 mounted on various places such as the side of a building or on an automobile. The redistributors 106 may communicate with one or more communication devices 110 such as a personal computer, a laptop, a handset, and/or a telephone. The communication devices 110 may also include redistributors which may communicate with other communication devices. The communication devices 110 may also broadcast signals which may be transmitted back through the redistributors 106 mounted on the automobile or the side of the building or the redistributors mounted on aircraft 104 back to the base stations mounted on the satellites 102.

Figure 2:
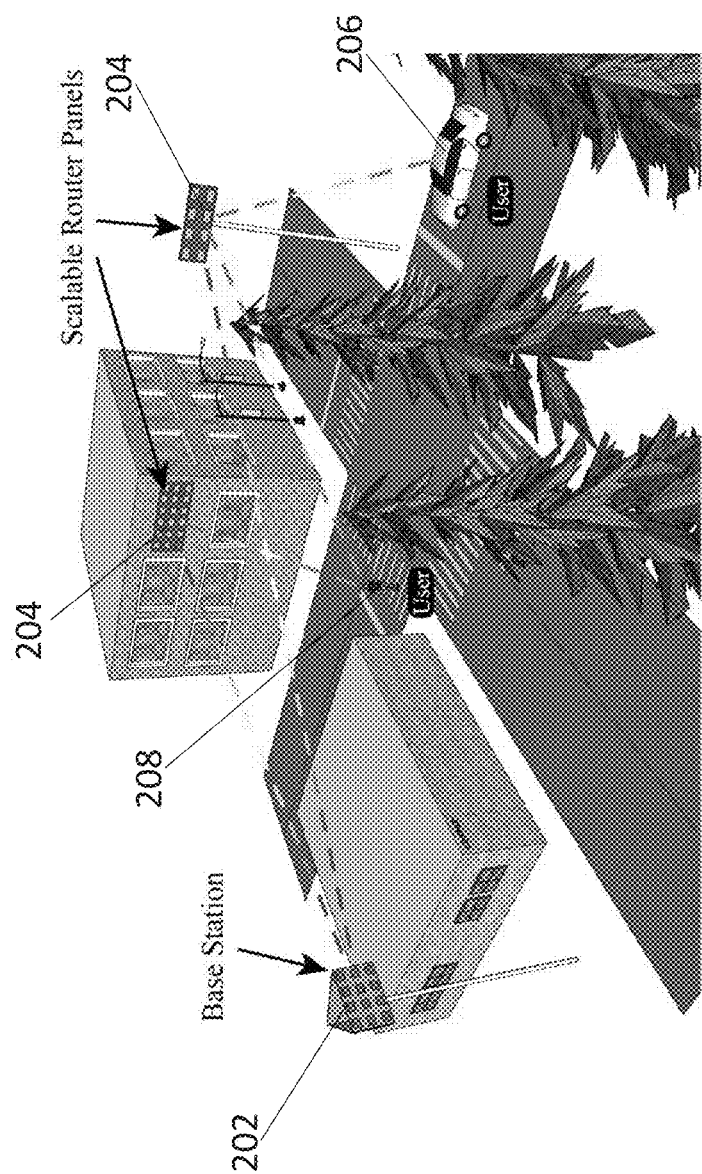
FIG. 2 illustrates a decentralized signal redirecting system in accordance with an embodiment of the invention.

A decentralized signal redirecting system in accordance with an embodiment of the invention is illustrated in FIG. 2. The decentralized signal redirecting system may transmit a signal from a base station to multiple redistributors placed in various locations which redirects the signal to a user. Multiple redistributors may direct a signal to a single user or a single redistributor may redirect a signal to a user. The decentralized signal redirecting system can include one or more base stations 202 that each can broadcast one or more signals to one or more redistributors 204. As illustrated, these redistributors 204 may be mounted on stationary objects such as buildings or be freestanding. The redistributors 204 may route the signal from the basestations 202 to one or more communication devices 206/208. The communication devices 206/208 may include various wireless communications devices such a telephones, smartphones, or tablets. Also the communication devices 206/208 may be in a vehicle and the vehicle may be wireless connected to the redistributors 204. The wireless communication devices may also send signals to the redistributors 204 to be routed to the basestations 202.

Figure 3:
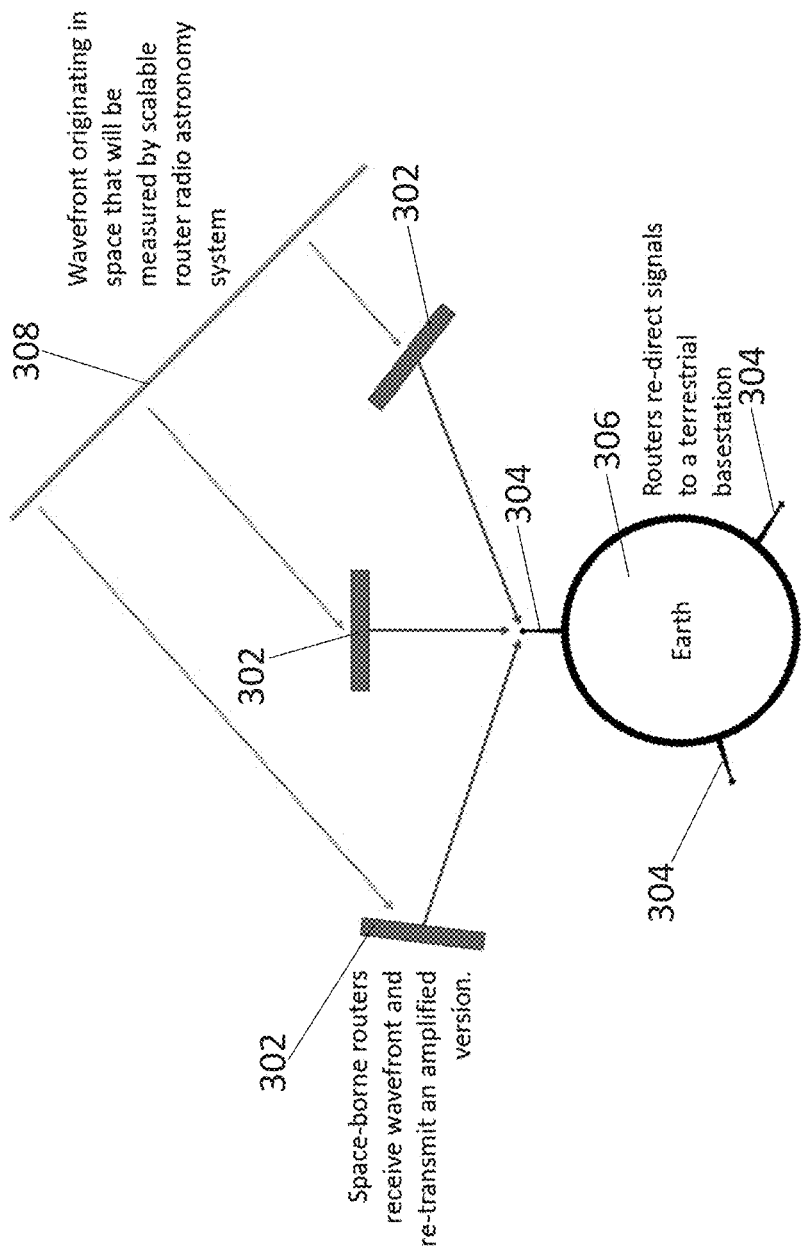
FIG. 3 illustrates a decentralized signal redirecting system in accordance with an embodiment of the invention.

Another decentralized signal redirecting system is accordance with an embodiment of the invention is illustrated in FIG. 3. The redistributors may be used for measuring space based radio signals such as for radio astronomy systems. Many microwave sensing and imaging applications may benefit substantially from large sparse apertures. These large apertures can allow for narrow beams which can be used to improve imaging resolution (coming at the cost of grating lobes). Because of the redistributor as ability to have separate branches coherently combining their received signals, it can allow large sensing apertures to be formed. These apertures can be used for terrestrial radar, imaging, and mapping tasks applications. They could also be used for radio astronomy. Radio astronomy is the study of signals at radio frequencies originating in deep space. The illustrated radio astronomy system includes one or more redistributors 302 which are in communication with one or more basestations 304 located on earth 306. The redistributors 302 may reroute wavefront 308 originating in space to the basestations 304 located on earth 306. Radio astronomy systems typically achieve large apertures by having several stations positioned kms (or 1000 s of km) apart on earth. By launching several satellites or spacecraft bearing redistributors 302 into space a system with a sparse aperture much larger than terrestrial bound systems could be formed. The space borne routers 302 would re-direct their received signals towards the basestation 304 (or network of basestations) on earth. This would allow very large apertures to be formed. Another advantage of the system is that the movement of the space borne routers could also be used with synthetic aperture techniques to further increase aperture size or address issues with aperture sparseness if they arise.

Moreover, although many embodiments exhibit various systems in association with various embodiments of decentralized signal redirecting systems, it should be understood that any combination of the various structural and functional elements of such decentralized signal redirecting systems can be included and/or omitted in any number of decentralized signal redirecting system designs or redistributor designs discussed below.

Bidirectional Spatial Relays and Spatial Routers

Figure 4:
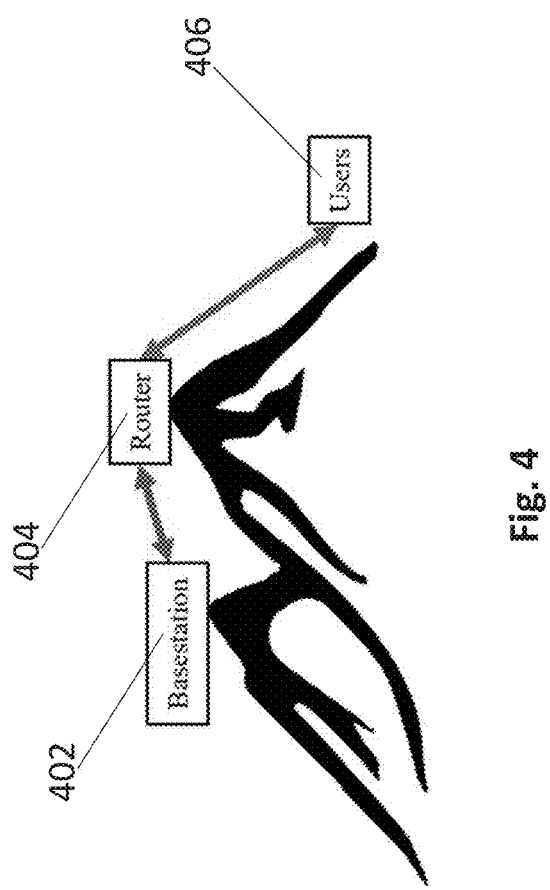
FIG. 4 conceptually illustrates a spatial relay to spatially redirect a transmission from a basestation to a user according to an embodiment of the invention.

Spatial relays are redistributors that are configured to route received signals in a predetermined manner and can be particularly useful for redirecting a transmission around obstacles. Use of a spatial relay 404 to spatially redirect a transmission from a basestation 402 to a user 406 is conceptually illustrated in FIG. 4. In a number of embodiments, spatial distributors are bidirectional (meaning the ability to transmit and receive in both directions, which allows full duplex communication between a transceiver pair).

Bidirectional capability can be achieved by using pairs of separate channels (one for each direction of communication) to construct receive and transmit antenna arrays as conceptually illustrated in FIG. 5. In the illustrated embodiment, a bidirectional channel pair 502 is shown that can be utilized within an array of bidirectional channel pairs. The bidirectional channel pair 502 has a first channel including a receive antenna 504, a receiver AFE 506, a time/phase adjustment unit 508, a transmit power amplifier 510, and a transmit antenna element 512 and a second channel that also includes a receive antenna 514, a receiver AFE 516, a time/phase adjustment unit 518, a transmit power amplifier 520 and a transmit antenna element 522. The two channels can largely operate independently and the combined operation of multiple bidirectional channel pair 502 can result in receive beamforming in at least a first direction and a second direction and transmit beamforming of at least a third direction and a fourth direction.

A bidirectional channel pair can also be constructed using antenna elements that act as a receive array antenna element in a first channel and a transmit array antenna element in a second channel as illustrated in FIG. 6. In the illustrated embodiment a first channel is formed by the bidirectional channel pair using a first antenna element configured as a receive antenna 604 and a second antenna element 606 configured as a transmit antenna element. The first channel includes a receiver AFE 608, a time/phase adjustment unit 610, and a transmit power amplifier 612. A second channel can be formed by the bidirectional channel pair using the second antenna element 606 as a receive antenna and the first antenna element 604 as a transmit antenna element. The second channel also includes a receiver AFE 614, a time/phase adjustment unit 616, and a transmit power amplifier 618. In several embodiments, the first. 604 and second 606 antenna elements can be multi-port antenna elements that transmit and receive using different polarizations. In several embodiments, the first 604 and second 606 antenna elements can also be implemented as single port antenna elements in combination with circulators.

In many embodiments, a single time-multiplexed redistributor is utilized to achieve bidirectional communication, with alternating time slots allocated for each direction of communication. Bidirectional capability can also be achieved using additional circuitry within a channel. One such embodiment uses directional circuit elements (for example circulators) to achieve bidirectionality. Another embodiment uses frequency multiplexing to accomplish bidirectionality, with different frequencies being used for each direction of communication. As can readily be appreciated, the specific mechanism that is utilized within a spatial redistributor to achieve bidirectional transmission is largely dependent upon the requirements of a specific application. In addition, the scalability of spatial redistributors in accordance with many embodiments of the invention means that arrays of bidirectional channel pairs can be constructed using multiple different types of bidirectional channel pairs as appropriate to the requirements of specific applications in accordance with various embodiments of the invention.

While various configurations of bidirectional channel pairs that can be utilized to implement redistributors are described above with reference to FIGS. 5 and 6, bidirectional communication can be achieved in communication systems that utilize redistributors using any of a variety of techniques and transceiver designs as appropriate to the requirements of specific applications. Furthermore, use of bidirectional channel pairs and/or bidirectional communication is not limited to spatial relays. Communication systems in accordance with many embodiments of the invention perform bidirectional communication using bidirectional routers, which may also be constructed using bidirectional channel pairs in accordance with various embodiments of the invention. Spatial router configurations that can be utilized in a variety of applications in accordance with various embodiments of the invention are discussed further below.

Moreover, although various systems are described above with reference to FIGS. 1-6, it should be understood that any combination of the various structural and functional elements of such redistributors can be included and/or omitted in any of the decentralized signal redirecting systems or redistributors discussed throughout.

Redistributor Configurations

Redistributors can be utilized as spatial routers in a variety of applications and systems in accordance with many embodiments of the invention. In several embodiments, the spatial router is able to dynamically change the manner in which received signals are directed by adjusting the time and phase adjustments applied by the channels within the spatial router. In applications including (but not limited to) broadcasting applications, spatial routers can be unidirectional. In other applications, spatial routers can utilize bidirectional channel pairs in the manner described above to provide bidirectional signal redistribution.

A spatial router may use a variety of techniques to determine the desired direction of reception and transmission for a given signal. In certain embodiments, the spatial router obtains routing information via a sideband channel. In various embodiments, the spatial router receives routing information within a transmitted data stream. For example, direction of arrival, direction of departure, duration, and/or other information can be encoded in header data within a transmitted data stream received by a spatial router. The spatial router can interpret this header then establishes the correct delay settings to route the signal and/or packet of data to the correct direction. The direction and/or other information can also be encoded in the signal transmitted through the router but in an orthogonal waveform to the carrier. Several embodiments include direction information and/or packet data encoded in amplitude/phase, phase/amplitude, two different frequency bands, as well as other aspects of the received signal. It is also possible to use algorithmic optimization to find the delay setting for each element that provides the best channel between a transmitter and a receiver. This could use additional communication between the receiver and the router. A spatial router embodiment may also switch between different routing configurations on a predetermined pattern rather than dynamically determining where signals should be routed. Accordingly, the specific manner in which a spatial router in accordance with various embodiments of the invention determines the manner in which to redirect transmitted signals is largely dependent upon the requirements of specific applications. Channels that are capable of obtaining routing information from a received signal and dynamically reconfiguring based upon the obtained routing information are discussed further below.

A number of applications that incorporate spatial routers can be categorized as incorporating "river delta" configurations. A communication system employing a spatial router in a typical "river delta" configuration is conceptually illustrated in FIG. 7. The communication system 700 can use the spatial router 702 to redirect transmissions between a common node 704 (shown as, but not limited to, a satellite) and many users 706 that the common node serves. As noted above, the spatial router can enable bidirectional communication between the common node 704 and the users 706.

Another set of applications can be more aptly described as employing "true hub" configurations. In these configurations, a spatial router is often switching between many different users, serving multiple users in both directions. One such system 800 is a local wireless network where the spatial router 802 guides transmitted data from a transmitter 804 to the receiver of one or more intended targets 806, 808 as conceptually illustrated in FIG. 8.

While "river delta" and "true hub" descriptors encompass several possible use cases, a communication system can reconfigure one or more spatial routers to switch between these states or operate in other states. Furthermore, while the spatial routers described above with respect to FIGS. 7 and 8 are static. Spatial routers in accordance with many embodiments of the invention can be mobile. In addition, the spatial routers in accordance with several embodiments of the invention can redistribute transmissions from transmitters that may be moving to receivers that may also be moving. In this way it is important to appreciate that the ability of a spatial redistributors to perform dynamic receive and transmit beamforming can enable the use of redistributors, including (but not limited to) spatial relays and spatial routers, in circumstances in which one or more of a transmitter, a redistributor, and a receiver are mobile and/or in motion. Furthermore, redistributors can be implemented in a distributed fashion in which multiple channels and/or arrays of channels mounted in different locations cooperate. Accordingly, spatial routers and redistributors in accordance with various embodiments of the invention should be understood as not limited to any specific configuration.

Moreover, although various systems are described above with reference to FIGS. 7 and/or 8, it should be understood that any combination of the various structural and functional elements of such redistributors can be included and/or omitted in any of the decentralized signal redirecting systems or redistributors discussed throughout.

Distributed Spatial Redistributors

As rioted above, redistributors in accordance with various embodiments of the invention can be implemented using multiple channels that do not have a shared frequency reference. Channels that do not have a shared frequency reference can be well suited for implementation of a redistributor that is physically distributed in addition to electronically distributed. If a shared reference is still desired for a physically distributed system a wireless reference may be used. A redistributor may have little or no mechanical connection elements but is still capable of coherent signal combining. Physically distributed redistributors can be utilized in applications including (but are not limited to): as a redistributor with elements distributed across buildings/rooms, a redistributor with elements distributed across several moving and/or static objects such as (but not limited to) boats, drones, aircraft, satellites, cars, and buildings; and/or a redistributor with elements distributed among personal electronics such as cell phones. As can readily be appreciated, the manner in which physically distributed channels can cooperate to form a redistributor is largely only limited by the requirements of specific applications.

Figure 9:
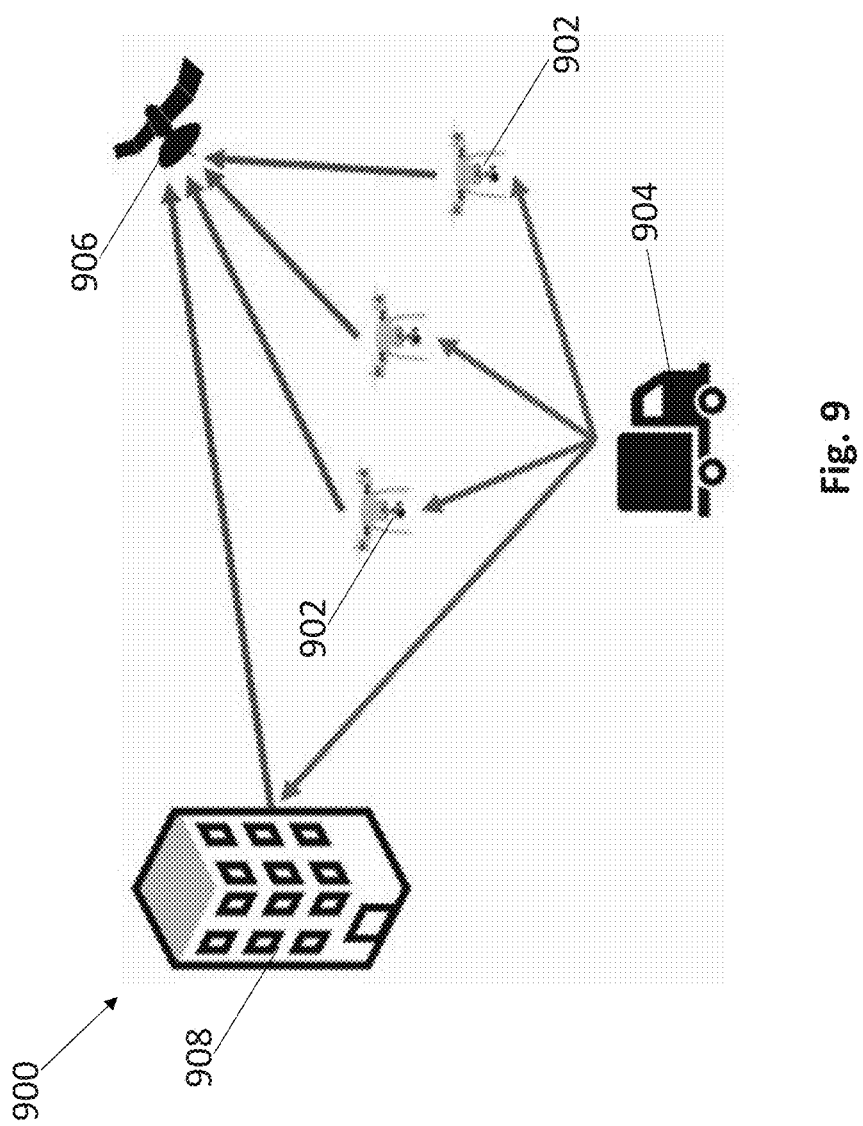
FIG. 9 illustrates a communication system including a spatial redistributor that is formed by a number of channels according to an embodiment of the invention.

The manner in which multiple distributed channels can coordinate to form a redistributor in accordance with an embodiment of the invention is conceptually illustrated in FIG. 9. The communication system 900 includes a redistributor that is formed by a number of channels 902. In the illustrated embodiment, the channels are mounted to moving drones. As can readily be appreciated the one or more channels mounted to each drone collectively form an array of channels. The array of channels can cooperate to collectively perform receive beamforming between a transmitter 904 and a receiver 906. In several embodiments, the channels are coordinated by performing a process that optimizes a cost function (e.g. maximum SNR/maximum strength/minimum BER, etc.) at the receiver by modifying the time and/phase adjustments applied by each channel. In a number of embodiments, the relative distances between the channel and the receiver can be measured (e.g. using time of flight sensors, multiview stereo cameras, radar, GPS measurements, etc.) and the measurements used to calculate time and/or phase adjustments to apply in each channel or a set of time and/or phase adjustment combinations to try using an optimization process similar to the process described above. In the illustrated embodiment, reflections 908 of the transmitted signal are also considered. In several embodiments, the time delays introduced by the channels 902 are determined based upon one or more reflected signals in the environment. In this way, the redistributor can achieve additional SNR gains at the receiver by generating a wavefront that is coherent with dominant reflections in the direction of the receiver.

Figure 10:
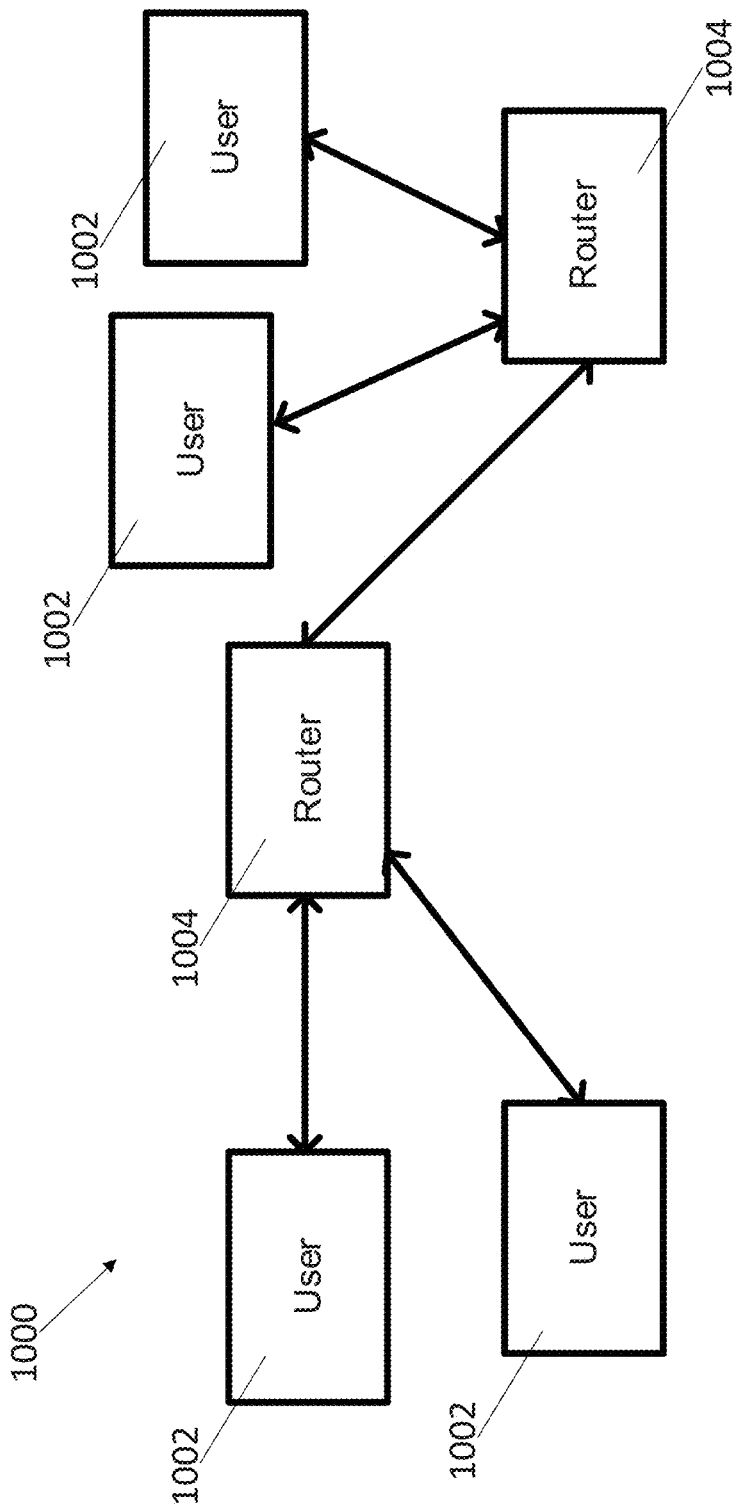
FIG. 10 illustrates a communication system in which users communicate via a series of redistributors according to an embodiment of the invention.

In addition to multiple distributed channels being able to cooperate to form a redistributor, communication systems in accordance with many embodiments of the invention can also employ multiple redistributors to direct a signal from a transmitter to a receiver. A communication system in which users 1002 communicate via a series of routers 1004 that are capable of redirecting signals transmitted to another user to another router and then eventually onto the receiver of the intended recipient of the signal is conceptually illustrated in FIG. 10. As can readily e illustrated FIG. 10 illustrates the broader concept of using a series of redistributors to enable transmitters to direct signals to receivers, which are otherwise unable to communicate via a direct line of site (or other) transmission.

Moreover, although an example system is described above with reference to FIG. 9, it should be understood that any combination of the various structural and functional elements of such redistributors can be included and/or omitted in any of the decentralized signal redirecting systems or redistributors discussed throughout.

Examples of Redistributors

Figure 11:
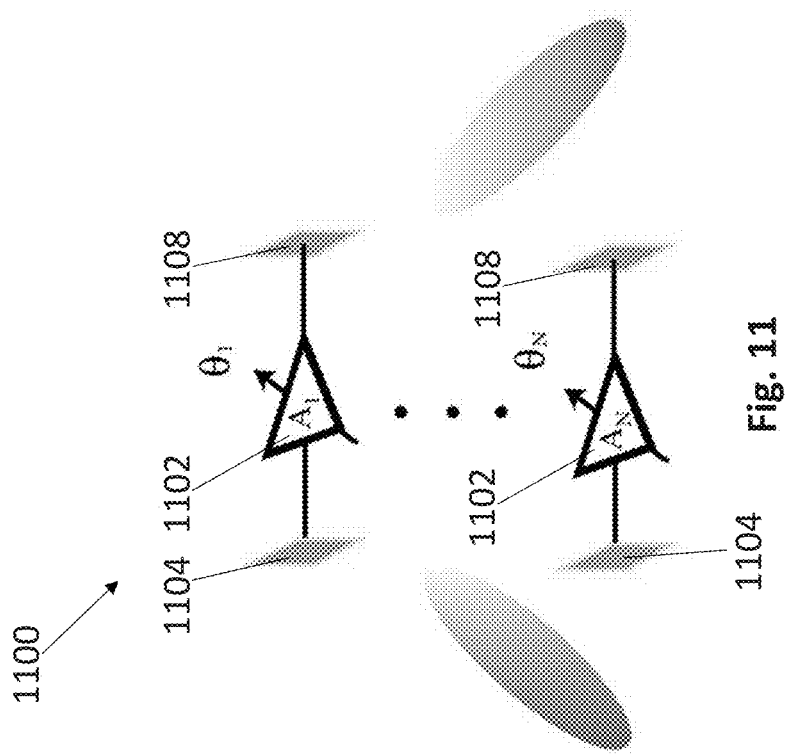
FIG. 11 conceptually illustrates a spatial redistributor in accordance with an embodiment of the invention.

A redistributor in accordance with an embodiment of the invention is conceptually illustrated in FIG. 11. The redistributor 1100 is implemented using a number of channels 1102 that largely operate independently and can be arranged in an array. The channels 1102 individually receive, process, and retransmit the incoming wavefront and condition and redirect it to any desired direction. This eliminates the need for centralized combining of the received signals and the subsequent redistributing to the transmit elements. In addition, the channels 1102 need not share a common reference oscillator signal between elements.

In order to perform beam steering, the channels 1102 maintain phase and data coherence between channels. Channels in accordance with many embodiments of the invention are configured to adjust the phase and data timing of the received signal. While some embodiments may perform the phase adjustment and timing adjustment in separate steps, the channels 1102 shown in FIG. 11 utilize a single delay setting in each channel that adjusts both phase and data timing.

In the illustrated embodiment, each channel 1102 includes a receive antenna element 1104 and a signal path that includes a time delay unit 1102, which provides an output to at least one transmit antenna 1108. As is discussed further below the delay setting of each time delay unit 1102 can control the reception and transmission angles of the spatial redistributor 1100. Each channel, which can be referred to as a branch, operates independently, with the relative delays of each branch determining the angles of incidence and retransmission of the receive and transmit beam pair. It can be shown that this decentralized approach maintains the benefits of the phased array coherent combining of signals, but the combining occurs in space in the transmit and receive beams. Also notably, the individual branches can operate with different time bases not phased locked to each other and not even at exactly the same frequency. These two qualities can significantly add to the versatility of redistributors in accordance with various embodiments of the invention.

A redistributor 1100 can include any number of channels. In many embodiments, this number can be large, where each one of the channels 1102 operates locally, without the need for high frequency data connection to other channels. This approach can provide significant advantages, by eliminating the need for high-speed data lines, and/or a centralized processing unit to which the data needs to be aggregated and from which the data needs to be distributed. In many embodiments, the ability to operate in a decentralized manner is one of the key enablers of the scalability and scale of the number of antenna elements that can be incorporated within a spatial redistributor, where the addition of extra channels does not require changes (either qualitatively or quantitatively) in the design of the array. In certain embodiments, the decentralized operation of the channels can also enable dynamic reconfiguration and reassignment of the array elements, and or dynamically changing channel configurations to address the different needs of different applications.

Moreover, although various systems are described above with reference to FIGS. 10 and 11, it should be understood that any combination of the various structural and functional elements of such redistributors can be included and/or omitted in any of the decentralized signal redirecting systems or redistributors discussed throughout.

Redistributors Incorporating Hybrid Time Delay Beamforming Arrays

In a number of embodiments, the channels also combine signals received using multiple antenna elements (but are still independent of other channels, e.g. do not combine received signals with signals from other channels). By employing conventional phased array beamforming to combine the received signal, a channel can increase the SNR of the received signal. The channel can then apply time and phase adjustments to the combined signal. In several embodiments, the channel can also incorporate an array of transmit antenna elements. In which case, the channel can apply different time and phase adjustments to the signals provided to each of the transmit antenna elements. When multiple channels are utilized together, controlling the time and phase adjustments applied to the signal paths of each signal transmitted by a transmit antenna element enables all of the antenna elements of the array of channels to act as a single time delay beamforming antenna array. Utilizing a partially centralized delay within individual channels can save power/chip area/infrastructure and reduce complexity. If the antenna elements of the channel are spaced close to each other relative to the data wavelength, then little dispersion/beam squinting is likely to occur, neutralizing the drawbacks that can occur when a shared delay is applied across a large array. The partial centralization can be used to add spatial selectivity or increase signal to noise ratio within the channel, allowing for additional processing and signal adjustment. For integrated circuit implementations of channels that utilize partial centralization, the circuitry of the channel may be implemented in a single integrated circuit die or between several.

A set of channels that each include sub-arrays of receive antennas and sub-arrays of transmit antennas that coordinate to act as time delay receive and transmit beamforming arrays in accordance with embodiments of the invention is illustrated in FIGS. 12A and 12B. The redistributor 1200a/1200b includes a number of channels 1202. At least some of the channels include a sub-array of antenna elements 1204 that can be used to receive signals. Due to the spacing of the antenna elements, the signals can be combined 1206 using a conventional phased array beamformer. As noted above, performing beamforming can significantly increase the SNR of the received signal. The channel can then apply a time delay 1208b to the received signal using a time delay units implemented in a similar manner to any of the time delay units described above. The time delay can be determined based upon the aperture of the redistributor as transmit array and the direction in which the transmit beam is being steered.

In some embodiments, such as illustrated in FIG. 12A, a time delay 1208a-1 may be applied separately after each antenna element of the sub-array of antenna elements 1204 and a time delay 1208a-2 may be applied before each antenna of a sub-array 1210 of transmit antennas. In some embodiments, such as illustrated in FIG. 12B, a time delay 1208b may be applied to each channel after the receive antennas 1204 and before the transmit antennas 1210.

In the illustrated embodiment, each channel 1202 also has a sub-array 1210 of transmit antennas. The channel 1202 can apply different time and phase adjustments to the signals provided to each of the antenna elements in the sub-array 1210. In this way, each of the channel's 1202 antenna elements forms an element in decentralized receive 1212 and/or transmit 1214 time delay transmit beamforming antenna array.

It is important to appreciate that the decentralized nature of the channels that form each of the sub-arrays in the redistributors 1200a/1200b shown in FIGS. 12A and 12B does not cause each channel to act as an independent beamforming relay. While this configuration is possible, the true benefit of the configuration shown in FIGS. 12A and 12B is that the time delays introduced by each channel enable the channels collectively to function as a single decentralized time delay beamforming array that can create coherent receive beams and coherent transmit beams (instead of each channel's sub-array forming its own independent beams that may interfere).

The redistributors 1200a/1200b shown in FIGS. 12A and 12B takes advantage of the ability to perform localized beamforming within individual channels with the advantages of scale afforded by utilizing multiple channels that do not require sharing of a phase coherent reference signal and that can collectively perform time delay beamforming. While the redistributors 1200a/1200b described above with respect to FIGS. 12A and 12B incorporate multiple channels into single fixed array, redistributors in accordance with many embodiments of the invention can be formed from moving and/or spatially distributed channels similar to those shown in FIGS. 12A and 12B. Furthermore, redistributors can be constructed from combinations of channels having multiple receive and/or transmit antenna elements, channels having a single receive and/or transmit antenna element, channels that have multiple receive antenna elements and a single transmit antenna element, and channels that have a single receive antenna element and multiple transmit antenna elements. Accordingly, it should be readily appreciated that the construction of redistributors including (but not limited to) spatial relays and spatial routers is not in any way limited to the use of any one channel design. Rather, spatial redistributors can be implemented using any channels and/or combination of channels as appropriate to the requirements of specific applications.

Moreover, although various systems are described above with reference to FIGS. 12A and/or 12B, it should be understood that any combination of the various structural and functional elements of such redistributors can be included and/or omitted in any of the decentralized signal redirecting systems or redistributors discussed throughout.

Time Delay Beamforming Arrays

Redistributors in accordance with many embodiments of the invention are able to perform transmit and receive beamforming using time delay beamforming. In a number of embodiments, time delay beamforming is performed by receiving a signal at an array of multiple antenna elements. The antenna array can be a 1D array, a 2D array, a 3D array (e.g. not all elements are located on a plane) and or an ad hoc array. In several embodiments, time and phase adjustments are applied to the received signals and the time and phase adjusted signals are transmitted using an array of multiple antenna elements. As with the receive array, the transmit array can be a 1D array, a 2D array, a 3D array and/or an ad hoc array. In several embodiments, the spatial redistributor can use a single array of antenna elements for both receive and transmit beamforming.

As is conceptually illustrated in FIG. 13A, each receive antenna element can provide a signal to a channel. The channel can include an RF chain including an analog front end (AFE), such as (but not limited to) a low noise amplifier (LNA). In several embodiments, the channel can directly apply timing and/or phase adjustments to the received RF signal. In many embodiments, the channel down converts the received signal to either an intermediate frequency (IF) or baseband and applies timing and/or phase adjustments to the signal prior to modulating the signal onto an RF carrier. In a number of embodiments, the channel utilizes the down conversion and up conversion to perform frequency conversion with respect to the received signal (i.e. the carrier frequencies of the received and transmitted signals are different).

As previously mentioned, the phase and time delays may be implemented separately or as part of the same processing step. Furthermore, the signal processing and time delay unit can be implemented to apply a time delay at the signal frequency (RF). A simplified circuit diagram of a spatial redistributor in which the signal processing and time delay unit can be implemented to apply a time delay at the signal frequency is shown in FIG. 13B. In many embodiments, the spatial redistributor preforms signal processing and time/phase adjustment at an intermediate frequency (IF). A simplified circuit diagram of a channel 1300 that performs time/phase adjustment at an IF is provided in FIG. 13C. If the delay is implemented at an IF, the RF signal received by at least one antenna element 1302 can be demodulated 1304 with a local oscillator (LO) to produce the IF. After the delay 1306, the frequency converted and processed signal can be modulated 1308 onto a carrier frequency and amplified 310 for transmission by at least one transmit antenna element 1312. This modulation can be accomplished with an additional mixer or another modulating circuit. Furthermore, the received signal can be mixed down to baseband (i.e. an IF of zero frequency), which can simplify the requirements of the circuits of the spatial redistributor.

Figure 13D:
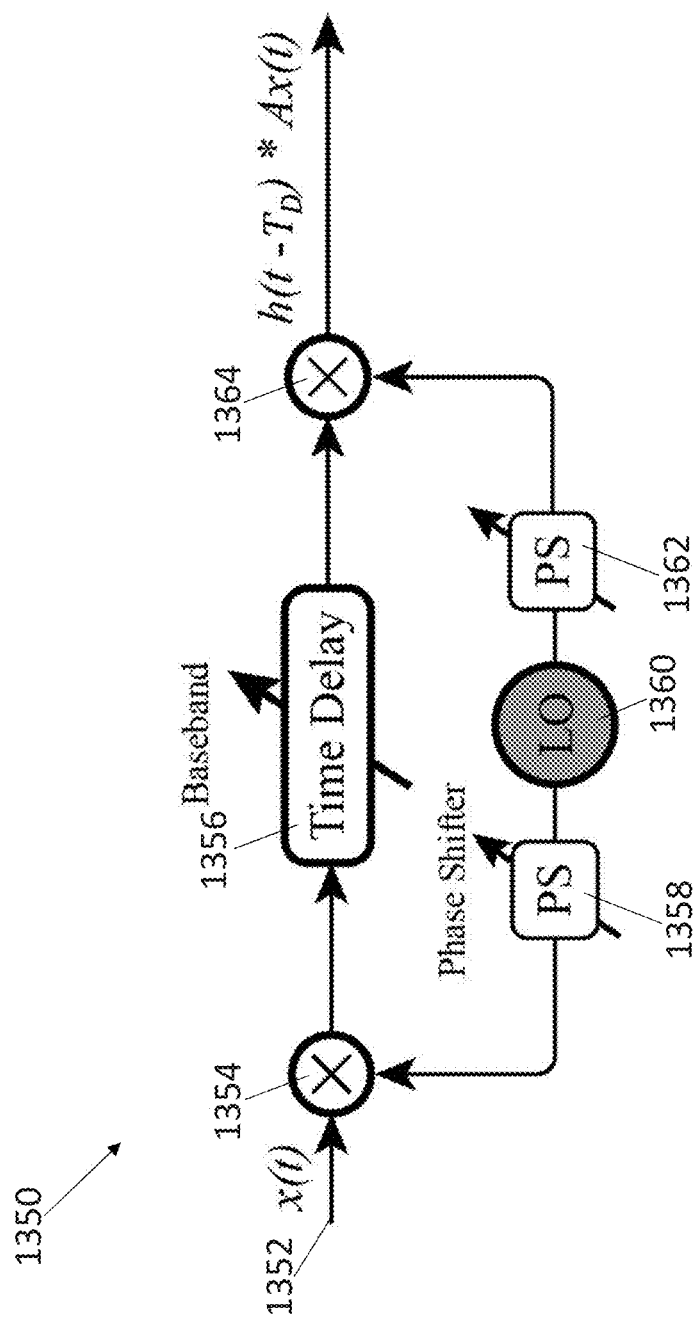

The manner in which time and phase adjustments can be performed by a down converting channel in accordance with an embodiment of the invention is illustrated in FIG. 13D. The channel 1350 includes an AFE incorporating an input 1352 which may include an LNA followed by a down-conversion mixer 1354 that down converts a received modulated signal to baseband. Where the channel is implemented as an integrated circuit, the down-conversion mixer's LO 1360 can be generated on chip. The LO signal passes through a phase rotator 1358, such as (but not limited to) a vector sum phase rotator. In a number of embodiments, the phase rotator 1358 can provide 360 phase control. Variable gain amplifiers (not shown) can be utilized to condition the baseband signal before it is provided to a time delay unit. 1356, which can introduce a time delay into the baseband signal. The time delayed baseband signal can then be up-converted using the LO signal phase rotated by a phase rotator 1362. The phase control rotation of the LO signal utilized for up conversion is independent from the phase control rotation applied to the LO oscillator in order to perform down conversion of the received signal.

When a redistributor utilizes channels that employ frequency conversion (e.g. the time delay is implemented at a frequency band other than the signal carrier), there can be several possible configurations of phase and frequency coherence between the elements. In several embodiments, all of the channels are phase and frequency locked to a shared reference signal. In a number of embodiments, the channels are phase and frequency locked to a local reference which may not be shared across the entire array. For example, antenna elements forming a sub-array may share a frequency reference but sub-arrays may have no shared frequency reference. In certain embodiments, channels within a spatial redistributor do not share a frequency reference. Instead, the channels may use their own low phase noise reference (such as a crystal oscillator) or they may use a free running oscillator reference.

Redistributors in accordance with many embodiments of the invention can tolerate high phase noise oscillators (such as a free running voltage controlled oscillator), when the phase noise is sufficiently low frequency. If the received signal is down-converted in order to be delayed and up-converted with the same LO signal, then the low frequency phase noise (noise events with period much longer than the delay time), can be attenuated to an extent that they are effectively cancelled. This can allow redistributors in accordance with many embodiments of the invention to use free running sources with high phase noise.

It is also not strictly necessary for channels within a scalable relay to have LO signals operating at the same or even similar frequencies. Provided the down-conversion and up-conversion steps in each channel results in effectively identical (or minimal) net frequency shift of the signal being redistributed, the output of each channel will still coherently combine. For example, a router may have one channel using a 28 GHz reference for down-conversion and up-conversion while another channel is using a 10 GHz reference signal for down-conversion and up-conversion. Provided the baseband/IF circuitry has the appropriate bandwidth, these channels may work together within the same spatial router.

As noted above, channels within spatial modulators can utilize a high phase noise reference to perform down-conversion and up-conversion. The ability of redistributors in accordance with many embodiments of the invention to utilize channels including comparatively inexpensive free running quartz oscillators at mm-wave frequencies (e.g. without phase lock loops) facilitates their scalability by reducing the power requirements of each individual channel and the complexity and power requirements that would be involved in distributing a low phase noise reference to each channel. In certain embodiments, the spatial redistributor achieves coordination between the transceivers to perform receive and transmit beamforming by simply sharing a common (possibly low frequency) reference, and/or command and control information. As can readily be appreciated, the specific signals and/or information shared between individual channels within a spatial redistributor are largely dependent upon the requirements of a specific application.

Conventional phased array beamformers approximate time delay by phase shift, but this can be limited by a phenomenon known as squinting which refers to poor beam steering away from the central frequency. The effects of squinting can be particularly pronounced in broadband mm-wave communication systems.

The impact of squinting and the benefits of utilizing time delay beamforming with wideband mm-wave signals can be readily appreciated by referring to FIGS. 14 and 15. FIG. 14A conceptually illustrates dispersion experienced by broadband signals transmitted using a phased array antenna 1400. FIG. 14B further illustrates the attenuation that can occur due to squinting errors when a phased array 1400 attempts to perform beam steering 1406 of a wide bandwidth signal 1404 relative to an RF carrier 1402. As can be observed, the carrier is steered accurately. However, beam squinting errors for frequencies at increasing distances from the carrier frequency can result mis-direction of a wideband data signal 1404 relative to the carrier on which it is modulated with resulting attenuation losses in the direction in which the beam is intended to be steered.

As can be appreciated with reference to FIG. 15 use of time delay beamforming by redistributors 1500 in accordance with various embodiments of the invention can significantly reduce and/or eliminate squinting errors in wideband signals. The redistributor 1500 shown in FIG. 15 is capable of performing receive beamforming 1502 and transmit beamforming through application of time and phase modifications using a single antenna array. As noted above, use of time delay beamforming enables accurate beam steering at the carrier frequency 1504 and with respect to the wideband modulated data signal 1506. As a result, spatial redistributors that utilize time delay beamforming typically achieve greater signal-to-noise ratio (SNR) at a receiver than can be achieved through phase control alone. The specific manner in which both receive and transmit beamforming can be performed using a single array of antenna elements through application of time and/or phase modifications is discussed further below.

Figure 16B:
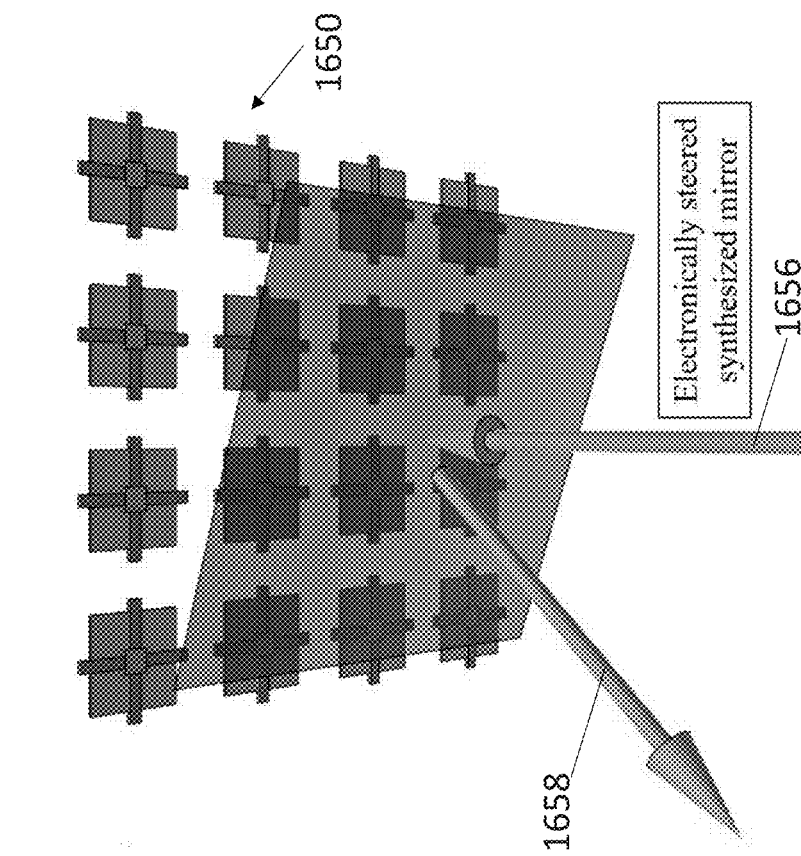
FIGS. 16A and 16B illustrates multiple operations of a spatial redistributor array in accordance with an embodiment of the invention to illustrate electronic beam steering.
Figure 16A:
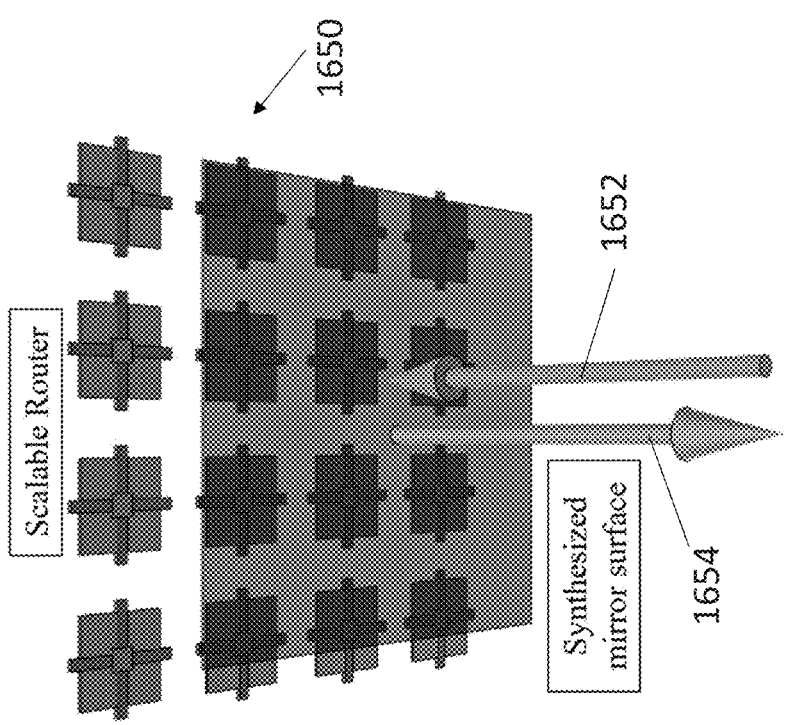

A decentralized array of redistributors 1650 in accordance with an embodiment of the invention is illustrated in FIGS. 16A and 16B. FIG. 16A illustrates the decentralized redistributors 1650 operating in a mode where an incoming signal 1652 is returned as a redirected signal 1654 in the same direction as the incoming signal 1652. FIG. 16B illustrates the redistributors 1650 operating in a mode where an incoming signal 1656 is steered as a redirected signal 1658 in a direction which is different from the direction as the incoming signal 1656.

Figure 16D:
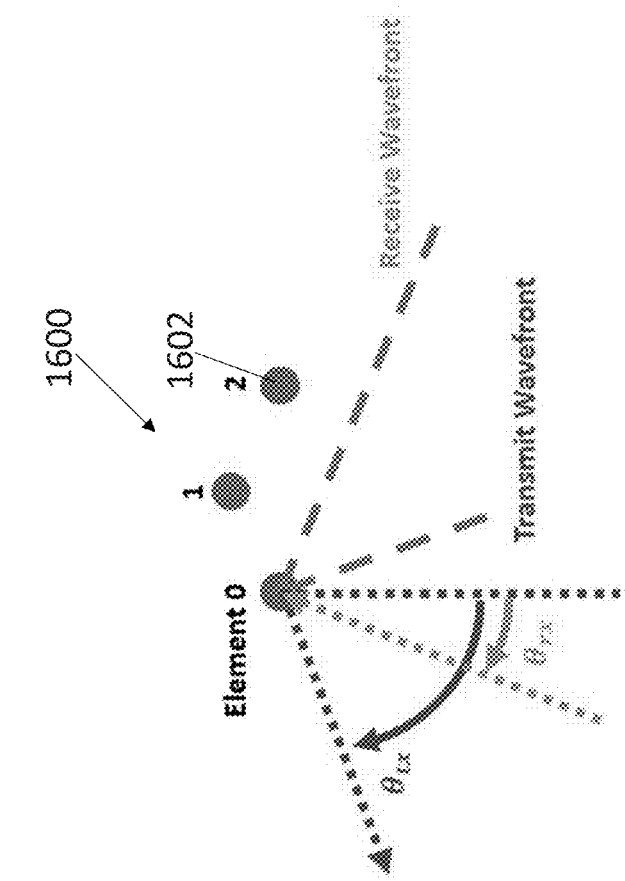
FIGS. 16C and 16D illustrate various spatial redistributor array configurations in accordance with embodiments of the invention.
Figure 16C:
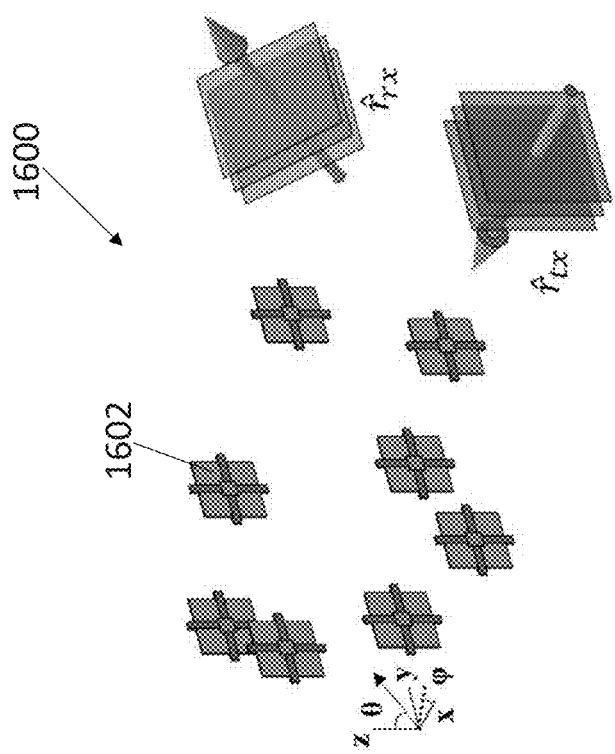

A decentralized array of redistributors in accordance with an embodiment of the invention is illustrated in FIGS. 16C and 16D. The location of antenna elements in a redistributor can be used to add spatial selectivity to the beam pattern of the redistributor. Additional selectivity can be achieved by locating antenna elements so that they are not on a single line. Consider the three-branch redistributor 1600 shown in FIG. 16B. Having non-collinear element dimensions adds a second degree of freedom into the expression utilized to determine the time delays that achieve coherence in a given transmit beam direction for a specific receive beam direction. In this way, the relative positions of the antenna elements 1602 can be chosen to establish spatial selectivity for a router, reducing the coherence of signals arriving at the array from directions other than the desired reception angle. In addition, the relative positions of the transmit antenna elements can impact the transmit beam steering of the redistributor. Furthermore, additional benefits can be obtained by utilizing an unequal ratio of receive antenna elements to transmit antenna elements (e.g. not a 1:1 ratio) in certain applications. As can be readily appreciated, the specific spacing of antenna elements will be largely dependent upon the requirements of a specific application.

FIG. 16C shows an example decentralized array structure where elements of the array are not arranged in the same plane. The relationship between the intended direction of the received beam pattern, $\hat{R}_{rx}$, the intended direction of the transmit pattern, $\hat{R}_{tx}$, and the unwrapped phased (a surrogate for the delay), $\delta_m$, of each branch at location $\vec{r}_m$, can be derived as follows. Considering the origin of the coordinate system as a phase reference, the difference in propagation length to a point $\vec{R}_{tx}$, between a wave radiated by an emitter at $\vec{r}_m$ and the origin may be $$\vec{R}_{tx} - \vec{r}_m - \vec{R}_{tx} = \vec{R}_{tx}\sqrt{1 - 2\hat{R}_{tx}\cdot\hat{r}_m\frac{\vec{r}_m}{\vec{R}_{tx}} + \frac{\vec{r}_m^2}{\vec{R}_{tx}^2}} - \vec{R}_{tx} \quad (1)$$

In this case $\vec{r}_m/\hat{R}_{tx} \ll 1$, (which implies that the array aperture is much smaller than the distance to the intended beamforming point) (1) can be Taylor-expanded to yield:

$$\vec{R}_{tx} - \vec{r}_m - \vec{R}_{tx} = -\hat{R}_{tx}\cdot\hat{r}_m\vec{r}_m + O\left(\frac{\vec{r}_m^2}{\vec{R}_{tx}}\right) \quad (2)$$

The above propagation length variation manifests itself in the phase propagation term of electromagnetic waves, which under substitution of (2) becomes $$\exp\left[jk(-\hat{R}_{tx}\cdot\hat{r}_m\vec{r}_m + O\left(\frac{\vec{r}_m^2}{\vec{R}_{tx}}\right)\right] \approx \exp[-jk\hat{R}_{tx}\cdot\hat{r}_m\vec{r}_m] \quad (3)$$

where the above approximation can be made under the far-field condition $\vec{r}_m^{-2}/\lambda \ll \vec{R}_{tx}$. We note that (3) is the phase difference incurred during transmission of each emitter with respect to the origin. The dual set of phase differentials can be found for the case of an incident wave from a receive direction, $\hat{R}_{rx}$, in an analogous manner. To keep the notation simpler, new $\hat{R}_{rx}$ ay be defined to be pointing outward. Combining the two phase terms results in the following phase propagation value:

$$\exp[-jk\hat{R}_{tx}\cdot\hat{r}_m\vec{r}_m]\exp[-jk\hat{R}_{rx}\cdot\hat{r}_m\vec{r}_m] \quad (4)$$

For coherent beamforming to occur, (4) needs to equal 0 (or be close to 0) for the desired beamforming direction. If a variable unwrapped phase, $e^{-j\delta_m}$, is added to the mth emitter, then coherent beamforming may occur for $$\delta_m = -k\vec{r}_m(\hat{R}_{tx}\cdot\hat{r}_m + \hat{R}_{rx}\cdot\hat{r}_m) \quad (5)$$

We note that in (5), the delay for beamforming is given in terms of unwrapped phase $\delta_m$. Noting that $k=\omega/c$, the phase delay is a frequency dependent term. As noted earlier, for wideband signals a frequency-independent phase delay will result in data decoherence/ISI. Thus, the delay in (5) may be implemented via a time-delay, which may be provided by the recast form of (5)

$$t_m = -\frac{\vec{r}_m}{c}\left(\hat{R}_{tx} \cdot \hat{r}_m + \hat{R}_{rx} \cdot \hat{r}_m\right) \quad (6)$$

Figure 17:
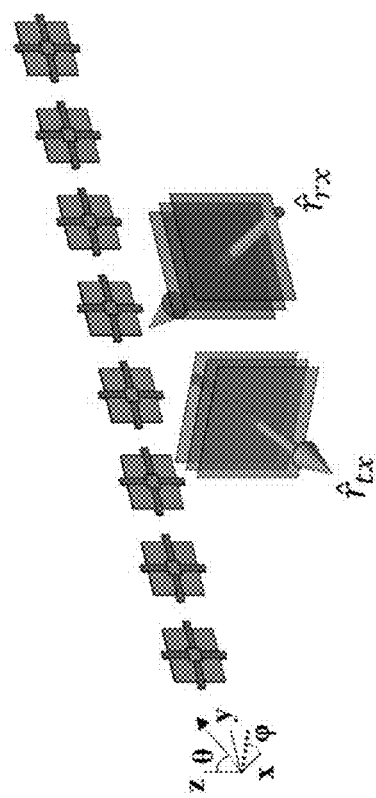
FIG. 17 illustrates a 1D 8-branch array of spatial redistributors according to an embodiment of the invention.

A 1D M element redistributor array with branch pitch d according to an embodiment of the invention is illustrated in FIG. 17. For simplicity, it may be assumed that the array coordinates are provided by $\vec{r}_m$=[0, md, 0]. This results in (6) being evaluated as $$t_m = -\frac{md}{c}(\sin\theta_{tx}\sin\phi_{tx} + \sin\theta_{rx}\sin\phi_{rx}) \quad (7)$$

and since FIG. 17 describes the x-y plane, $\theta_{rx}=\theta_{tx}=\pi/2$ which results in (7) reducing to $$t_m = -\frac{md}{c}(\sin\phi_{tx} + \sin\phi_{rx}) \quad (8)$$

where $t_m$ is the delay of the mth branch with respect to the in m=0 branch at the origin. To make all delays positive, a common delay to all branches may be added. Thus (8) can be used to set the internal delay of each emitter to achieve desired reception and transmission angles. Using this expression allows the scalable redistributor to operate as a programmable mirror. The user can set the direction which reflections should be sent. While the above example is for a 1D array, this derivation can be used for 2D and 3D routers by using the general form found in (6).

Figure 18:
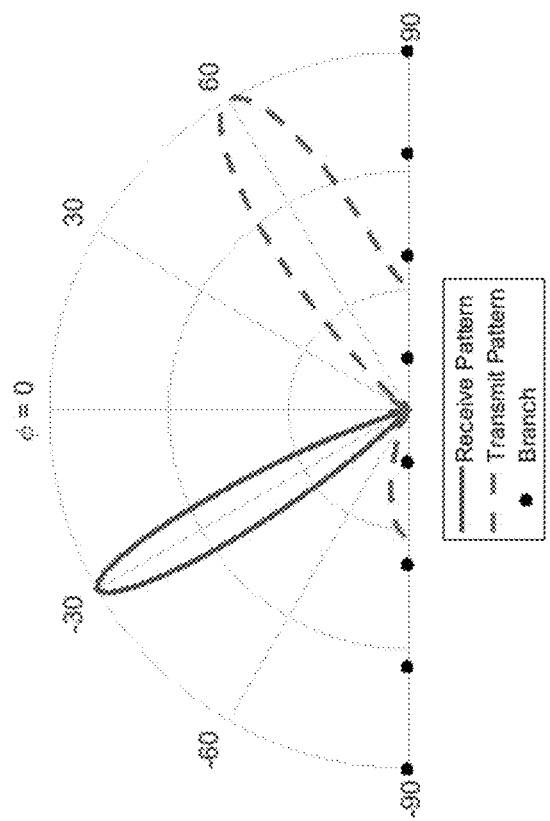
FIG. 18 is a graph depicting behavior of the spatial redistributors of FIG. 17.

To produce an in plane beam pattern, a specific direction for either the receive or the transmit may be considered. A redistributor including a 1D 8-branch array with d=$\lambda$/2 branch spacing according to an embodiment of the invention is illustrated in FIG. 17. FIG. 17 includes an intended receive direction of $\phi_{rx}$=−30° and an intended transmit direction of $\phi_{tx}$=60°. The branch delays may be calculated using (8). FIG. 18 shows the transmit and receive beam patterns for the programmed array. The transmit beam pattern shows the relative strength of the radiated beam from the redistributor in any given direction when a signal is incident on the redistributor at −30°. The receive bean pattern shows how energy incident on the router from any given direction contributes to the transmitted beam at 60°.

While the patterns in FIG. 18 describe the intended behavior of the redistributor, signals may be received from, and transmitted to, directions other than the intended for a given set of branch delays. This may be described as peripheral vision, since signals incident from outside the directions from which the array is "looking" may be redirected as well. The mathematical justification is apparent from (8) as there are many pairs of $\phi_{rx}$ and $\phi_{tx}$ that satisfy the equation for a given $t_m$. While the peripheral vision does not interfere with the primary function of the system, it may be undesirable in certain situations. The element position can be used to suppress the redistributor's peripheral vision.

Redistributor peripheral vision can be quantified for the more general case of a redistributor with steering capability encompassing the entire range of azimuths and elevations. Since there may be unwanted coherent combination of power, peripheral vision can occur where the carrier signal coherently combines, even though the data signal may be incoherent. Focusing on the carrier signal and assuming far-field conditions, the field at a point in space due to a uniformly excited redistributor may be proportional to the summation of the propagation phases of each branch $$\vec{E}(\hat{R}_{rx}, \hat{R}_{tx}) \propto \sum_n \exp[-j(k\vec{r}_m \cdot \hat{R}_{tx} + \delta_n + k\vec{r}_m \cdot \hat{R}_{rx})] \quad (9)$$

where $\vec{r}_m$ denotes the location of the mth branch, and $\hat{R}_{tx}$ and $\hat{R}_{rx}$ denote the instantaneous transmit and receive beam directions, respectively. The $\delta_m$ term may quantify the added unwrapped phase by each branch that is used to steer the transmitted beam to a desired $\hat{R}_{tx}$ for a given $\hat{R}_{rx}$, and was defined in (5). In this framework, the problem of minimizing peripheral vision reduces to minimizing (9) for a given set of $\hat{R}_{tx}$, $\hat{R}_{rx}$, $\hat{R}_{tx}$, and $\hat{R}_{rx}$ by varying $\vec{r}_m$. In scenarios where there is a maximum undesired power level that can be transmitted due to the peripheral vision, the minimization can be explicitly stated over all space, for a set $\hat{R}_{tx}$, $\hat{R}_{rx}$, as $$\min_{\vec{r}_m} S \vec{E}(\hat{R}_{tx}, \hat{R}_{rx})^2 \mathcal{H}(\vec{E}(\hat{R}_{tx}, \hat{R}_{rx})^2 - P_{max}) dS_{rx} dS_{tx} \quad (10)$$

where integration over S, the unit sphere, captures different $\hat{R}_{tx}$ and $\hat{R}_{rx}$ directions, $\mathcal{H}$ is the Heaviside operator and $P_{max}$ may be the maximum undesired power level.

Figure 19:
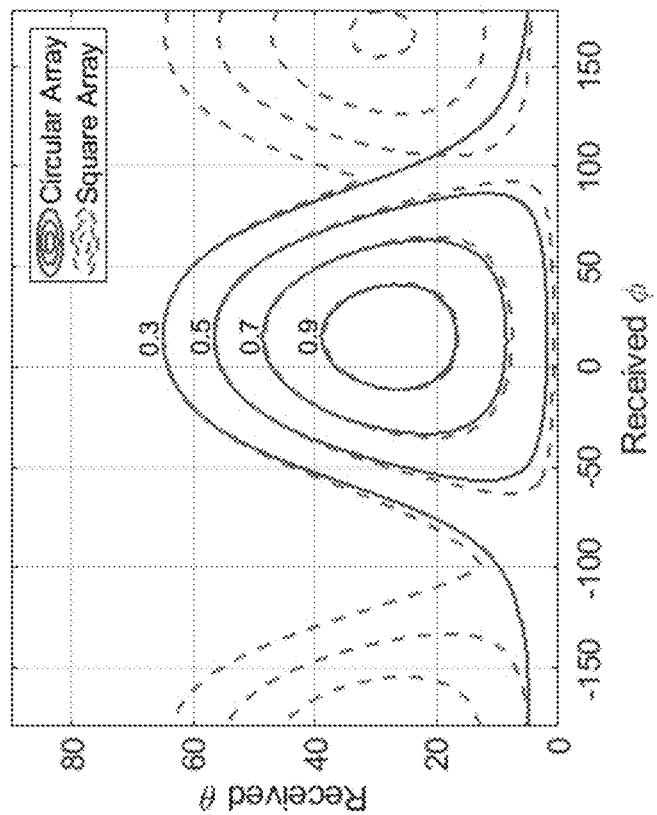
FIG. 19 is a contour plot depicting behavior of spatial redistributors according to an embodiment of the invention.

As an example of the effect of branch position, $\vec{r}_m$, on peripheral vision, the maximum transmitted power over all $\hat{R}_{tx}$ as a function of $\hat{R}_{rx}$ is shown in FIG. 19 for both a circular and a square redistributors including 9 branches. Contours shown in FIG. 19 correspond to the maximum transmitted power in any $\hat{R}_{tx}$ for the given received direction, $\hat{R}_{rx}$, which is described by a point in the $\phi_{rx}$–$\theta_{rx}$ plane. Note that the router is programmed to receive a beam in only a desired $\hat{R}_{rx}$, which corresponds to a single point in the $\phi_{rx}$–$\theta_{rx}$ plane in FIG. 19. Thus, any contours in FIG. 19 that lie on points in the $\phi_{rx}$–$\theta_{rx}$ other than the intended $\hat{R}_{rx}$ represent power that is being received from directions other than $\hat{R}_{rx}$ and subsequently routed to some unintended transmit direction. The higher the amount of this power (contour level in FIG. 19), the more peripheral vision is present in the router system. The goal of peripheral vision reduction is to minimize the contours in the FIG. 19 so that power is only transmitted when the received beam direction is the intended received beam direction $\hat{R}_{rx}$.

To normalize the comparison between the square and circle redistributors in FIG. 19, the aperture size of the two arrays are held constant—for a square router with 9 branches and $\lambda$/2 branch pitch, the circular redistributor has $\lambda$/2.25 branch pitch. Router radiative elements are simulated with a $\cos\theta$ element pattern. As can be seen, the circular redistributor has a better peripheral vision rejection, and highlights the role that branch placement can play with respect to minimizing peripheral vision. Note that the actual peak of transmitted power does not occur for the intended receive direction, this is due to the effect of the $\cos\theta$ element pattern. More insight into peripheral vision suppression could be obtained by further analysis of (10).

Figure 20:
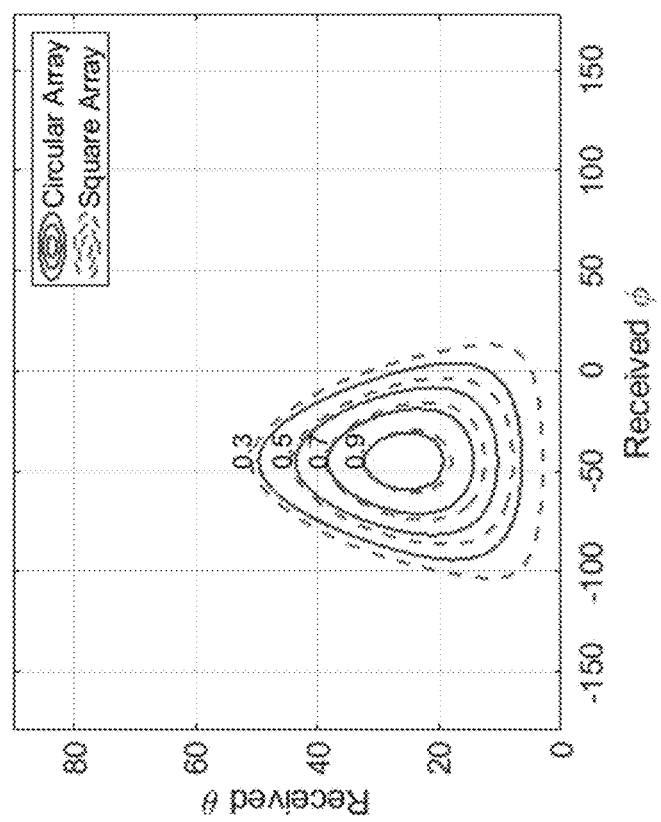
FIG. 20 is a contour plot depicting behavior of spatial redistributors according to an embodiment of the invention.

FIG. 20 shows a subset of the above analysis, where instead of finding the maximum transmitted power over all $\hat{R}_{tx}$ as a function of $\hat{R}_{rx}$, the transmitted power in the $\hat{R}_{tx}$ as a function of $\hat{R}_{rx}$ is shown. This is effectively the amount of undesirable power, save for that from the intended receive signal $\hat{R}_{\bar{rx}}$, that is transmitted in the desired transmit direction, $\hat{R}_{\bar{tx}}$. Once again, to minimize the peripheral vision the contours in FIG. 20 are minimized so that power is only transmitted when the received beam direction is the intended received beam direction $\hat{R}_{\bar{rx}}$.

Peripheral vision can impact the performance of redistributors such as those depicted in FIG. 11. In conventional centralized phased arrays, signal aggregation is done before transmit, and peripheral vision may not occur. The hybrid architecture of FIGS. 12A and 12B may result in a lower peripheral vision than FIG. 11 for the same number of elements. Additionally, as mentioned before, the peripheral vision described above relates to the unwanted coherent combination of the carrier. Peripheral vision where data coherence is maintained is only a subset of the points in the carrier peripheral vision space and is less of an issue for large spatially distributed arrays operating in wideband networks.

Moreover, although various redistributors are described above with reference to FIGS. 13-20, it should be understood that any combination of the various structural and functional elements of such redistributors can be included and/or omitted in any of the decentralized signal redirecting systems or redistributors discussed throughout.

Time Delay Beamforming Channels

Figure 21:
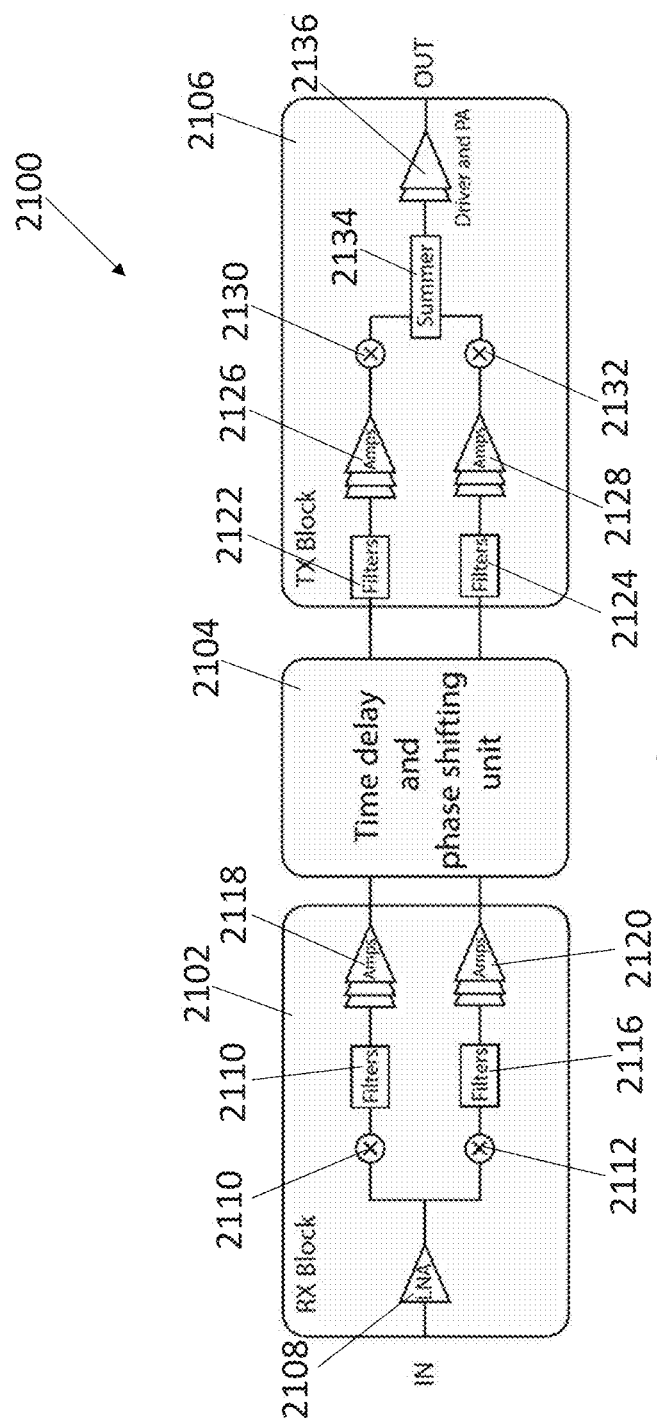
FIG. 21 illustrates a scalable decentralized spatial redistributor according to an embodiment of the invention.

Referring again to FIGS. 13C and 13D, channels that can be utilized in redistributors in accordance with various embodiments of the invention can utilize frequency conversion to apply time and frequency manipulations to a received signal. The following section discusses the specific manner in which time delay and phase adjustment units of a channel in accordance with various embodiments of the invention can be implemented. The various time delay and phase adjustment units are discussed with reference to a generalized channel architecture shown in FIG. 21.

The channel 2100 is capable of performing time and phase adjustments with respect to a received signal that includes data modulated onto in-phase and quadrature components of the signal (I/Q modulated data). The channel includes a receiver block 2102, which is capable of receiving a signal from one or more antenna elements. The receiver block 2102 provides I and Q output signals to a time delay and phase adjustment unit 2104. The time delay and phase adjustment unit 2104 provides time delayed and phase shifted outputs to a transmitter block 2106.

The receiver block 2102 is capable of receiving a signal from at least one antenna element that includes an I/Q modulated data signal. In the illustrated embodiment, the received signal is amplified by an LNA 2108. The in-phase and quadrature components can be separated using mixers 2110, 2112 to provide separate in phase and quadrature signals that are then filtered 2114, 1516, and amplified 2118, 2120. The outputs can then be provided to the time delay and phase adjustment unit 2104, various possible implementations of which are discussed further below.

The transmitter block 2106 receives in-phase and quadrature signals for transmission. The signals can be filtered 2122, 2124 and amplified 2126, 2128 prior to being I/Q modulated using mixers 2130, 2132 and a summer 2134. The modulated signal can then be amplified by a power amplifier 1536 and provided to at least one antenna element for transmission. The power amplifier can be implemented in any of a variety of different configurations including (but not limited to) a linear, switching, digital and/or polar power amplifier. In some embodiments, the data may be regenerated within each channel. In a number of embodiments, a switching power amplifier can be used without significant distortion. In certain embodiments, a polar PA is used to modulate the regenerated phase and amplitude data onto the carrier separately.

The general architecture of the channel discussed above with reference to FIG. 21 provides context for a variety of different potential ways in which to implement time delay and phase adjustment units in accordance with various embodiments of the invention. As can readily be appreciated, the specific manner in which a time delay and phase adjustment unit is implemented is largely dependent upon the requirements of a specific application. The time and phase adjustments applied by a time delay and phase adjustment unit can be employed in the analog domain and/or the digital domain. In many embodiments, the channel is employed in a router and the received signal includes data that provides routing information (e.g. header information). Accordingly, the channel digitizes the received signal in order to extract routing information, which then can be utilized in the configuration of the time delay and phase adjustment unit to apply appropriate adjustments to the received signal to perform beam steering.

Moreover, although a redistributor is described above with reference to FIG. 21, it should be understood that any combination of the various structural and functional elements of such redistributors can be included and/or omitted in any of the decentralized signal redirecting systems or redistributors discussed throughout.

Data Coherence

Redistributors in accordance with many embodiments of the invention can enable the creation of large aperture arrays (which may be contiguous or physically separated). Data coherence degradation is a natural concern for such systems as ISI. Beam squinting occur if merely branch phase delay is used instead of true time delay. These effects are more pronounced when the wavelength of the highest frequency components of an incident signalâs modulation is comparable to array aperture size. This makes large aperture arrays steering high bandwidth beams most susceptible.

For a given beam direction, pure phase control may maintain perfect coherence only at a single frequency. In order to preserve beam coherence in a band of frequencies and prevent ISI, an additional degree of freedom must be added. This can be achieved by controlling the slope of each branch's phase response with respect to frequency (e.g. adjusting group delay). Programmable time delay within each branch unlocks system scalability which is one motivation for the redistributor. While true time delay enables high bandwidth arrays, the additional degree of freedom it affords can alternatively be used to simultaneously and independently control two separate, full power beams. Dual beam capability is further explained and demonstrated in the description in connection with FIGS. 37-39.

Redistributor Noise Reduction

It would be advantageous to produce a redistributor design with highly complex branch circuits at a low cost and high volumes. Integrated circuits processes, especially general purpose complementary metal oxide semiconductor (CMOS), can deliver complexity and volume at an attractive cost. While an integrated circuit implementation has a lot of advantages, it presents a challenge to achieving programmable true time delay with wide range and high resolution at microwave frequencies. Hence, in some embodiments, the redistributor down-converts the received microwave signal and applies true time delay at lower frequencies. This architecture is shown in FIG. 22A which is analogous to the system shown in FIG. 131). FIG. 22A includes many elements similar to those shown in FIG. 13D and can be implemented in various ways including (but not limited to) techniques similar to those discussed above with reference to FIG. 13D.

Figure 22B:
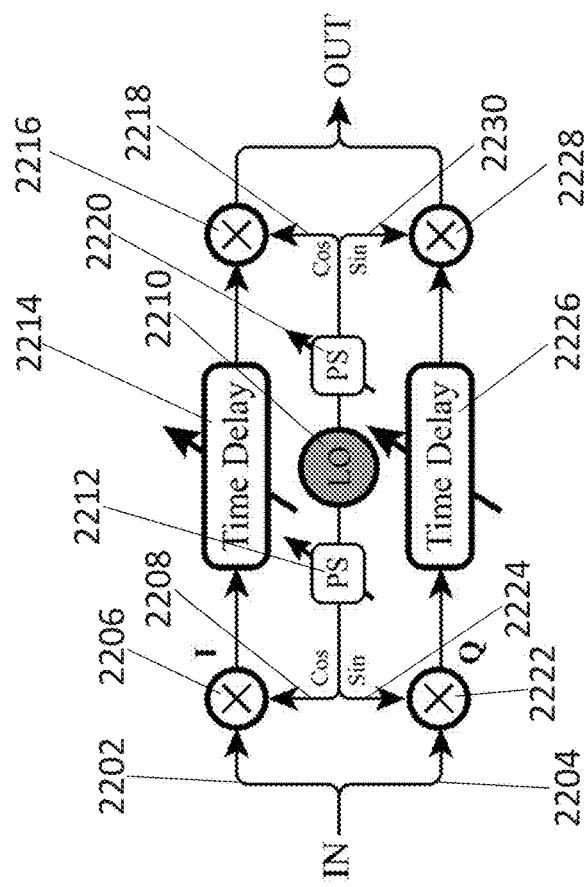
FIG. 22B illustrates a schematic of a scalable decentralized spatial redistributor according to an embodiment of the invention.
Figure 22A:
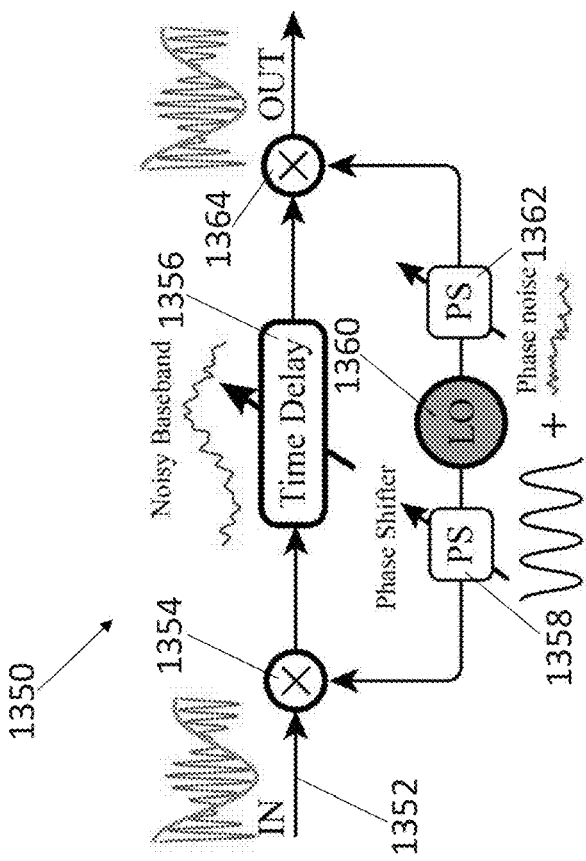
FIG. 22A illustrates a schematic of a scalable decentralized spatial redistributor according to an embodiment of the invention.
Figure 22C:
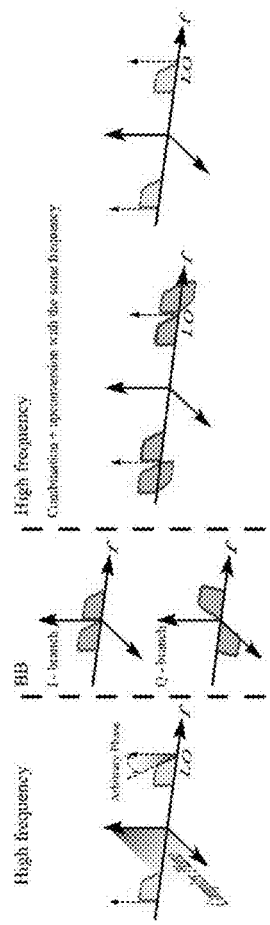
FIGS. 22C and 22D illustrate various schematics of the operation of the scalable decentralized spatial redistributor of FIG. 22B.

An in-phase/quadrature (I/Q) scheme which is capable of suppressing a signal image according to an embodiment of the invention is illustrated in FIGS. 22B and 22C. FIG. 22B illustrates an I path 2202 and a Q path 2204. The I path 2202 includes a down conversion mixer 2206 which has an input 2208. A LO 2210 produces a signal which passes through a phase rotator 2212 which passes a phase rotated signal to the input 2208. The down conversion mixer 2206 is connected to a time delay unit 2214 which can introduce a time delay into the baseband signal. The signal is then passed to an up conversion mixer 2216 which includes another input 2218. The LO 2210 produces a signal which passes through another phase rotator 2220 which is connected to the input 2218.

The Q path 2204 includes a down conversion mixer 2222 which has an input 2224 which connects to the phase rotator 2212. The down conversion mixer 2222 can send a baseband signal to the time delay unit 2226 which introduces a time delay. The time delay unit 2226 passes the delayed signal to the up conversion mixture 2228 which includes an input 2230. The input 2230 receives a phase rotated signal from the phase rotator 2220. The I path 2202 receives cosine phase signals from the inputs 2208/2218 and the Q path receives sine phase signals from the inputs 2224/2230.

The LO 2226 of the redistributor does not have to be phase or frequency locked to the data carrier frequency or other redistributor branches. Also, the down-conversion and up-conversion branch architecture can suppress the effect of phase noise in the LO 2226. An input to the I path 2202 and the Q path 2204 can be represented by the following equation:

$$X(t)=I(t)\cos(2\pi f_0)+Q(t)\sin(2\pi f_0), \quad (1)$$

where $f_0$ is the incoming wave frequency. After down-conversion the signals follow this equation:

$$X_I = \frac{I(t)}{2}\cos[2\pi(f_{LO}-f_0)t + \phi_{LO}(t) + \phi_{PR}] - \frac{Q(t)}{2}\sin[2\pi(f_{LO}-f_0)t + \phi_{LO}(t) + \phi_{PR}] \quad (12)$$

$$X_Q = \frac{I(t)}{2}\sin[2\pi(f_{LO}-f_0)t + \phi_{LO}(t) + \phi_{PR}] + \frac{Q(t)}{2}\cos[2\pi(f_{LO}-f_0)t + \phi_{LO}(t) + \phi_{PR}],$$

here $f_{LO}$ is the frequency of the LO 2210, $\phi_{LO}(t)$ is the associated phase noise, and $\phi_{PR}$ is the applied phase shift. In (12), the phase noise of the I and Q are correlated since they are generated within the same LO 2210. The output signal after applying true time delay and up-converting is:

$$X_{out} = \frac{I(t-\tau)}{2}\cos[2\pi f_0(t-\tau) - \phi_{PR} + \phi_{LO}(t-\tau) - \phi_{LO}(t)] + \frac{Q(t-\tau)}{2}\sin[2\pi f_0(t-\tau) - \phi_{PR} + \phi_{LO}(t-\tau) - \phi_{LO}(t)]. \quad (13)$$

Figure 23:
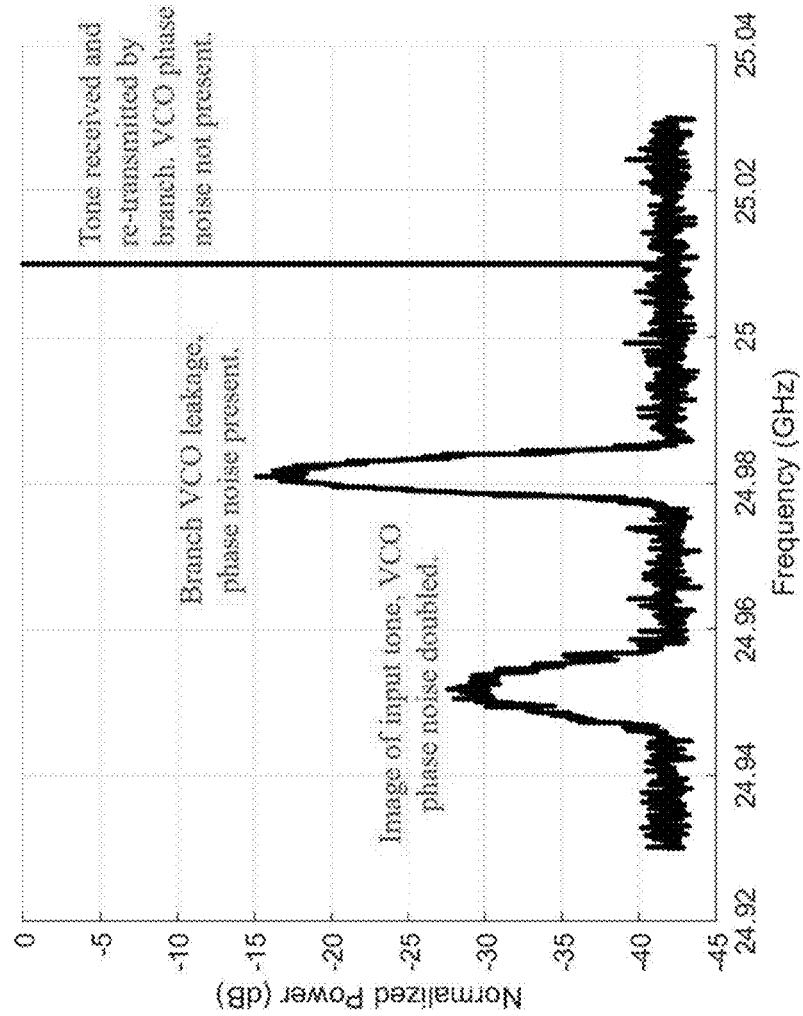
FIG. 23 is a graph demonstrating phase noise cancellation.

As the above equations show, the transmitted frequency is at $f_0$. This result is independent of each branch local oscillator frequency ($f_{LO}$). Since the delay, ($\tau$), can be on the order of pico-seconds to a few nano-seconds, the resultant additional phase noise, due to the term $\phi_{LO}(t-\tau)-\phi_{LO}(t)$, is negligible up to offset frequencies in the giga-hertz range. This phase noise cancellation may be advantageous because inexpensive reference oscillators with relaxed stability (such as cheap crystal oscillators or on-chip free-running voltage controlled oscillator (VCO)) may be used for the LO 2210. A measurement of the implemented branch circuit shown in FIG. 23 demonstrates this phenomenon clearly. A tone at 25.01 GHz can be sent through a branch of the IC with a free running VCO around 24.98 GHz. The image at 24.95 GHz exhibits twice the phase noise of the VCO while the re-transmitted tone has a clean spectrum without any of the VCO phase noise.

Figure 22D:
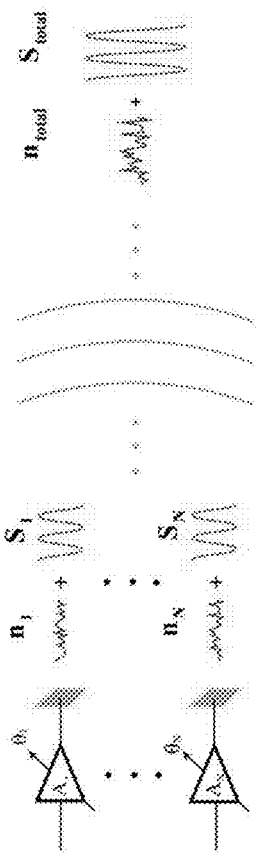

In addition to phase noise cancellation, the redistributor design also may provide mitigation of added amplitude noise within each branch. Due to the transceiver branches being fully separate and the absence of a physical summation node within the system, the added noises (e.g. antenna noise temperature, noise added by amplifiers, etc. . . . ) are uncorrelated. This lack of correlation due to decentralization, shown in FIG. 22D, can result in higher SNR at the target compared to a redistributor constructed from traditional, centralized arrays. In some embodiments, this noise reduction can be leveraged to trade component level noise performance for other system benefits, for example, reduction of capacitance in a switched capacitor filter to increase bandwidth and/or reduce on-chip area at the cost of added uncorrelated noise.

Moreover, although various redistributors are described above with reference to FIGS. 22A-22D, it should be understood that any combination of the various structural and functional elements of such redistributors can be included and/or omitted in any of the decentralized signal redirecting systems or redistributors discussed throughout.

Branch Isolation and Self-Interference

Figure 24:
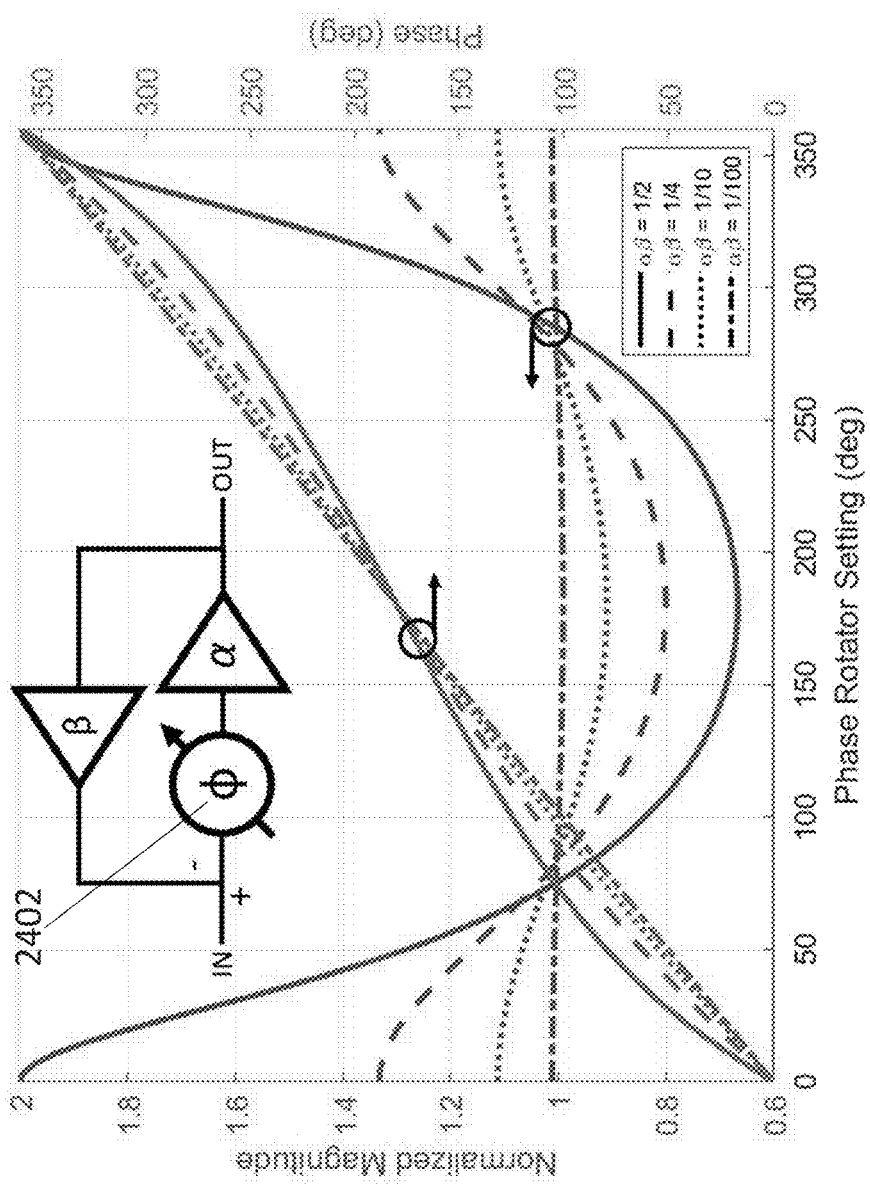
FIG. 24 is a graph with inset circuit diagram which demonstrates no-idealities of the phase rotator under certain conditions.
Figure 25:
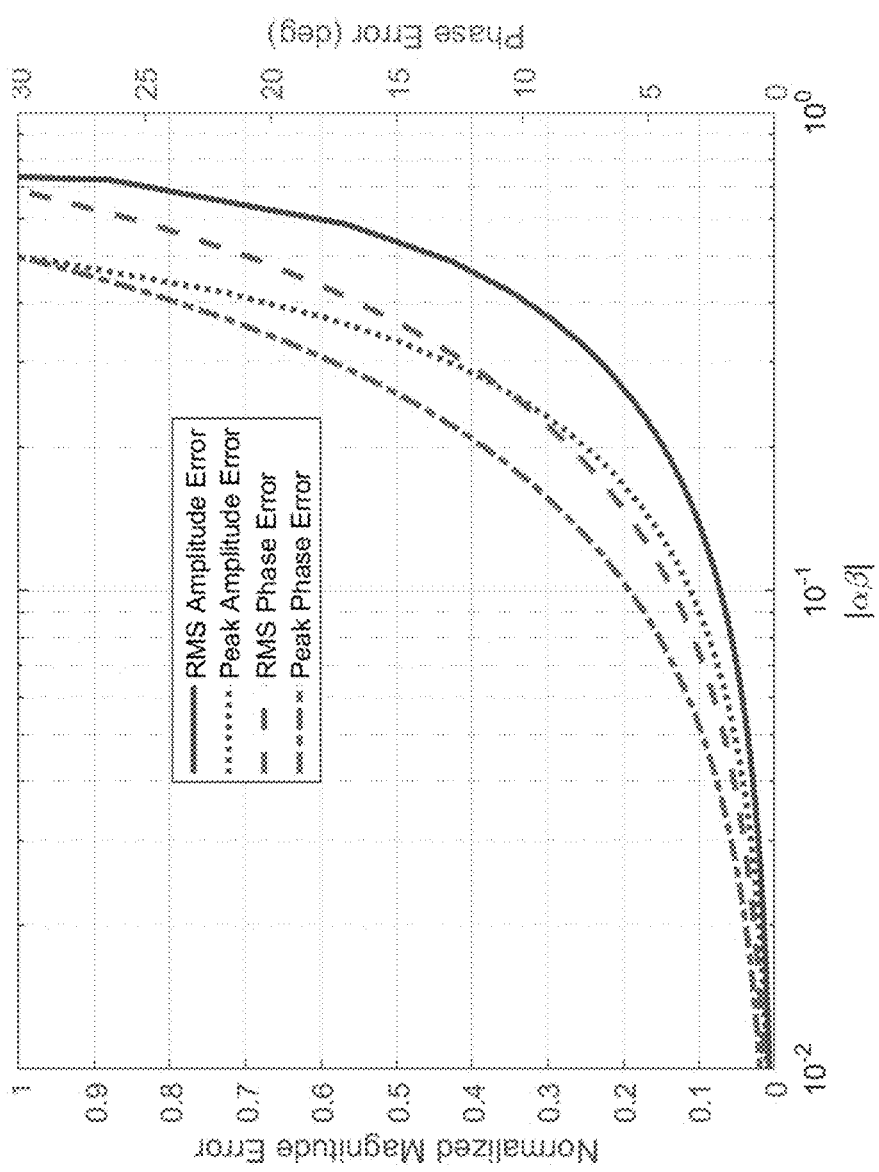
FIG. 25 is a graph which demonstrates non-idealities of the phase rotator under certain conditions.

Redistributors may include self-interference issues that plague many simultaneous transmission/reception (full-duplex) systems. In particular, parasitic feedback from the transmitter output back to the input of the receive chain can interfere with system function even if it is far below the levels necessary to cause oscillation. A simplified, frequency independent branch with forward path gain α and parasitic feedback β is illustrated in the inset circuit diagram in FIG. 24. The delay element 2402 within the branch may be an ideal constant amplitude phase rotator. The branch's closed loop transfer function phase and normalized amplitude are plotted vs. phase rotator setting for several open loop gains (α*β) in the graph of FIG. 24. The parasitic feedback may introduce non-idealities to the phase rotator 2402. An open loop gain of −20 dB can produce nearly ideal behavior but non-ideality may emerge as gain rises. The dependence of these non-idealities on open loop gain can be observed in the graph of FIG. 25. FIG. 25 shows the amplitude and phase error (deviation from the ideal) as open loop gain is changed. Even at an open loop gain of 0.1, the peak phase error exceeds 5°. These non-idealities limit the achievable branch forward path gain, as a gain of 30 dB would require isolation of close to 50 dB for the peak amplitude and phase variations to be rendered unnoticeable. Polarization isolation, isolating radiators on opposite sides of a ground plane, or active feedback cancellation techniques can reduce parasitic feedback to acceptable levels. Accordingly, it should be readily appreciated that techniques used in other full-duplex systems to improve system performance can also be readily adapted for use in redistributors implemented in accordance with various embodiments of the invention.

Figure 26:
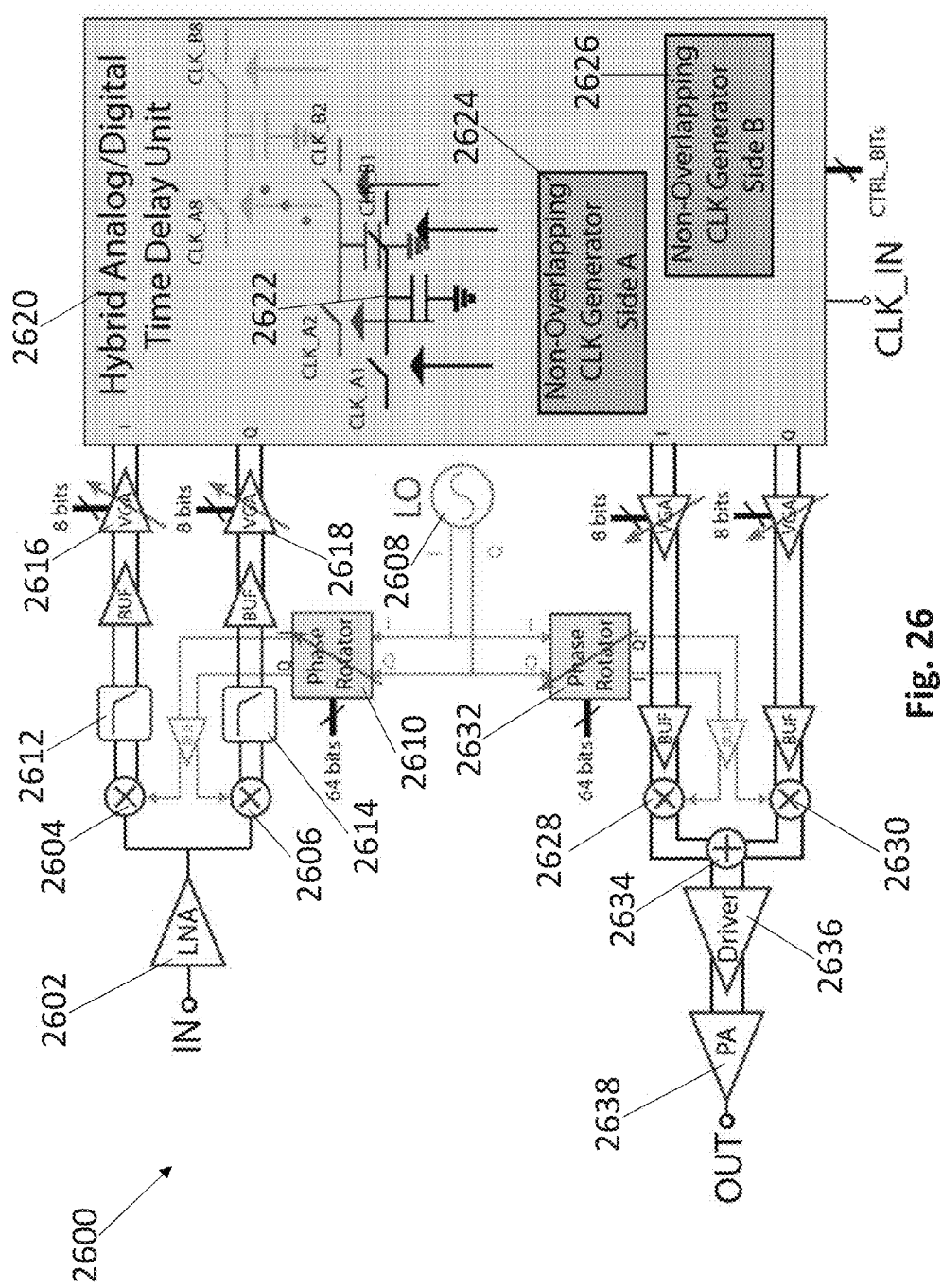
FIG. 26 illustrates a channel implemented using a hybrid analog digital time delay unit in accordance with an embodiment of the invention.
Figure 27A:
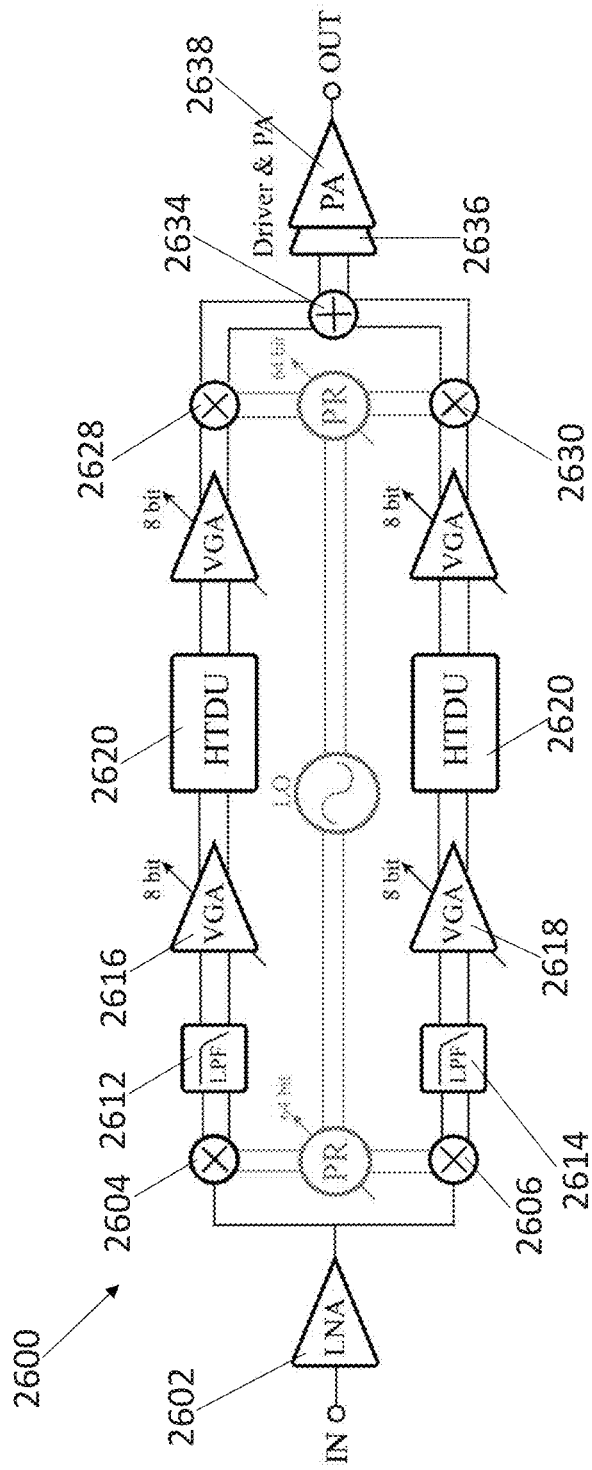
FIG. 27A is a schematic diagram of a channel implementing a hybrid analog/digital time delay unit in accordance with an embodiment of the invention.

Time Delay Beamforming Element Incorporating Hybrid Analog/Digital Time Delay Unit A channel implemented using a hybrid analog/digital time delay unit in accordance with an embodiment of the invention is illustrated in FIGS. 26 and 27A. The channel 2600 includes an LNA 2602 followed by an I/Q down-conversion mixer 2604, 2606. The I/Q mixerâs LO 2608 can be generated on chip. The LO signals pass through a vector sum phase rotator 2610 that can provide 360 phase control.

The output of the I/Q down-conversion mixer is filtered 2612, 2614 and variable gain amplifiers 2616, 2618 condition the baseband I/Q signals before they are provided to the hybrid analog/digital time delay unit 2620. The hybrid analog/digital time delay unit 2620 can be implemented with parallel capacitors 2622 that are switched using a pair of NOCs 2624, 2626 or in any other appropriate manner that achieves fine resolution and broad range.

After the hybrid analog/digital time delay unit 2620, the time delayed I/Q signals are up-converted 2628, 2630 using phase rotated 2632 LO signals, where the phase control of the phase rotator 2632 is independent from the phase rotator 2610 utilized to apply a phase shift to the LO 2608 signal during down-conversion. The up-converted I/Q signals are recombined at RF in a vector summer 2634 and transmitted by a driver 2636 and PA 2638.

While specific channel implementations incorporating hybrid analog/digital time delay units are discussed above with respect to FIGS. 26 and 27A, any of a variety of channel architectures can be utilized with similar hybrid analog/digital time delay units as appropriate to the requirements of specific applications in accordance with various embodiments of the invention. For example, a number of variations can be implemented with respect to the hybrid analog/digital time delay unit and the channel shown in FIGS. 26 and 27A. In several embodiments, the offset between the sample and write clocks in the switched capacitor hybrid analog/digital delay may be controlled with a programmable delay lock loop (DLL). In addition, the clock signal utilized within the delay cells of the hybrid analog/digital time delay unit may be supplied externally or synthesized on chip. Furthermore, the clock signal can be synthesized from the LO signal utilized in the mixers of the channel.

While the channels described above with respect to FIGS. 26 and 27A can utilize two phase shifters (one in the receiver path and one in the transmit path), channels in accordance with many embodiments of the invention only use one phase shifter and a time delay unit. A number of embodiments, integrate the time delay unit with a pipeline ADC and a digital power amplifier. In many of these embodiments, the sample and write clock relative phase in the hybrid analog/digital time delay unit can be used to delay the pipeline ADC output by time steps greater than and less than a clock period. Furthermore, while the channels described above with reference to FIGS. 26 and 27A utilize direct down conversion with an IQ mixer and separate I/Q baseband delays, channels in accordance with several embodiments of the invention instead use IF down-conversion with the appropriate filtering and a single delay. Accordingly, it should be readily appreciated that there are many ways in which to implement channels for use in redistributors in accordance with various embodiments of the invention and that the implementations are largely only limited by the requirements of specific applications.

Figure 27B:
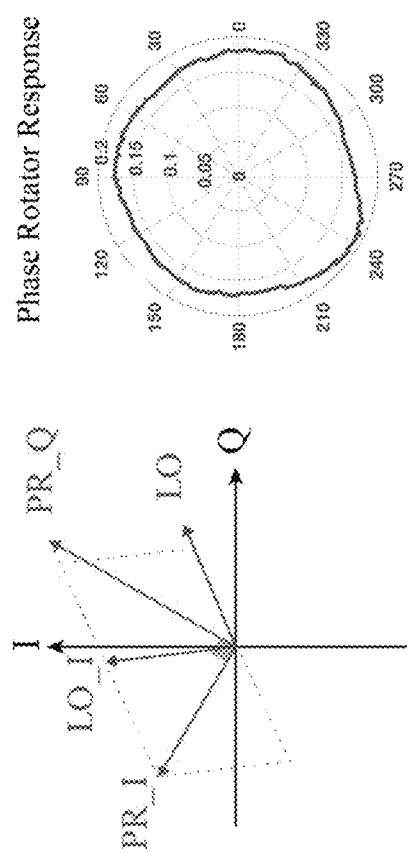
FIG. 27B is various graphs illustrating various vector sum phase rotator performances of the circuit of FIG. 27A.
Figure 27C:
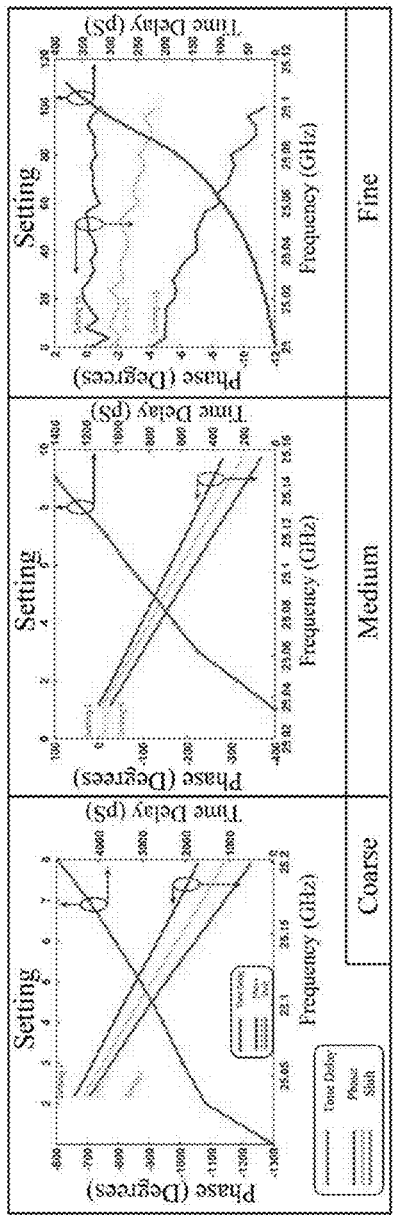
FIG. 27C is various graphs illustrating true time delay coarse, medium, and fine delay performance of the circuit of FIG. 27A.
Figure 27D:
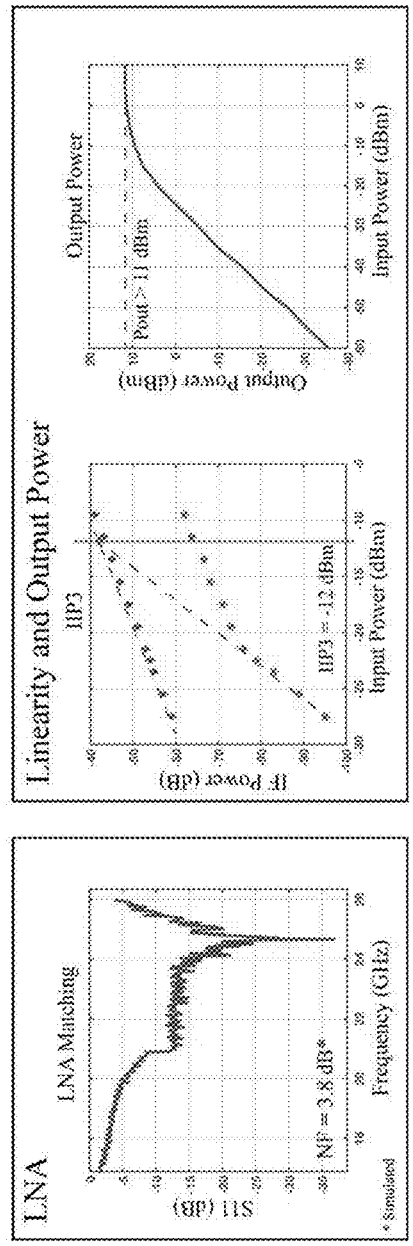
FIG. 27D is various graphs illustrating various LNA properties of the circuit of FIG. 27A.

FIG. 27B illustrates various vector sum phase rotator performances. FIG. 27C illustrates true time delay coarse (left), medium (middle), and fine (right) delay performance. FIG. 27D illustrates LNA input matching (left) and linearity and output power (middle and right graph). The linearity and output power are illustrated in terms of receive chain IIP3 and system gain, output power, and compression curves.

Figure 28B:
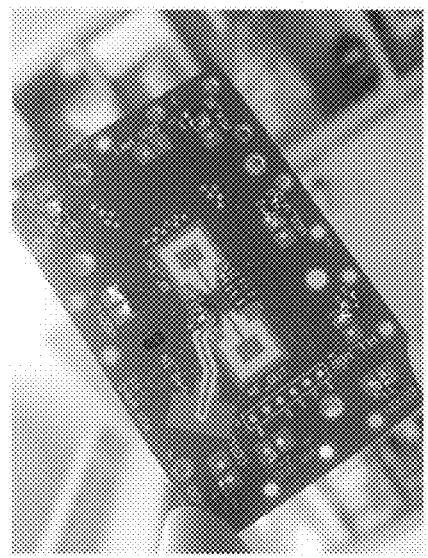
FIG. 28B illustrate a printed circuit board incorporating transmit and receive antenna elements according to an embodiment of the invention.
Figure 28A:
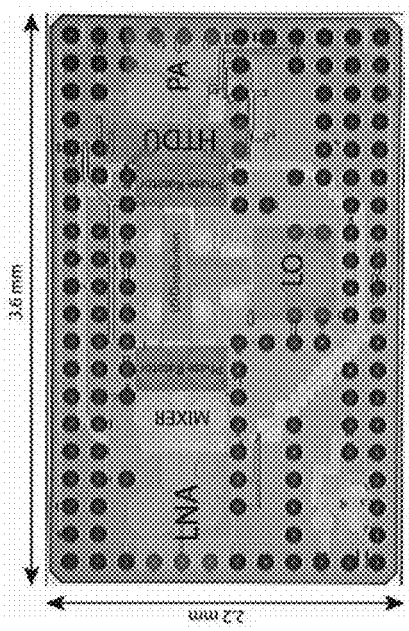
FIG. 28A is a schematic diagram for an integrated circuit of the circuit of FIGS. 26 and 27A.

A channel similar to the channel described above with respect to FIGS. 26 and 27A can be implemented on an integrated circuit as shown in FIG. 28A. A printed circuit board incorporating transmit and receive antenna elements that is connected to a channel integrated circuit in accordance with an embodiment of the invention is shown in FIG. 28B.

Figure 28C:
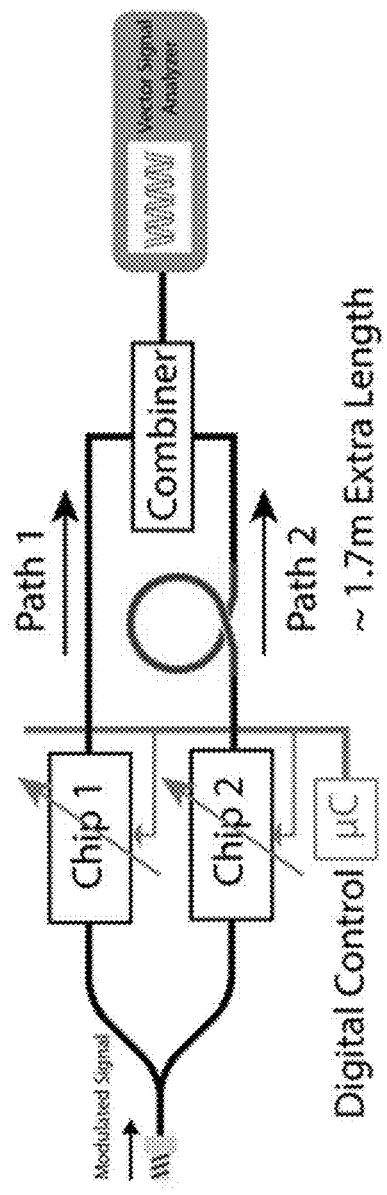
FIG. 28C illustrates an experimental configuration to demonstrate system scalability for large aperture applications.
Figures 29A, 29B:
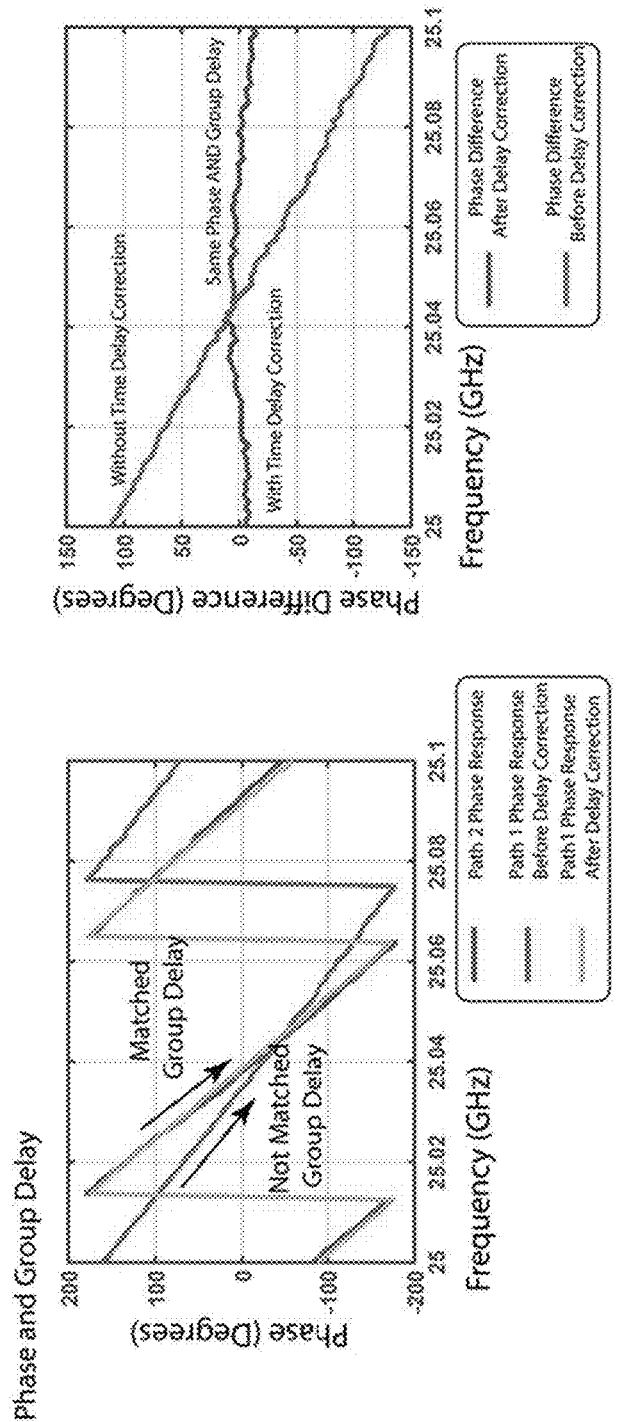
FIG. 29A shows a comparison between an unmodified Path 1 signal a time modified Path 1 signal and the Path 2 signal from the experimental configuration shown in FIG. 28C.
FIG. 29B shows the phase difference with frequency before and after time delay correction in the Path 1 signal from the experimental configuration shown in FIG. 28C.

In order to demonstrate system scalability for large aperture applications, the ability of two channel integrated circuits to maintain data coherence for a 80 Mbps QPSK signal when separated by 6 ns of time offset was tested using the experimental configuration illustrated in FIG. 28C. It is important to note that the LOs for the two channel ICs were not phase locked. Test results obtained using this experimental configuration are shown in FIGS. 29A and 29B.

Turning first to FIGS. 30A and 30B, the hybrid analog/digital time delay unit of the channel whose input signal was not delayed (Path 1) is used to adjust the phase and group delay of its transfer function to match that of the signal in the delayed path (Path 2). A comparison between the unmodified Path 1 signal, the time modified Path 1 signal and the Path 2 signal is shown in FIG. 30A. As can readily be appreciated introduction of a time delay into the Path 1 signal by the hybrid analog/digital time delay unit achieves matched group delay between the Path 1 and Path 2 signals at the receiver. The phase difference with frequency before and after time delay correction in the Path 1 signal is shown in FIG. 30B.

The ability of the channel integrated circuits described above with reference to FIGS. 30A and 30B to control the relative time delay between two received signals without sharing a phase locked LO signal demonstrates the scalability of the channels described herein including (but not limited to) channels that employ frequency conversion and hybrid analog/digital time delay units. Accordingly, it can be shown that such channels can be used to implement spatial redistributors having large arrays of antenna elements with time delayed signal paths through the redistributor.

As it is observed extensively above, redistributors in accordance with various embodiments of the invention are not limited to any specific channel design and can in fact utilize multiple different channel architectures to form a single time delay receive and/or transmit beamforming array. Furthermore, a number of channels utilized in spatial redistributors in accordance with various embodiments of the invention utilize multiple channels, where one or more of the channels incorporates a sub-array of antenna elements. Channels that can be utilized with sub-arrays of elements to collectively perform time delay beamforming in accordance with a number of embodiments of the invention are discussed below.

To provide sufficient sample rate for an input signalâs bandwidth, multiple switched capacitors can be placed in parallel in an n-path configuration similar to the configuration shown in FIG. 30A to implement a hybrid analog/digital time delay. The input and output switches of the parallel switched capacitors can be controlled by two separate non-overlapping clock generators (NOCs) as shown in FIG. 30B. The time delay introduced by the hybrid analog/digital time delay can be controlled by the relative phase of the two NOCs.

In the hybrid analog/digital time delay 3000 illustrated in FIG. 30A, eight (8) switched capacitors 3002 are utilized, where the time delay introduced by switched capacitors is controlled by the relative phase of two NOCs 3004, 3006. As can readily be appreciated, the number of parallel switched capacitors that can be utilized is not fixed at eight and is largely dependent upon the requirements of specific applications. In many embodiments, the hybrid analog/digital time delay 3000 enables independently configurable fine, medium, and coarse controls for the relative phase of the two NOCs 3004, 3006. The coarse control circuit can change the location of the pulse in the output NOC. In a number of embodiments, the fine and medium control circuits can change the phase of the clock driving the output NOC.

Figure 31A:
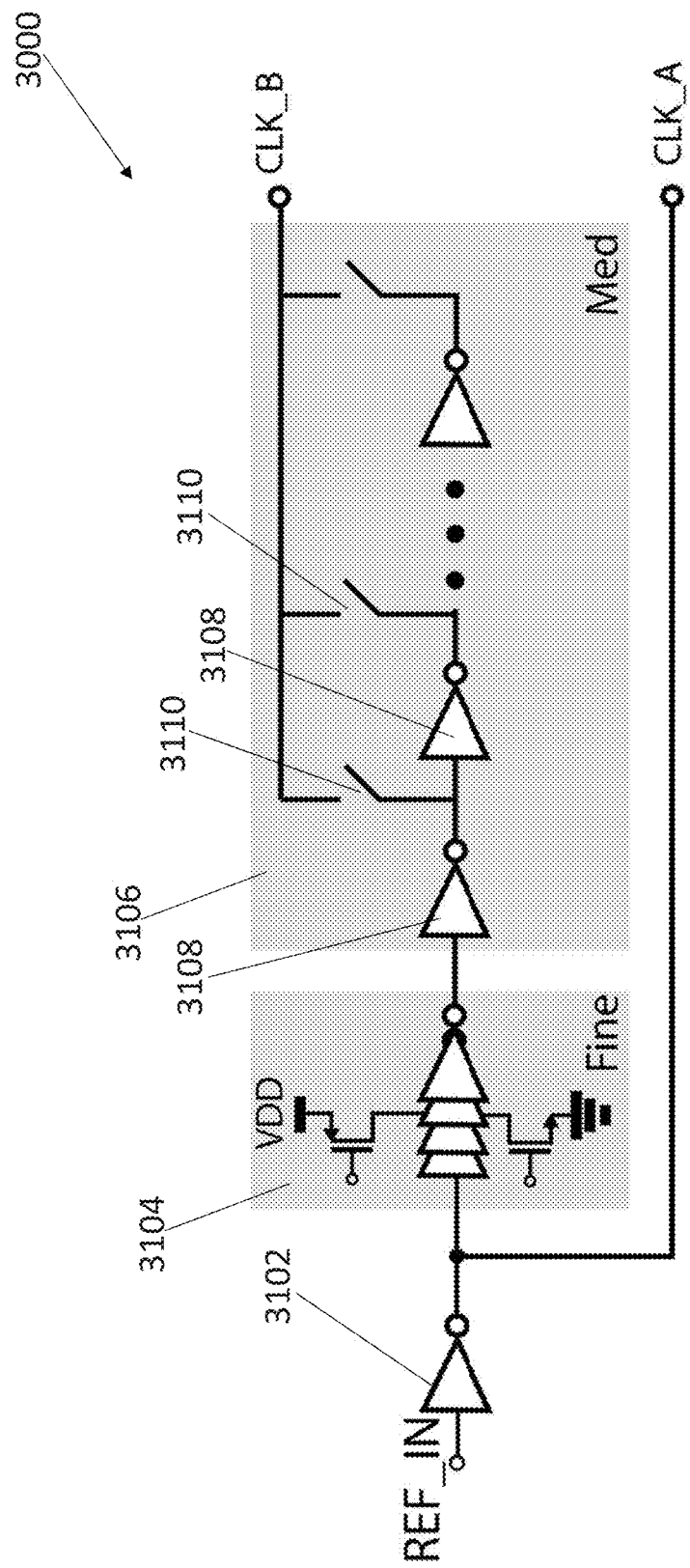
FIG. 31A illustrates the combination of a fine control circuit and a medium control circuit in accordance with an embodiment of the invention.
Figure 31B:
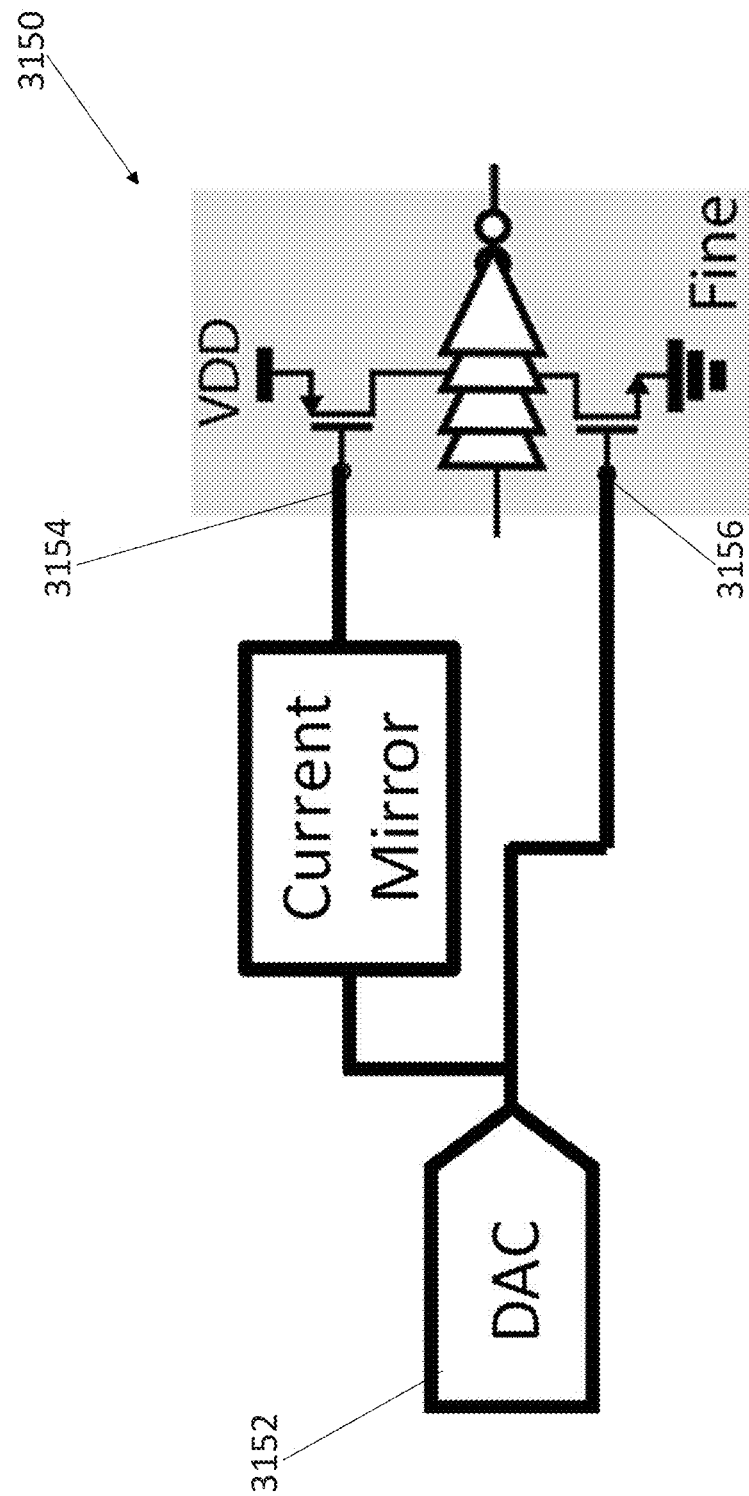
FIG. 31B illustrates a fine control circuit in accordance with an embodiment of the invention.

The combination of a fine control circuit and a medium control circuit in accordance with an embodiment of the invention is illustrated in FIG. 31A. The circuits 3100 receive a reference signal 3102 from an NOC. The fine control circuit 3104 is shown in greater detail in FIG. 31B. The fine control circuit 3150 can be implemented using a DAC 3152 to change the bias 3154, 3156 of a chain 3158 of current starved inverters carrying the clock signal. The medium control circuit 3106 can add or remove inverters 3108 to the output clock signal path of an NOC using switches 3110.

Figure 32:
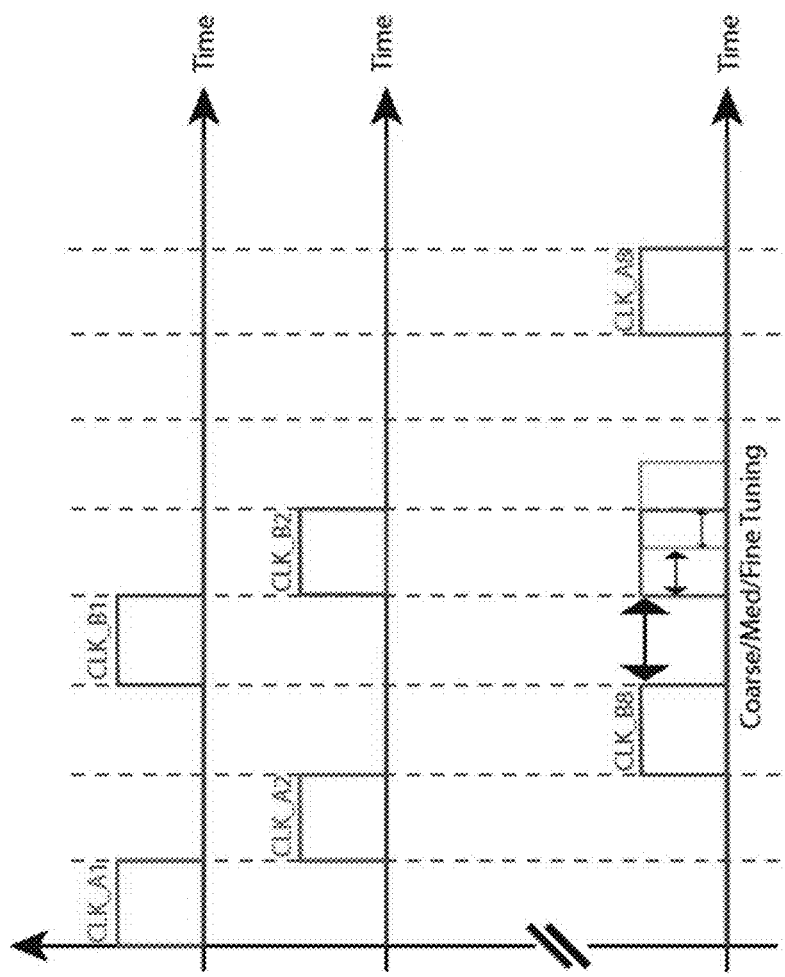
FIG. 32 is a timing diagram illustrating the manner in which coarse, medium and fine controls can adjust phase difference between NOCs in accordance with an embodiment of the invention.

The manner in which the coarse, medium and fine controls can adjust the phase difference between the NOCs shown in FIG. 31A is illustrated in FIG. 32. The Clk_B8 signal can be time delayed by a time delay introduced by the coarse control signal, and the resulting signal is further time delayed by the time delays introduced into the NCO output by the fine and medium controls.

Moreover, although various redistributors are described above with reference to FIGS. 26-32, it should be understood that any combination of the various structural and functional elements of such redistributors can be included and/or omitted in any of the decentralized signal redirecting systems or redistributors discussed throughout.

Example Scalable Redistributor Setup

A radiative, 4-branch, receive and transmit capable, redistributor was produced. Each branch included an integrated circuit (IC) mounted on a printed circuit board (PCB) with orthogonally polarized patch antennas. The redistributor includes a number of these branch PCBs arranged in the desired spatial configuration. The branch circuit board in accordance with an embodiment of the invention is presented in FIG. 33A. A simulated patch antenna S-parameters (input matching and isolation) is presented in FIG. 33B. The radiation pattern of the antenna is presented in FIG. 33C. The simulated isolation between antennas is ~50 dB which may be high enough to not induce significant feedback effects.

Figure 34:
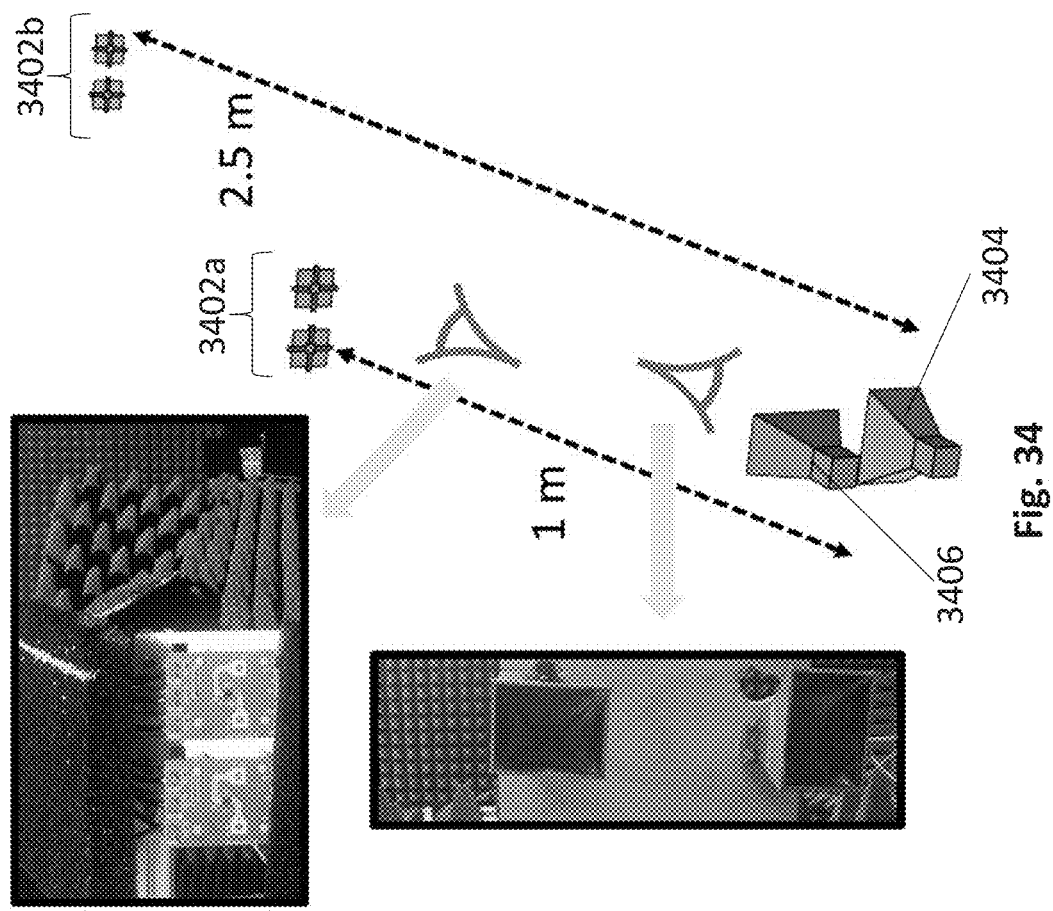
FIG. 34 is an experimental design demonstrating the scalable spatial redistributor's design potential.

A redistributor capable of being utilized within large scale array applications where there is no shared timing reference between branches is depicted in FIG. 34. Branches 3402a, 3402b are placed in two pairs separated by 1.5 m. A transmit horn antenna 3404 and a receive horn antenna 3406 are placed 1 m from the leading branch pair. This transmit and receive horn antenna pair is used to excite the router and measure its re-radiated beam. The total round-trip path length difference between the front pair 3402a and back pair 3402b is approximately 3 m, which corresponds to 10 ns of delay. The branch circuits share no timing information and use internal free running VCOs to provide the LO signal for the circuit.

Figure 35:
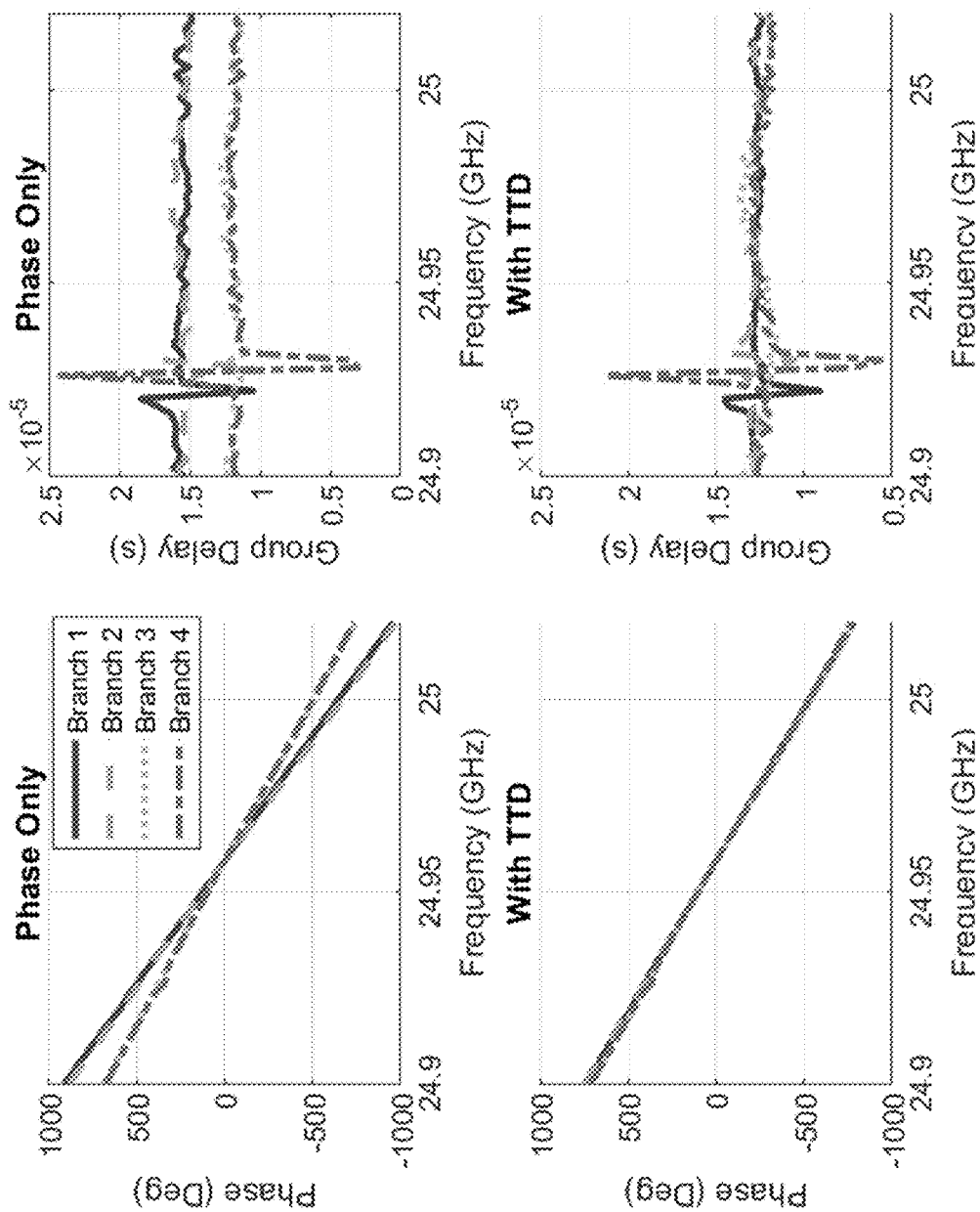
FIG. 35 is various plots comparing spatial redistributors using phase only delay in comparison to phase and true time delay.

FIG. 35 is four graphical representations of the results of a test comparing redistributors using true time delay (TTD) in comparison to redistributors using phase only delay. The top two graphs represent an example configuration which steers the routed beam using only the phase rotators. This matches the elements' phases at only a single frequency point. The 10 ns time delay mismatch between the branch pairs causes a difference in group delay (slope of the phase response) and prevents coherent combination of the branches' signals outside of a narrow bandwidth. The bottom two graphs represent a second example configuration using TTD in addition to the phase rotators to match the branch phase responses over a frequency band. The results were obtained by connecting a vector network analyzer (VNA) to the transmit and receive antennas of the set-up, the response of each branch can be measured individually. The measurements with TTD clearly illustrate matched phase and group delay for all four branches, demonstrating the true time delay adjustment capability of the branch circuit. The peaks in group delay may be caused by LO leakage of each branch circuit.

Figure 36:
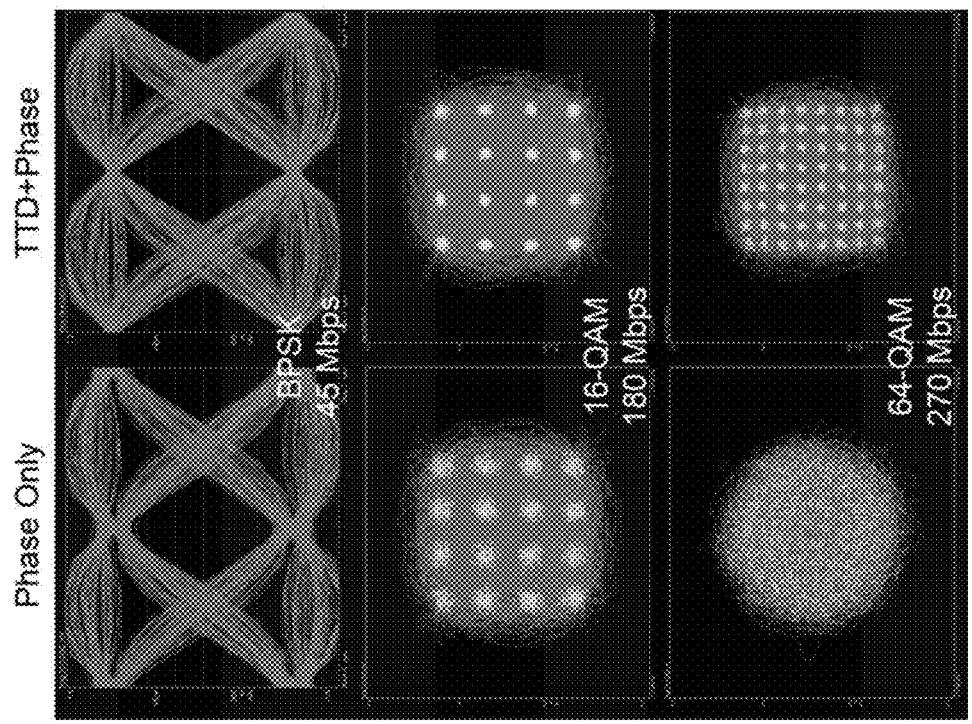
FIG. 36 is BPSK eye diagrams and 16-QAM and 64-QAM constellations of spatial redistributors comparing performance of phase only delay and phase and true time delay.

The coherence restored by the branch circuit true time delay may be beneficial for the transmission of data by large arrays. Without this correction, ISI may degrade the re-routed data. The same redistributor setup and branch configurations discussed in connection with FIGS. 34 and 35 were excited by a 24.96 GHz signal modulated with BPSK, 16-QAM, and 64-QAM data streams at 45 Mbps. The re-routed signals were measured and demodulated. The BPSK eye diagram and 16-QAM and 64-QAM constellations and results of the demodulation are shown in FIG. 36. The images on the left hand side correspond to phase-only steering while the images on the right show the results with combined phase and time delay steering. The addition of true time delay noticeably improves the BPSK eye diagram and improves its EVM from 11.4% to 5.2%, while the 16-QAM EVM is improved from 8.6% to 4.4%. The 64-QAM constellation is changed from nearly unrecognizable with phase only steering to an EVM of 4% with phase and time delay steering. While 45 Mbps is sufficient to observe the importance of true time delay correction, it can be even more beneficial at higher modulation rates.

Moreover, although various redistributors, antennas, and/or experimental designs are described above with reference to FIGS. 33-36, it should be understood that any combination of the various structural and functional elements of such redistributors can be included and/or omitted in any of the decentralized signal redirecting systems or redistributors discussed throughout.

Dual Beam Scalable Redistributors

It has been discovered that true time delay capability within each branch can also be used to independently steer beams at two different frequencies. A phased array can form a beam when the phases of the signals radiated by each element in the array match in the desired direction, creating constructive interference. A dual beam array may benefit from this constructive interference occurring in two desired and potentially arbitrary directions at two different frequencies. Programmable true time delay can allow for the phase response slope (group delay) of an element to be changed, while a programmable phase rotator can change the phase response offset or intercept. Previously, two degrees of freedom were used to match the offset and slope of multiple branches over a band of frequencies to prevent ISI, but they can also be used to match the phase response of the branches at one frequency in one direction and another frequency in another direction. This in effect, creates two independently controlled full power beams from the array. As can readily be appreciated dual beam redistributors can be used in place of and/or in combination with any of the redistributors in any of the systems described above.

Advantageously, multi-beam microwave communication systems may use a single array to serving multiple users. An overview of previous multi-beam approaches can be found in W. Hong, Z. H. Jiang, C. Yu, J. Zhou, P. Chen, Z. Yu, H. Zhang, B. Yang, X. Pang. M. Jiang, Y. Cheng, M. K. T. Al-Nuaimi, Y. Zhang. J. Chen, and S. He. "Multibeam Antenna Technologies for 5G Wireless Communications," IEEE Transactions on Antennas and Propagation, vol. 65, no. 12, pp. 6231-6249, 2017, which is hereby incorporated by reference in its entirety. While, dividing a larger array into independent sub-arrays is a known technique usable with no additional hardware, disadvantageously, it divides power and aperture between the beams. Beneficially, redistributors in accordance with many embodiments of the invention can generate multiple beams without sacrificing power in the beams.

Further, conventional multi-beam systems typically utilize multi-port passive (or semi-active) networks to create a predetermined set of beam patterns. These arrays can transmit or receive, have been fully integrated, and can create a multitude of beams at the cost of design complexity. Examples of these multi-beam systems are described in T. Chu and H. Hashemi, "A Mm-Wave Wideband MIMO RX With Instinctual Array-Based Blocker/Signal Management for Ultralow-Latency Communication," IEEE Transactions on Microwave Theory and Techniques, vol. 54, no. 12, pp. 3553-3564, 2019, which is hereby incorporated by reference in its entirety. However, these arrays are not electronically steerable and often require separate input drivers to achieve their multi-beam capability.

Another common family of multi-beam arrays are digital arrays, which process the same received signals in several parallel channels. Examples of these systems are discussed in S. Jang, R. Lu, J. Jeong, and M. P. Flynn, "A 1-GHz 16-Element Four-Beam True-Time-Delay Digital Beamformer," IEEE Journal of Solid-State Circuits, vo. 54, no. 5, pp. 1304-1314, 2019 and T. Nishio, Hsiao-Ping Tsai, Yuanxun Wang, and T. Itoh, "A high-speed adaptive antenna array with simultaneous multibeam-forming capability," IEEE Transactions on Microwave Theory and Techniques, vo. 51, no. 12, pp. 2483-2494, 2003, which are both hereby incorporated by reference in their entirety. While these systems can create as many steerable beams as processing power and time are available, the topology is typically only utilized for receive arrays, not transmit arrays. Furthermore, there can be dynamic range limitations due to the analog-to-digital conversion process.

Figure 37A:
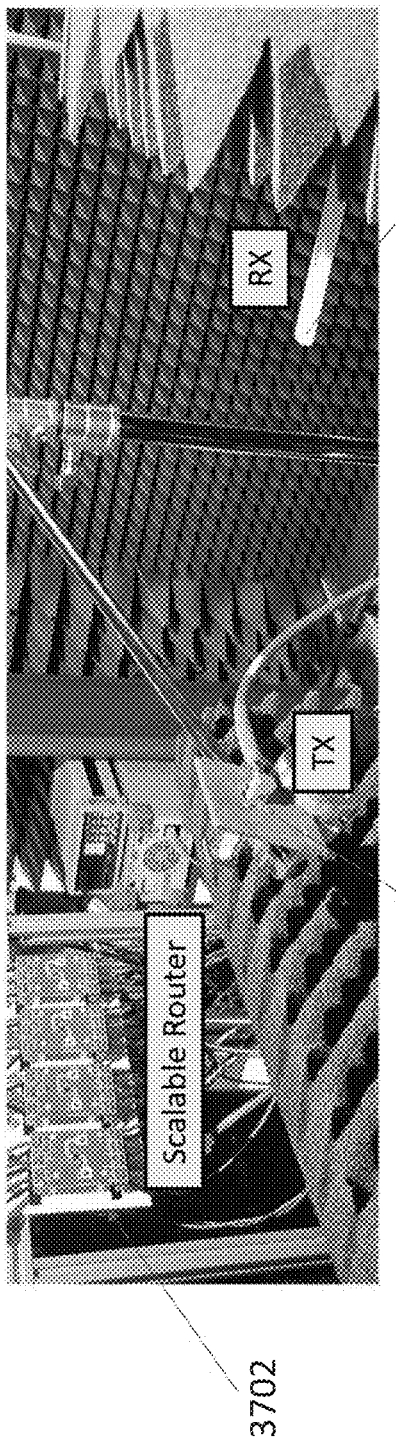
FIGS. 37A and 37B are various views of a spatial redistributor setup according to an embodiment of the invention demonstrating dual beam capabilities.
Figure 37B:
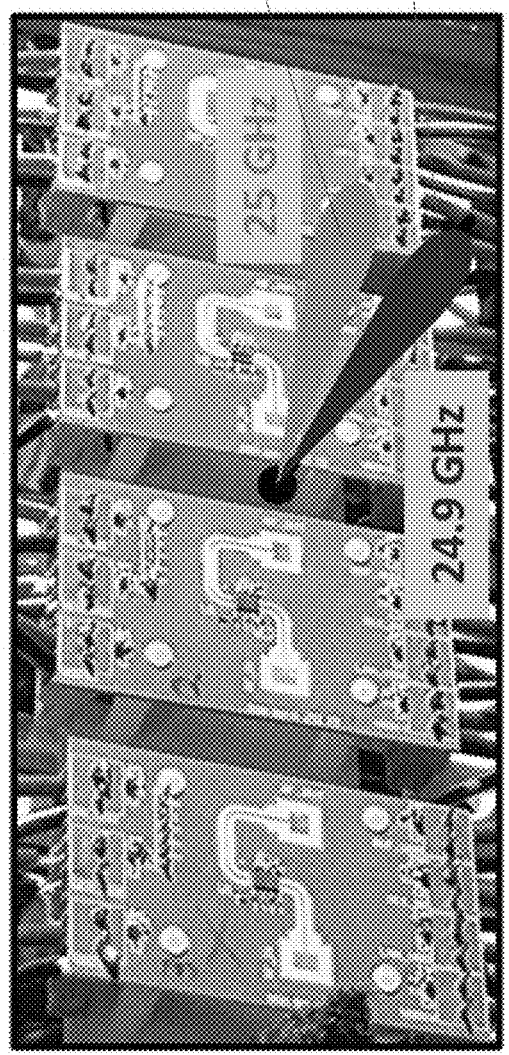

A dual beam redistributor in accordance with an embodiment of the invention is illustrated in FIG. 37A. As illustrated, a 4 branch redistributor 3702 is radiatively excited by a transmit antenna 3704 connected to one port of a VNA, the re-routed signal is measured by a receive antenna 3706 which is connected to the other port of the VNA and mounted on a linear scanning platform. The transmit antenna 3704 is 25 cm from the center of the scalable redistributor 3702, slightly offset beneath it. The receive antenna 3706 (mounted on the linear scanner) is 55 cm from the center of the scalable redistributor 3702. The dual beam capability of the scalable redistributor 3702 is demonstrated by maintaining a broadside beam 3708 at 24.9 GHz while simultaneously steering a beam 3710 at 25 GHz to three different locations (center, left and right) as illustrated in FIG. 37B. The steering positions are separated by 5 cm (close to 5° off the broadside direction) and are chosen in order to stay within the grating-lobes caused by the transmit antenna pitch of 5.5 cm.

Figure 38A:
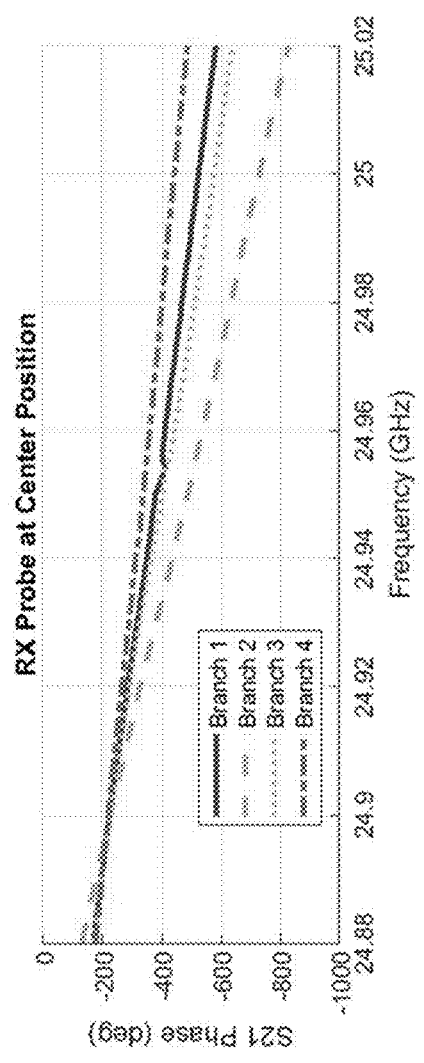
FIGS. 38A and 38B are various graphs of results from the spatial redistributor setup of FIGS. 37A and 37B demonstrating dual beam capabilities.
Figure 38B:
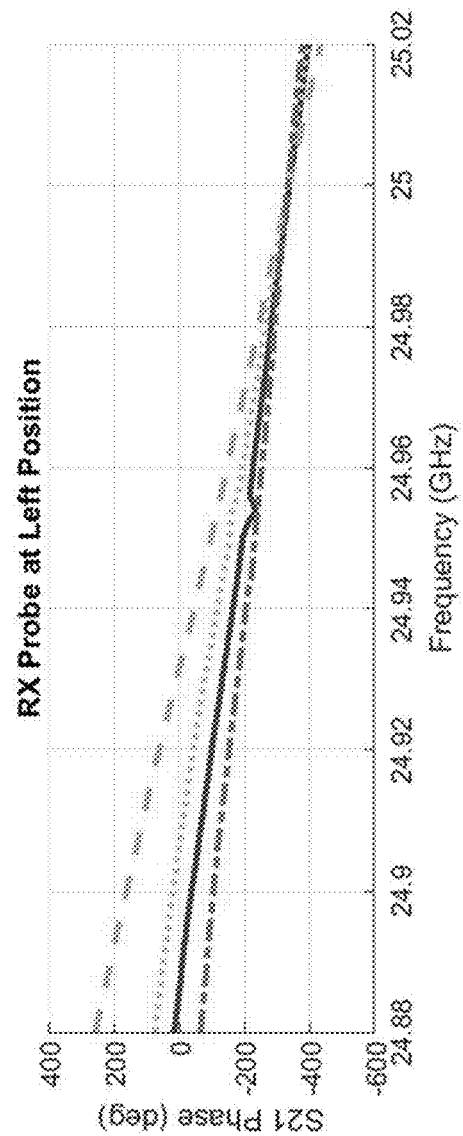

FIGS. 38A and 38B illustrate the measured $S_{21}$ phase for all branches for the configuration where the 24.9 GHz beam 3708 is steered broadside and the 25 GHz beam 3710 is steered left. The phase is measured at two locations: broadside and the position corresponding to the left steered beam 3710. FIG. 38A illustrates the phase for each of the branches at various frequencies at a center position. FIG. 38B illustrates the phase for each of the branches at various frequencies at a left position. The constructive interference responsible for beamforming is evident by the matched phase for all elements at 24.9 GHz for the center probe position as illustrated in FIG. 38A and at 25 GHz for the left probe position as illustrated in FIG. 38B.

Figure 39:
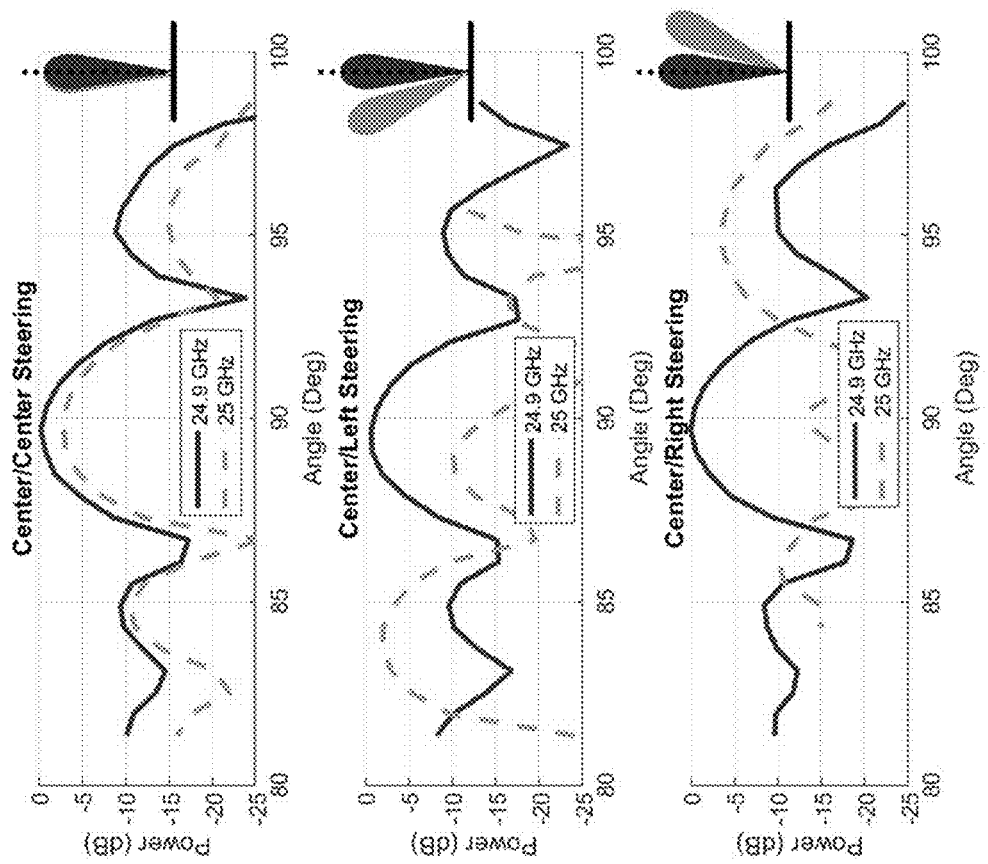
FIG. 39 is various graphs of results from the spatial redistributor shown in FIGS. 37A and 37B demonstrating beam steering of a dual beam.

FIG. 39 illustrates successful steering of the beam at 25 GHz while the broadside beam at 24.9 GHz stays constant. The top graph represents the 25 GHz beam steered broadside while the 24.9 GHz is broadside. The middle graph represents the 25 GHz beam steered left while the 24.9 GHz beam stays broadside. The bottom graph represents the 25 GHz beam steered right while the 24.9 GHz beam stays broadside. Thus, FIG. 39 illustrates successful beam steering of the 25 GHz beam while keeping the 24.9 GHz beam constant. The left and right steered traces have been trimmed to prevent grating lobes (at ~15° away) from appearing on the opposite side. Static reflections caused by other objects near the setup were measured separately and subtracted.

In order to steer beams at two frequencies the branch circuits can benefit from being able to change their relative phase to any value from 0 to 360°. The dual beam redistributor accomplishes this relative change using time delay. In some embodiments, the period of the minimum frequency separation of two frequencies that can be fully independently steered is the maximum achievable time delay. Thus 100 MHz separation may be the smallest achievable for 10 ns of delay control though it is contemplated that other time delays may yield smaller or larger frequency separations.

The dual-beam capability supported by redistributors in accordance with many embodiments of the invention differs from the previously described conventional examples as the two beams can be derived by "frequency multiplexing" the array. By tuning the phase response of the element's at two frequencies, two independent beams can be created. In many embodiments, the ability of the redistributor to employ programmable true time delay means the redistributor is naturally suited to the task of generating dual beams. Because this control is established through analog circuits at baseband it can be used for transmit or receive arrays. Programmable time delay typically grants a second beam to control, but additional degrees of freedom for controlling the element phase response can also be added to achieve additional control and/or beams.

While this approach has been discussed in terms of dual beam capabilities, embodiments using more beams have as well been contemplated. For example, different beams with different frequencies may be steered in different directions. For example, a three beam redistributors can be utilized with three different frequency beams being steered in three different directions.

Moreover, although various redistributors are described above with reference to FIGS. 37-39, it should be understood that any combination of the various structural and functional elements of such redistributors can be included and/or omitted in any of the decentralized signal redirecting systems or redistributors discussed throughout.

Multi Channel System

Figure 40:
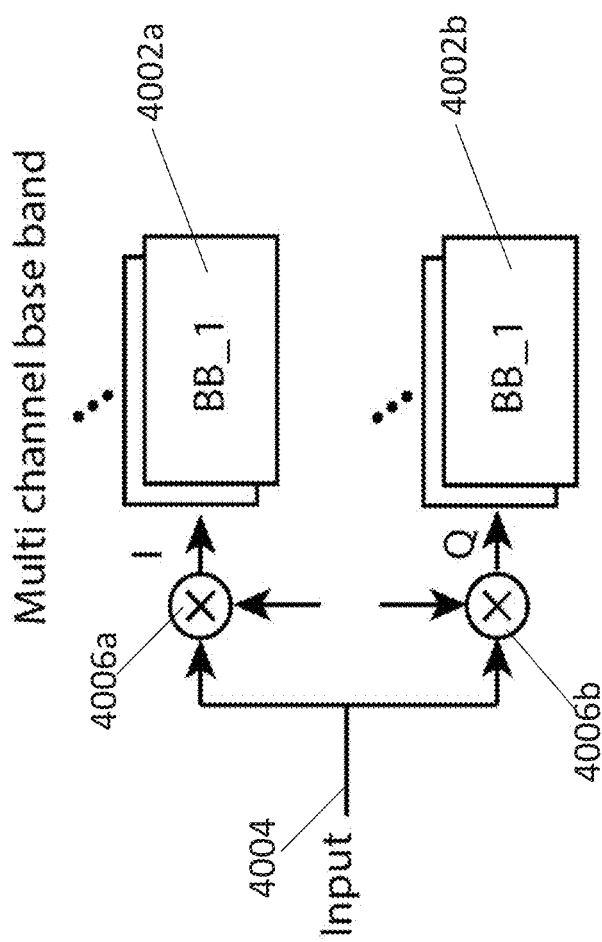
FIG. 40 illustrates a spatial redistributor in accordance with an embodiment of the invention.

A system similar to the redistributor of FIG. 22B in accordance with an embodiment of the invention is illustrated in FIG. 40. In FIG. 40, a multi-channel input 4004 delivers a signal to a I path down converting mixer 4006a and a Q path down converting mixer 4006b. The I path down converting mixer 4006a down converts the signal and delivers the down converted signal to a multi-channel time and phase delay component 4002a. Similarly, The Q path down converting mixer 4006b down converts the signal and the delivers the down converted signal to a multi-channel time and phase delay component 4002b.

Figure 41:
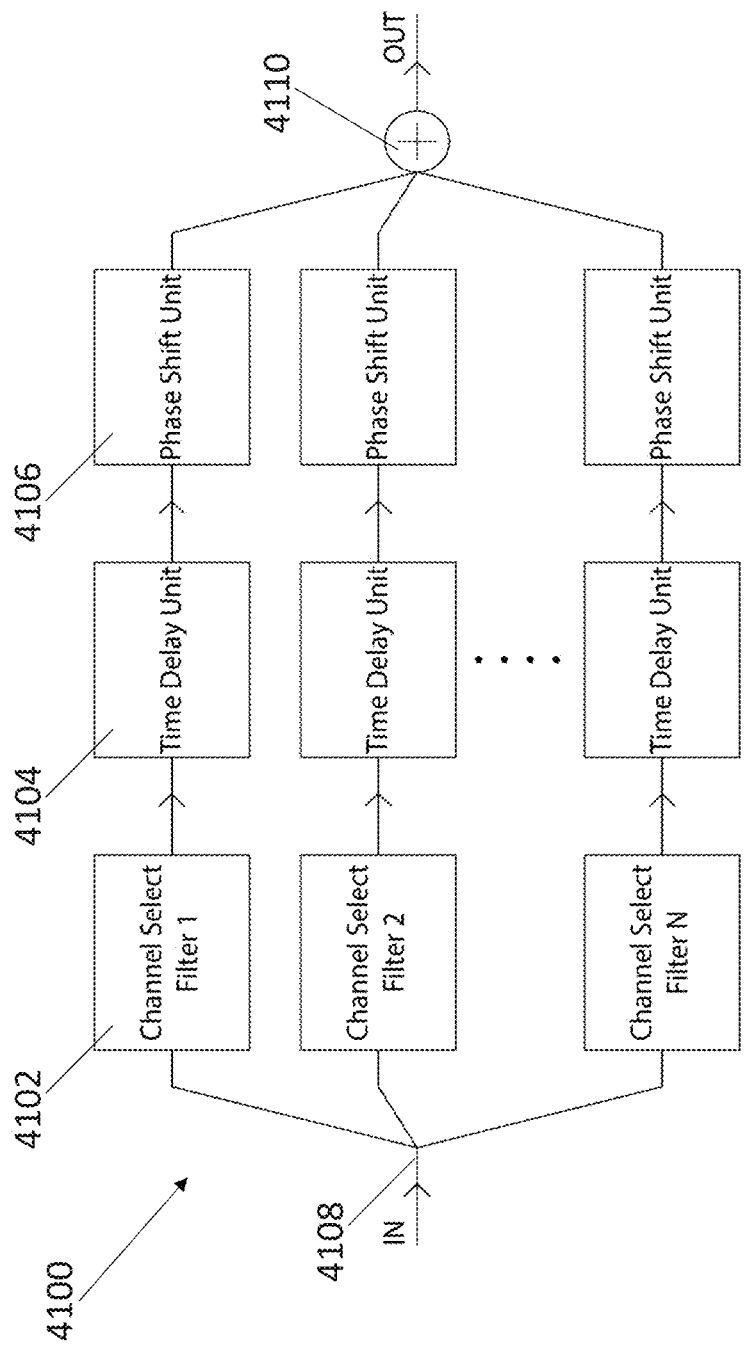
FIG. 41 illustrates a multi-channel time and phase delay component in accordance with an embodiment of the invention.

A multi-channel time and phase delay component 4100, which may be used as the multi-channel time and phase delay components 4002a, 4002b of FIG. 22B, composed of a single multi-channel input and a single multi-channel output in accordance with an embodiment of the invention is illustrated in FIG. 41. This component 4100 may be helpful in achieving multi-beam capability, where multiple, distinct, frequency channels are beam steered independently of each other. The component 4100 can perform individualized signal conditioning for each channel, independently of the other channel responses. In some embodiments, the signal conditioning is composed of a tunable amplitude, phase, and group delay response. Advantageously, this component 4100 can achieve multi-beam capability, where multiple, distinct, frequency channels are beam steered independently of each other. In FIG. 41, the component 4100 includes an input 4108 which receives a multi-channel signal. The multi-channel signal can be delivered to multiple parallel branches which include a channel selection filter 4102, a time delay unit 4104, and a phase shifter 4106. While the time delay unit 4104 and the phase shifter 4106 are illustrated in a specific order, the order of these components may be reversed such that the phase shifter 4106 comes before the time delay unit 4104. After the signal is conditioned through each branch, the branches are then summed through a signal combiner 4110 together at the output to result in a single multi-channel output.

Figure 42:
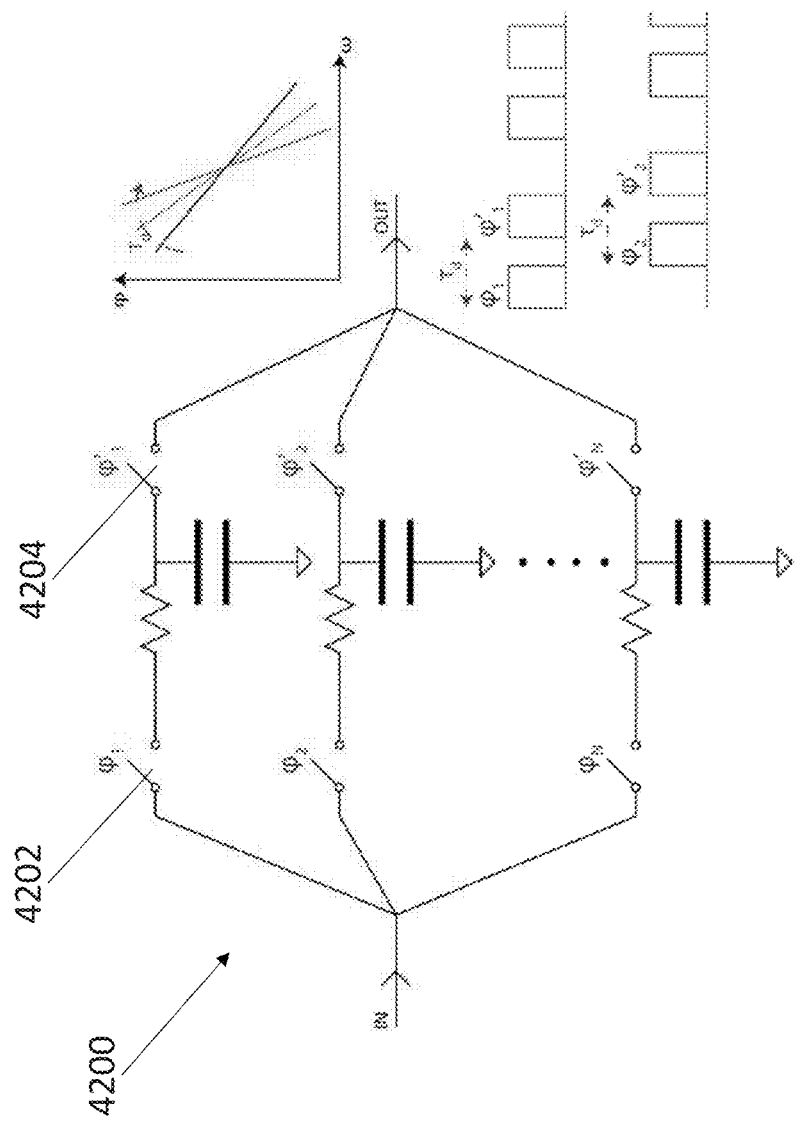
FIG. 42 illustrates a merged channel select filter and time delay unit component in accordance with an embodiment of the invention.

In some embodiments, in the multi-channel time and phase delay component 4100, the channel select filter 4102, time delay unit. 4104, and phase shifter 4106, can be merged in two ways. In a first method, the channel select filter 4102 and the time delay unit 4104 are merged together via the use of a two-port N-path filter with a delay between clocks of input sampling switches and output sampling switches. A low-pass kernel in the N-path filter may either be a continuous time system or have a direct memory-less path between input and output. FIG. 42 illustrates a merged channel select filter and time delay unit component. 4200 according to an embodiment of the invention. The delay between the input and output sampling clocks corresponds to the amount of time-delay between the input and output, and effectively replaces the time delay unit 4104 of FIG. 41 in the signal conditioning chain. The low-pass filter kernel in the N-path filter is selectively chosen to match the bandwidth of the desired channel, and the clock frequency of the input and output samplers is chosen to align with the center frequency of the desired channel. Each branch of the merged component. 4200 can include a first switch 4202 and a second switch 4204. The first switch 4202 and the second switch 4204 are connected to one or more controllers which can open and close the switches 4202, 4204 to delay the signal in each branch.

In some embodiments The merged channel select filter and time delay unit component 4100 may include a sharp filter roll-off by using a complex-pole low-pass filter as the N-path filter kernel. The complex-pole low-pass filter can be a purely passive network employing only switches and capacitors, resulting in a complex-pole N-path filter with only switches and capacitors.

Figure 43:
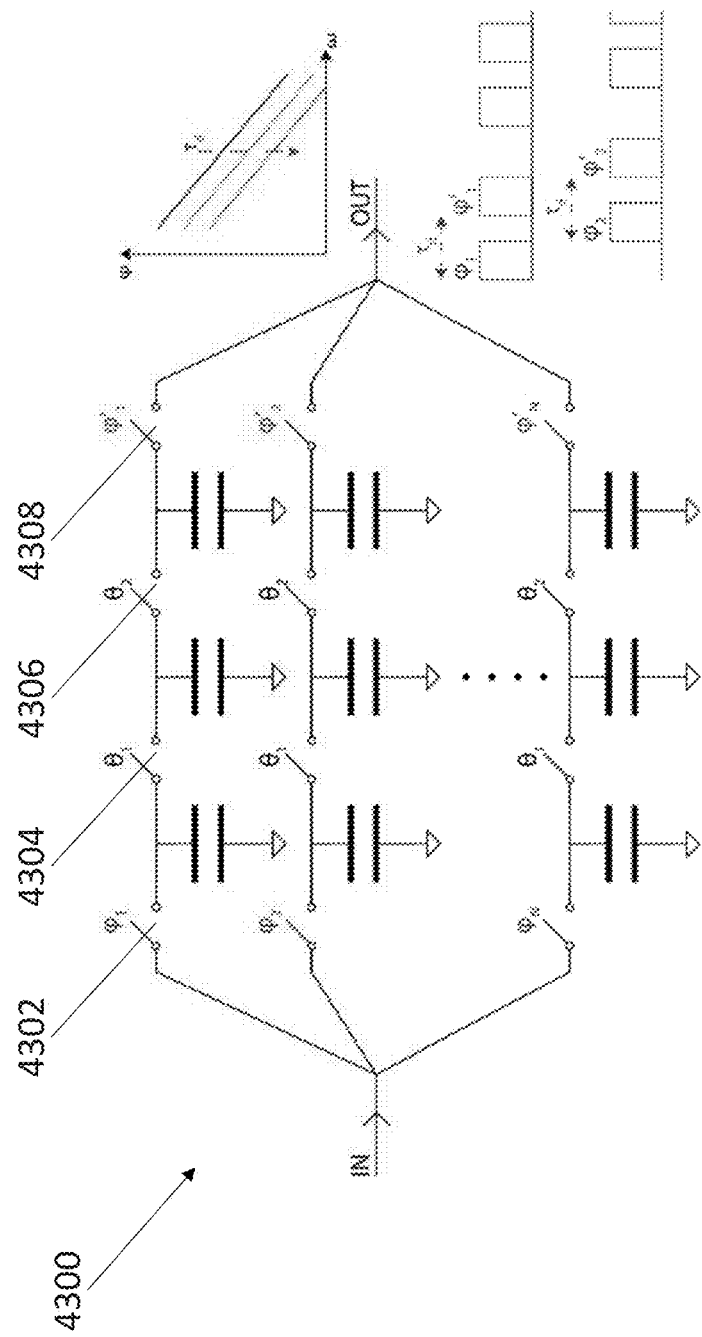
FIG. 43 illustrates a merged multi-channel time and phase delay component in accordance with an embodiment of the invention.

Alternatively, the channel select filter 4102 and the phase shift unit 4104 of the multi-channel time and phase delay component. 4100 can be merged together with a two-port N-path filter with a delay between the clocks of the input sampling switches and the output sampling switches. The low-pass kernel in the N-path filter must not have a direct memory-less path between input and output. This can be achieved with a switched capacitor low-pass filter of second or higher order. FIG. 43 illustrates a merged multi-channel time and phase delay component 4300 in accordance with an embodiment of the invention. The delay between the input and output sampling clocks corresponds to the amount of phase shift between the input and output, where the phase difference is given by the phase shift between the input and output sampling clocks, and effectively replaces the phase shift unit in the signal conditioning chain. The low-pass filter kernel in the N-path filter may match the bandwidth of the desired channel, and the switched capacitor sampling frequency may be much higher than the N-path filter sampling frequency, which may align with the center frequency of the desired channel. Each branch of the merged component 4300 includes multiple switches 4302, 4304, 4306, 4308 which are connected to one or more controllers which open and close the switches 4302, 4304, 4306, 4308 to introduce delay to the signal in each branch. While four switches 4302, 4304, 4306, 4308 and three capacitors are illustrated in each branch, each branch may include more switches and capacitors depending on the amount of delay and phase rotation desired.

Figure 44:
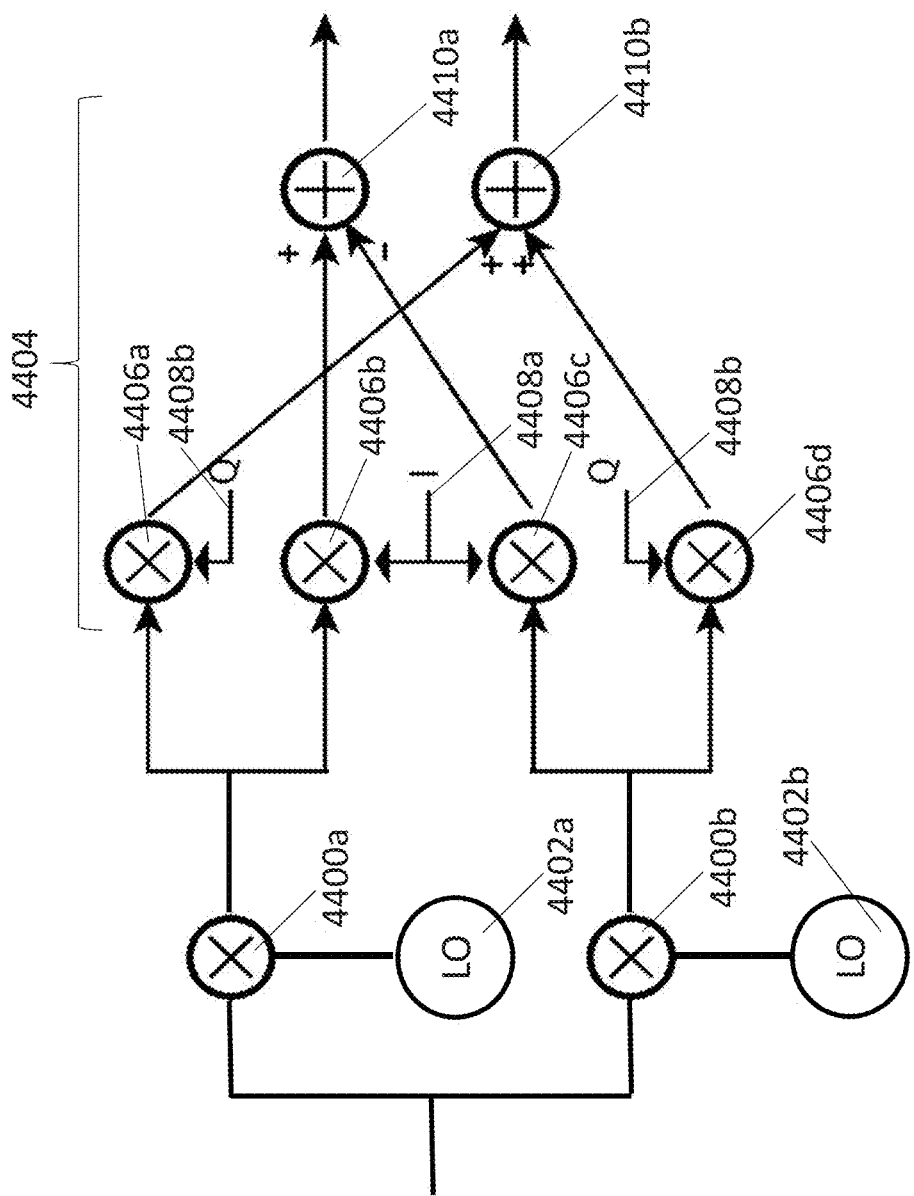
FIG. 44 illustrates an upper and lower band filter in accordance with an embodiment of the invention.

An upper and lower band filter in accordance with an embodiment of the invention is illustrated in FIG. 44. In some embodiments, the upper and lower band filter may include a complex mixer which allows differentiation between input signals below the main carrier frequency and above the main carrier frequency. Typically, an input signal which is above the main carrier frequency (e.g. upper band frequency) and an input signal which is the same amount below the main carrier frequency (e.g. lower band frequency) would be indistinguishable after mixing. However, a complex mixer allows these signals below and above the main carrier frequency to be distinguished. In FIG. 44, an input signal is input to a first mixer 4400a and a second mixer 4400b. The first mixer 4400a mixes the input signal with a first local oscillator signal 4402a and the second mixer 4400b mixes the input signal with a second local oscillator signal 4402b. The first local oscillator signal 4402a and the second local oscillator signal 4402b may be phase separated by 180 degrees such that the first local oscillator signal 4402a is a sine wave and the second local oscillator signal 4402b is a cosine wave. The signal form the first mixer 4400a and the second mixer 4400b may be fed into a complex mixer 4404. The complex mixer 4404 may include a third mixer 4406a, a fourth mixer 4406b, a fifth mixer 4406c, and a sixth mixer 4406d. The third mixer 4406a and the fourth mixer 4406b receive the signal from the first mixer 4400a. The fifth mixer 4406c and the sixth mixer 4406d receive the signal from the second mixer 4400b. The fourth mixer 4406b and the fifth mixer 4406c receive a third local oscillator signal 4408a and the third mixer 4406a and the sixth mixer 4406d receive a fourth local oscillator signal 4408b. The third local oscillator signal 4408a and the fourth local oscillator signal 4408b may be phase separated by 180 degrees such that the third local oscillator signal 4408a is a sine wave and the fourth local oscillator signal 4408b is a cosine wave. The fourth mixer 4406b and the fifth mixer 4406c are connected to a first adder 4410a and the third mixer 4406a and the sixth mixer 4406d are connected to a second adder 4410a. The signal from the fifth mixer 4406c is inverted before it is added to the signal from the fourth mixer 4406b.

Figure 45A:
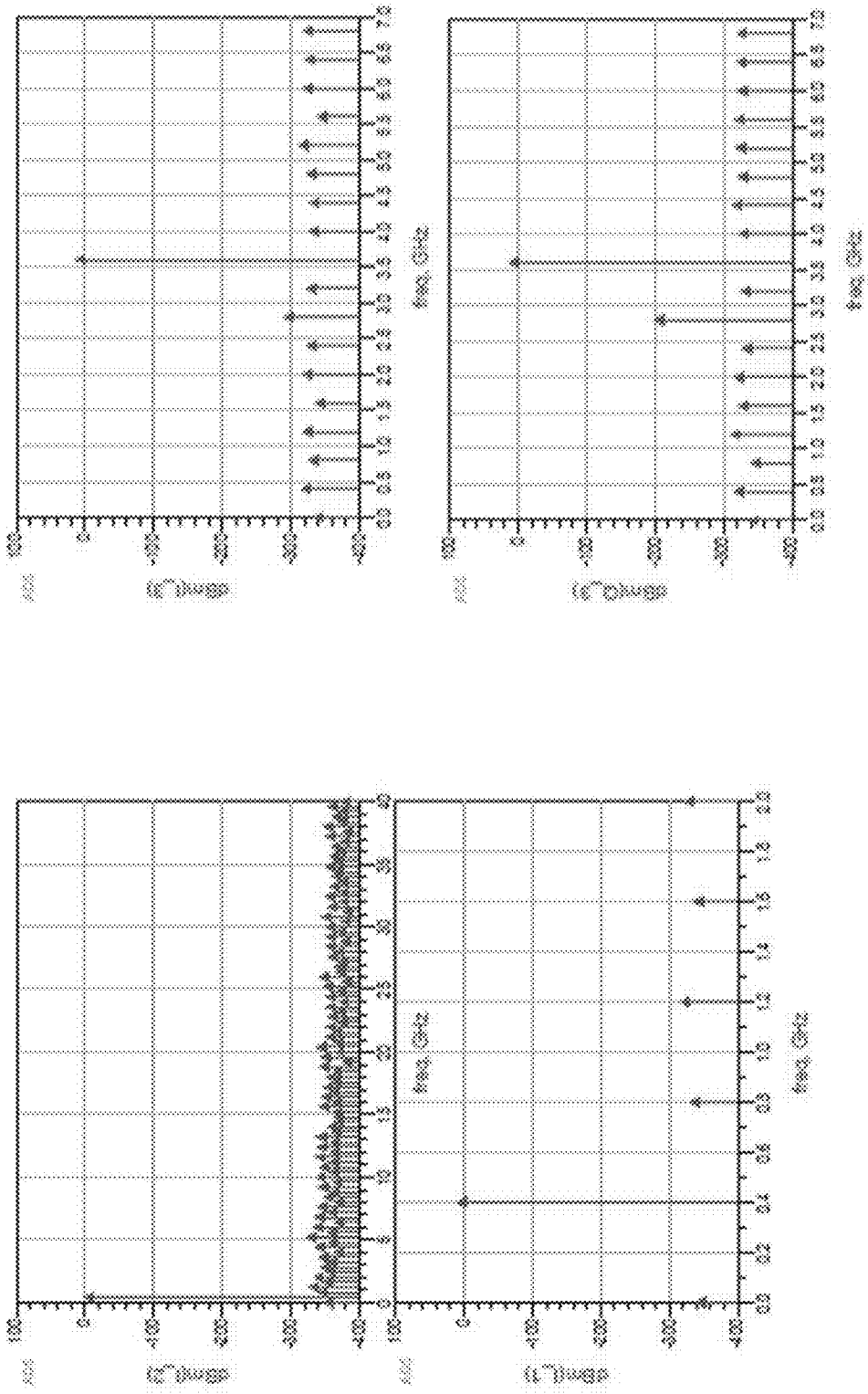
FIG. 45A is multiple graphs in the frequency domain which depict the operation of the upper and lower band filter of FIG. 44 for an example input upper band signal.
Figure 45B:
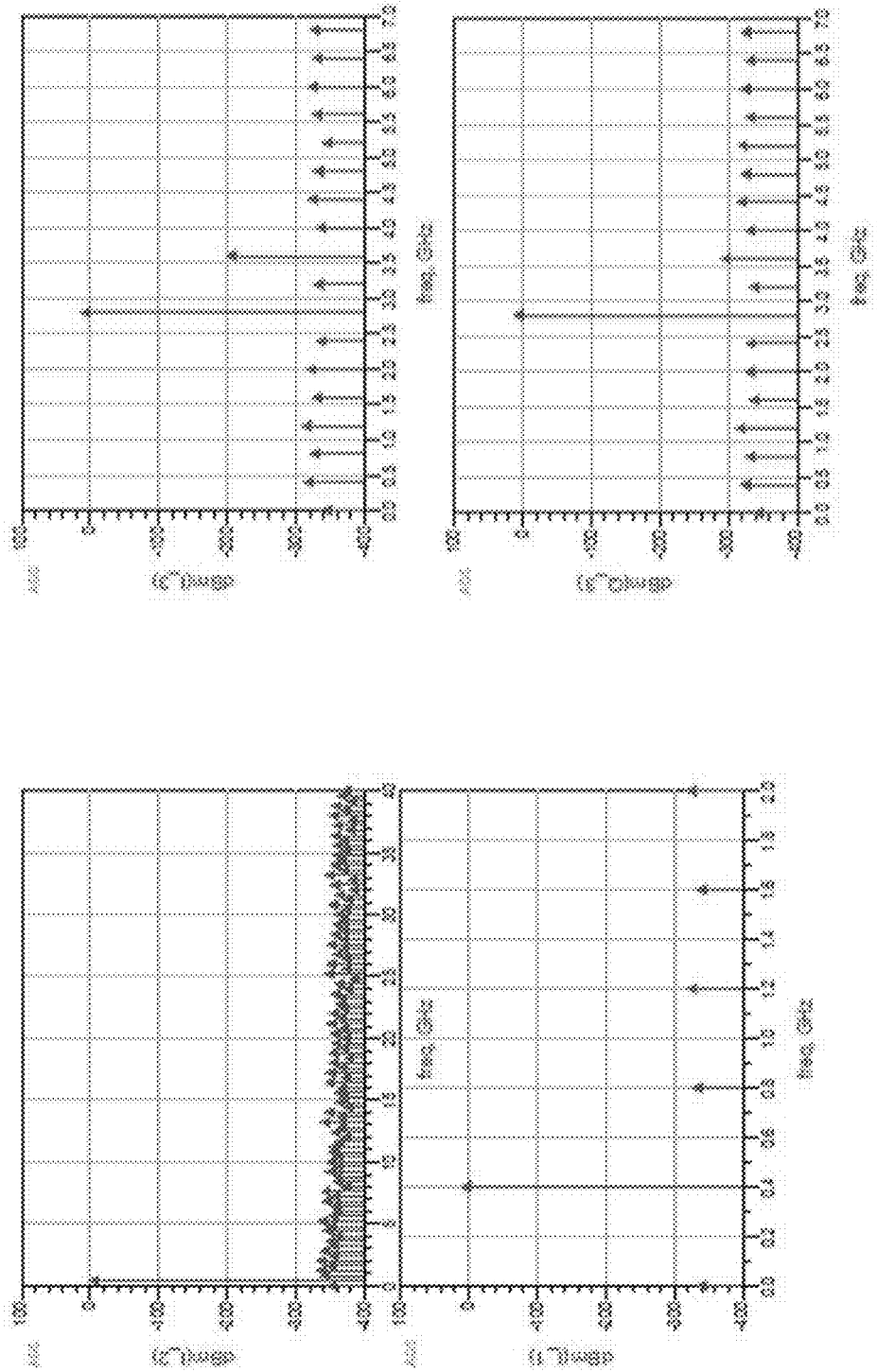
FIG. 45B is multiple graphs in the frequency domain which depict the operation of the upper and lower band filter of FIG. 44 for an example input lower band signal.

FIGS. 45A and 45b includes multiple graphs in the frequency domain which depict the operation of the upper and lower band filter shown in FIG. 44 with respect to an upper band portion of an input signal (e.g. the portion of the signal that includes frequency components that are greater than the signal carrier frequency). The first local oscillator signal 4402a and the second local oscillator signal 4402b are both 28 GHz. The third local oscillator signal 4408a and fourth local oscillator signal 4408b are both 3.2 GHz. The lower left graph and upper left graph depict the mixed down upper band frequency to 400 MHz. The upper right graph and the lower right graph depict the signal after going through the complex mixer 4404. The upper right graph depicts the signal output after the first adder 4410a and the lower right graph depicts the signal output after the second adder 4410b. In FIG. 45a, an upper band frequency of 28.4 GHz is first inputted into the first mixer 4400a and the second mixer 4400b. As illustrated in the upper right and lower right graphs, a signal at 3.6 GHz is outputted from the first adder 4410a and the second adder 4410b which represents the down mixed upper band frequency of 28.4 GHz. In FIG. 45b, a lower band frequency of 27.6 GHz is first inputted into the first mixer 4400a and the second mixer 4400b. As illustrated in the upper right and lower right graphs, a signal at 2.8 GHz is outputted from the first adder 4410a and the second adder 4410b. As discussed previously, the upper band frequency and lower band frequency would typically be mixed to identically signals and thus be indistinguishable however, as illustrated, distinct signals are produced by the upper and lower band filter described in connection with FIG. 44. While example operational frequencies are described above, these are merely illustrative and other operational frequencies are also within the scope of the invention.

Moreover, although various redistributors are described above with reference to FIGS. 40-45, it should be understood that any combination of the various structural and functional elements of such redistributors can be included and/or omitted in any of the decentralized signal redirecting systems or redistributors discussed throughout.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) a radar echo countermeasure, without departing from the scope and spirit of the present invention. Thus, embodiments of the present invention should be considered in all respects as illustrative and not restrictive.

What is claimed is:

1. A spatial redistributor, comprising:
an array of channels, where each of a plurality of independently operating channels in the array comprises:
at least one antenna element configured to wirelessly receive a signal of a first frequency and a second frequency;
an in phase RF chain configured to apply a first phase shift to the received signal and configured to apply a first time delay to the received signal prior to retransmission, where the in phase RF chain comprises:
a first down converting mixer which receives a first signal from a reference oscillator and down converts the received signal in the in phase RF chain prior to the first phase shift and the first time delay; and
a first up converting mixer which receives a second signal from the reference oscillator and up converts the down converted signal in the in phase RF chain after the first phase shift and the first time delay;
a quadrature RF chain configured to apply a second phase shift to the received signal and configured to apply a second time delay to the received signal prior to retransmission, where the quadrature RF chain comprises:
a second down converting mixer which receives a third signal from the reference oscillator and down converts the received signal in the quadrature RF chain prior to the second phase shift and the second time delay; and
a second up converting mixer which receives a fourth signal from the reference oscillator and up converts the down converted signal in the quadrature RF chain after the second phase shift and the second time delay; and
control circuitry configured to control the time delays and the phase shifts applied by the in phase RF chain and the quadrature RF chain;
a summing circuit configured to create an output signal by merging the up converted signal from the in phase RF chain and the up converted signal from the quadrature RF chain; and
wherein the first signal from the reference oscillator received by the first down converting mixer is a cosine phase signal and the third signal from the reference oscillator received by the second down converting mixer is a sine phase signal;
wherein the at least one antenna element is further configured to wirelessly retransmit the output signal; and
wherein the array of channels is configured to steer the signal of the first frequency in a first direction and steer the signal of the second frequency in a second direction different from the first direction.

2. The spatial redistributor of claim 1, wherein the first frequency and second frequency are different frequencies.

3. The spatial redistributor of claim 1, wherein the array of channels is further configured to steer a signal of a third frequency in a third direction different from the first direction and second direction.

4. The spatial redistributor of claim 1, wherein the first frequency, the second frequency, and the third frequency are all different frequencies.

5. The spatial redistributor of claim 1, wherein at least a plurality of the channels in the array of channels do not share a common reference oscillator signal.

6. The spatial redistributor of claim 1, wherein controlling the time delays and phase shifts applied to the received signal achieves at least one of receive beamforming and transmit beamforming.

7. The spatial redistributor of claim 1, wherein controlling the time delays and phase shifts applied to the received signal achieves receive and transmit beamforming.

8. The spatial redistributor of claim 1, wherein at least a plurality of the channels in the array of channels apply at least one of a time delay and a phase shift to a received analog signal.

9. The spatial redistributor of claim 1, wherein each of the in phase RF chain and the quadrature RF chain is configured to
obtain analog samples of the received signal; and
apply delays to the analog samples of the received signal.

10. The spatial redistributor of claim 9, wherein:
obtaining analog samples of the received signal comprises sampling the received signal onto a set of parallel switched capacitors; and
applying delays to the analog samples of the received signals comprises controlling the delay between the sampling of the received signal onto the capacitors in the set of parallel switch capacitors and the readout of the capacitors in the set of parallel switched capacitors.

11. The spatial redistributor of claim 10, wherein each of the in phase RF chain and the quadrature RF chain further comprises two non-overlapping clock generators (NOCs) that control the sampling of the received signal onto the capacitors in the set of parallel switch capacitors and the readout of the capacitors in the set of parallel switched capacitors.

12. The spatial redistributor of claim 10, wherein at least a plurality of the channels in the array of channels have reference oscillators that produce different time bases.

13. The spatial redistributor of claim 1, wherein at least a plurality of the channels in the array of channels are configured to:
digitize the received signal;
apply time delays and phase shifts to the digitized signal; and
generate an analog signal using a digital to analog converter;
wherein the output signal is based upon the generated analog signal.

14. The spatial redistributor of claim 1, wherein the array of channels forms a spatial router configured to utilize routing information to dynamically adjust the manner in which received signals are redirected.

15. The spatial redistributor of claim 14, wherein the spatial router comprises at least one channel configured to decode data modulated onto the received signal and extract routing information from the decoded data.

16. The spatial redistributor of claim 15, wherein the routing information comprises at least one geometric angles, location coordinates, and an identifier.

17. A communication system, comprising:
one or more base stations, wherein each base station comprises a transmitter;
a first layer of one or more spatial redistributors;
a second layer of one or more spatial redistributors;
wherein each of the spatial redistributors of the first layer and second layer of one or more spatial redistributors comprises:
an array of channels, where each of a plurality of independently operating channels in the array comprises:
at least one antenna element configured to wirelessly receive a signal;
an in phase RF chain configured to apply a first phase shift and a first time delay to an in phase intermediate frequency (IF) signal prior to upconversion and retransmission, where the in phase RF chain further comprises:
a first down converting mixer which receives a first signal from a reference oscillator and down converts the received signal in the in phase RF chain to produce the in phase IF signal; and
a first up converting mixer which receives a second signal from the reference oscillator and up converts the phase shifted and time delayed IF signal to produce an in phase output component signal;
a quadrature RF chain configured to apply a second phase shift and a second time delay to a quadrature intermediate frequency (IF) signal prior to upconversion and retransmission, where the quadrature RF chain comprises:
a second down converting mixer which receives a third signal from the reference oscillator and down converts the received signal in the quadrature RF chain to produce the quadrature IF signal; and
a second up converting mixer which receives a fourth signal from the reference oscillator and up converts the phase shifted and time delayed quadrature IF signal to produce a quadrature output component signal;
control circuitry configured to control the time delays and the phase shifts applied by the in phase RF chain and the quadrature RF chain;
a summing circuit configured to combine the in phase output component signal and the quadrature output component signal to create an output signal;
wherein the first signal from the reference oscillator received by the first down converting mixer is a cosine phase signal and the third signal from the reference oscillator received by the second down converting mixer is a sine phase signal; and
wherein the at least one antenna element is further configured to wirelessly retransmit the output signal;
a plurality of communication devices, wherein each communication device comprises a transmitter and a receiver;
wherein the array of channels is configured to redirect the signal received from a first set of directions for retransmission in a second set of directions; and
wherein at least one of the communication devices communicates with the base station through the first layer and the second layer of one or more spatial redistributors.

18. The communication system of claim 17, wherein at least one of the spatial redistributors of the first layer redirects a signal from at least one of the base stations through at least one of the spatial redistributors of the second layer.

19. A spatial redistributor, comprising:
an array of channels configured to receive and retransmit a signal, where each of a plurality of independently operating channels in the array comprises:
an in phase RF chain configured to apply a first time delay to the received signal prior to retransmission;
a quadrature RF chain configured to apply a second time delay to the received signal prior to retransmission;
a first down converting mixer which receives a signal from a local oscillator and down converts the received signal in the in phase RF chain prior to the first time delay; and
a second down converting mixer which receives a signal from the local oscillator and down converts the received signal in the quadrature RF chain prior to the second time delay, wherein the signal from the local oscillator received by the first down converting mixer is a cosine phase signal and the signal from the local oscillator received by the second down converting mixer is a sine phase signal.

20. The spatial redistributor of claim 19, wherein each of the plurality of independently operating channels in the array further comprises:
a first up converting mixer which receives a signal from the local oscillator and up converts the received signal in the in phase RF chain after the first time delay; and
a second up converting mixer which receives a signal from the local oscillator and up converts the received signal in the quadrature RF chain after the second time delay,
wherein the up converted signal from the in phase RF chain and the up converted signal from the quadrature RF chain are merged to create an output signal.

\* \* \* \* \*